(12) United States Patent
Hara et al.

(10) Patent No.: US 7,409,266 B2
(45) Date of Patent: Aug. 5, 2008

(54) GROUP ROBOT SYSTEM THAT CAN OBTAIN DETAILED OVERALL INFORMATION OF OBJECT EFFICIENTLY

(75) Inventors: Keita Hara, Kashihara (JP); Masaki Hamamoto, Sakurai (JP); Yoshiji Ohta, Kashiwara (JP)

(73) Assignee: Sharp Kabushiki Kaisha, Osaka (JP)

( * ) Notice: Subject to any disclaimer, the term of this patent is extended or adjusted under 35 U.S.C. 154(b) by 810 days.

(21) Appl. No.: 10/739,453

(22) Filed: Dec. 17, 2003

(65) Prior Publication Data
US 2004/0210344 A1    Oct. 21, 2004

(30) Foreign Application Priority Data

| Dec. 20, 2002 | (JP) | ............................ 2002-369266 |
| Jan. 8, 2003 | (JP) | ............................ 2003-002216 |
| Jan. 16, 2003 | (JP) | ............................ 2003-008576 |
| Aug. 11, 2003 | (JP) | ............................ 2003-291718 |

(51) Int. Cl.
*G06F 19/00*  (2006.01)

(52) U.S. Cl. ......................................... 700/245; 901/1

(58) Field of Classification Search ................ 340/2.1, 340/825.02; 700/13, 19, 247, 253, 3, 58, 700/59, 64, 69, 8, 900; 702/1; 901/1
See application file for complete search history.

(56) References Cited

U.S. PATENT DOCUMENTS

| 5,701,120 | A | * | 12/1997 | Perelman et al. ....... 340/825.02 |
| 5,974,236 | A | * | 10/1999 | Sherman .................... 709/221 |
| 6,206,324 | B1 | * | 3/2001 | Smith .......................... 244/72 |
| 6,687,571 | B1 | * | 2/2004 | Byrne et al. ................ 700/245 |
| 2001/0049562 | A1 | * | 12/2001 | Takano et al. ................ 700/19 |
| 2005/0251291 | A1 | * | 11/2005 | Solomon .................... 700/245 |
| 2006/0079997 | A1 | * | 4/2006 | McLurkin et al. .......... 700/245 |

FOREIGN PATENT DOCUMENTS

| JP | 07-093028 | 4/1995 |
| JP | 08-030327 | 2/1996 |
| JP | 11-168407 A | 6/1999 |

* cited by examiner

*Primary Examiner*—Khoi H. Tran
*Assistant Examiner*—Nicholas Kiswanto
(74) *Attorney, Agent, or Firm*—David G. Conlin; David A. Tucker; Edwards Angell Palmer & Dodge LLP

(57) ABSTRACT

A group robot system includes a plurality of sensing robots and a base station controlling the sensing robots, and establishes communication in a hierarchical manner. The hierarchical structure is formed of a plurality of levels between a plurality of sensing robots with base station as the highest hierarchical level. The first sensing robot detects an object; the second sensing robot conducts further search on the object; and the third sensing robot conducts communication relay between the first sensing robot and the base station. When the first sensing robot detects an object, the base station provides control such that all sensing robots, other than the first, second and third sensing robots, move outside the current area of search.

10 Claims, 47 Drawing Sheets

$\tau = 135°$ $\tau = 180°$ $\tau = 225°$ $\tau = 270°$ $\tau = 315°$

FIG.18
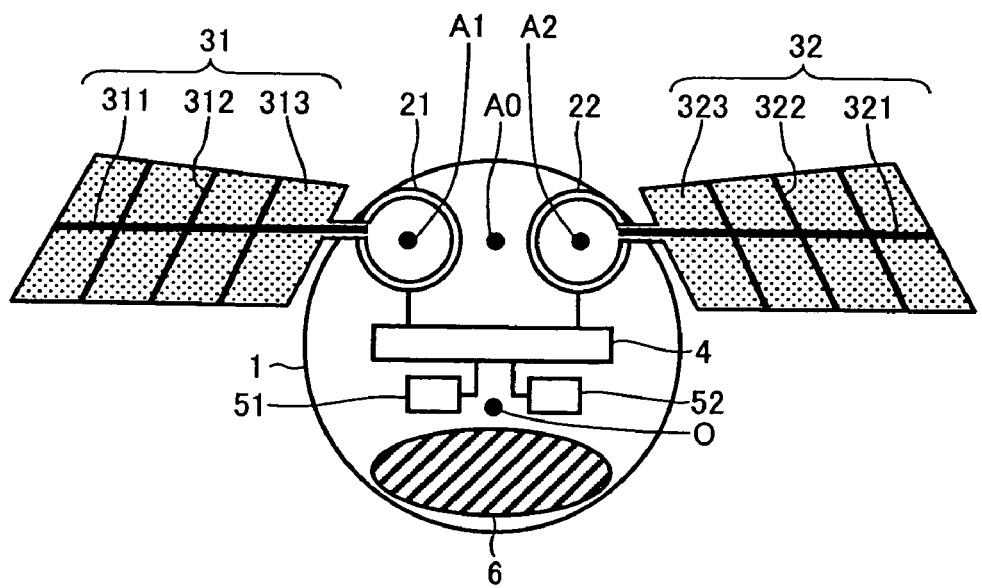
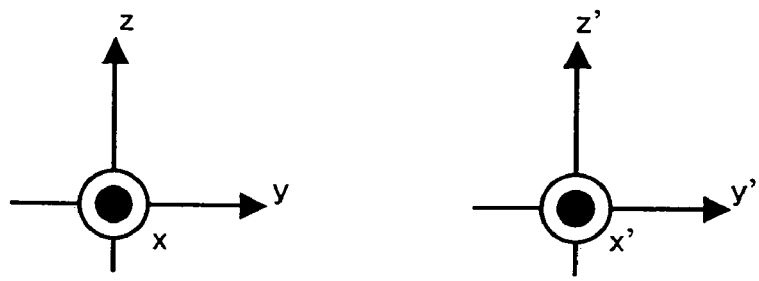

FIG.39

| | | x″+ | x″− | z″+ | z″− | θ_y″+ | θ_y″− |
|---|---|---|---|---|---|---|---|
| S1 | stroke $\theta$ ↑ | | | ○ | | | |
| | stroke $\theta$ ↓ | | | | ○ | | |
| | $-d\theta/dt$ ↑ | | | ○ | | | |
| | $-d\theta/dt$ ↓ | | | | ○ | | |
| | $-d\alpha/d\theta > d\alpha_{th}$ | ○ | | | | | |
| | $-d\alpha/d\theta < d\alpha_{th}$ | | ○ | | | | |
| | $\beta$ is about vertical to stroke direction. | | | ○ | | | |
| | $\beta$ is not vertical to stroke direction. | | | | ○ | | |
| | $\beta > 0$ | ○ | | | | | |
| | $\beta < 0$ | | ○ | | | | |
| S2 | $-d\beta/dt$ ↑ | ○ | | ○ | | ○ | |
| | $-d\beta/dt$ ↓ | | ○ | | ○ | | ○ |
| S3 | stroke $\theta$ ↑ | | | | ○ | | |
| | stroke $\theta$ ↓ | | | ○ | | | |
| | $d\theta/dt$ ↑ | | | | ○ | | |
| | $d\theta/dt$ ↓ | | | ○ | | | |
| | $d\alpha/d\theta > d\alpha_{th}$ | | ○ | | | | |
| | $d\alpha/d\theta < d\alpha_{th}$ | ○ | | | | | |
| | $\beta$ is about vertical to stroke direction. | | | | ○ | | |
| | $\beta$ is not vertical to stroke direction. | | | ○ | | | |
| S4 | $d\beta/dt$ ↑ | ○ | | | ○ | | ○ |
| | $d\beta/dt$ ↓ | | ○ | ○ | | ○ | |

|  | RIGHT ACTUATOR || LEFT ACTUATOR ||
|---|---|---|---|---|
|  | DRIVING FREQUENCY | FLAPPING MOTION PATTERN | DRIVING FREQUENCY | FLAPPING MOTION PATTERN |
| UP | 35Hz | B | 35Hz | B |
| DOWN | 25Hz | B | 25Hz | B |
| GO FORWARD | 30Hz | A | 30Hz | A |
| HOVER | 30Hz | B | 30Hz | B |
| TURN RIGHT | 30Hz | B | 30Hz | A |
| TURN LEFT | 30Hz | A | 30Hz | B |

GROUP ROBOT SYSTEM THAT CAN OBTAIN DETAILED OVERALL INFORMATION OF OBJECT EFFICIENTLY

BACKGROUND OF THE INVENTION

1. Field of the Invention

The present invention relates to a group robot system, a sensing robot in such a group robot system, a base station included in such a group robot system, and a pheromone robot included in such a group robot system. Particularly, the present invention relates to a group robot system that can obtain detailed overall information of an object efficiently, a sensing robot included in such a group robot system, a base station included in such a group robot system, and a pheromone robot included in such a group robot system.

2. Description of the Background Art

Conventionally, systems and robots having a plurality of mechanisms operating in cooperation are proposed.

For example, Japanese Patent Laying-Open No. 7-93028 discloses a controlling method of an autonomous robot group system including a mobile robot group composed of one mother robot exemplified as a base station and a plurality of child robots exemplified as a sensing robot, as shown in FIG. 62. In accordance with the publication of Japanese Patent Laying-Open No. 7-93028, the mother robot equipped with a sensing capability through a non-contact sensor determines the arrangement and route of travel of a child robot equipped with a sensing capability through a contact type sensor, providing control by applying instructions as to the position and distance of travel to a child robot. Based on the information sensed through the base station and the information sensed through a sensing robot, the route of travel of the base station from a starting point to the destination can be executed in organization by a route planning method.

Additionally, Japanese Patent Laying-Open No. 8-30327 discloses, as shown in FIG. 63, single or a plurality of sensor mechanisms for collecting information of external environment, a practical environment recognition system operating in an actual environment and having a hierarchical information processing mechanism generating from sensor information A from the sensor mechanism, an appropriate motion instruction B for an actuator mechanism, and an intelligent robot. According to this technique disclosed in Japanese Patent Laying-Open No. 8-30327, the environment recognition system and the intelligent robot are characterized in that, in accordance with the state at the time of sensing, the hierarchical information processing mechanism provides motion instruction B such that the actuator mechanism appropriately changes position of itself or of an object as well as external environment such as illumination, so that the sensor mechanism functions satisfactorily.

The autonomous robot group system disclosed in Japanese Patent Laying-Open No. 7-93028 effects communication between the base station and a sensing robot in a one-to-one correspondence, so that communication over a long distance is required with respect to all the sensing robots when the search is to be conducted over a wide area of search through the sensing robots. Therefore, in the group robot system disclosed in Japanese Patent Laying-Open No. 7-93028, a communication mechanism whose maximum communication distance is great, i.e. a communication mechanism of a large size or great weight, will be required in each sensing robot corresponding to the case where the base station does not move and is situated fixedly.

A larger communication mechanism will result in a larger or heavier sensing robot with the possibility of deteriorating the search capability of each sensing robot. The autonomous robot group system had the disadvantage that the range of search of the entire group robot system cannot be increased under the state where the base station does not move.

Furthermore, the group robot system of the type disclosed in Japanese Patent Laying-Open No. 7-93028 requires individual communication between the base station and each sensing robot in the case where communication is carried out between the base station and a sensing robot in a one-to-one correspondence. If the range of search for the entire group robot system is to be increased under the state where the base station does not move, a large communication mechanism is also required at the base station to allow long-distance communication with respective sensing robots. This similarly leads to the problem that it is difficult to increase the range of search for the entire group robot system in the state where the base station does not move.

In the case where the range of search of such a group robot system disclosed in Japanese Patent Laying-Open No. 7-93028 is to be increased, control of each sensing robot must be conducted in a more reliable manner. If control through communication control is to be rendered reliable by restricting the travel of the sensing robot, the travel of the sensing robot also must be controlled.

In accordance with the techniques disclosed in Japanese Patent Laying-Open No. 7-93028 related to a group robot system and Japanese Patent Laying-Open No. 8-30327 related to an environment recognition system and intelligent robot, a plurality of sensor mechanisms as well as sensor information processing units from upper to lower levels are constantly in operation. It was difficult to alleviate the load in sensor information processing when an object of search is to be detected. There was also the problem that power consumption of the sensing robot cannot be reduced.

SUMMARY OF THE INVENTION

An object of the present invention is to provide a group robot system that allows the range of search to be increased under the state where the base station does not move, while reducing the size or weight of the communication mechanism of a sensing robot or base station; a sensing robot included in such a group robot system; a base station included in such a group robot system; and a pheromone robot included in such a group robot system.

Another object of the present invention is to provide a group robot system that can obtain detailed overall information of an object of interest efficiently in a short period of time and with low power consumption, reducing the processing load of sensor information when an object is to be detected; a sensing robot included in such a group robot system; a base station included in such a group robot system; and a pheromone robot included in such a group robot system.

The above objects can be achieved by a group robot system of the present invention including a plurality of sensing robots and a control apparatus controlling the sensing robot. The control apparatus responds to a sensing robot detecting an object to provide control such that a sensing robots other than the sensing robot that has detected the object moves outside the area of search.

According to another aspect of the present invention, a group robot system includes a plurality of sensing robots and a control apparatus controlling a sensing robot. The control apparatus responds to a sensing robot detecting an object to provide control such that a sensing robot other than the sensing robot that has detected the object moves to an initial position.

According to a further aspect of the present invention, a group robot system includes a plurality of sensing robots equipped with a sensor function, and a control apparatus controlling a sensing robot. The control apparatus responds to a sensing robot detecting an object to provide control such that the sensor function of a predetermined sensing robot, among the plurality of sensing robots, is enabled and the sensor function of a sensing robots other than the predetermined sensing robot with the enabled sensor function is disabled.

According to still another aspect of the present invention, a group robot system includes a plurality of sensing robots equipped with a sensor function, and a control apparatus controlling a sensing robot. The control apparatus responds to a sensing robot detecting an object to provide control such that another sensing robot differing from the sensing robot that has detected the object, and with a resolution of sensor function higher that the resolution of the sensing robot that has detected the object conducts further search on the object.

According to a still further aspect of the present invention, a group robot system includes a plurality of sensing robots equipped with a sensor function, and a control apparatus controlling a sensing robot. The control apparatus responds to a sensing robot detecting an object to provide control such that another sensing robot differing from the sensing robot that has detected the object and with a type of sensor function differing from the type of sensor function of the sensing robot that has detected the object conducts further search on the object.

According to yet a further aspect of the present invention, a group robot system includes a plurality of sensing robots equipped with a sensor function, and a control apparatus controlling a sensing robot. The control apparatus responds to a sensing robot detecting an object to provide control such that another sensing robot differing from the sensing robot that has detected the object, and with a sensor information processing method differing from the sensor information processing method of the sensing robot that has detected the object conducts further search on the object.

According to yet another aspect of the present invention, a sensing robot included in a group robot system is a sensing robot capable of a fluttering flight included in the group robot system set forth above. The sensing robot of the present aspect is under control of the control apparatus set forth above.

According to yet a still further aspect of the present invention, a base station included in a group robot system is a base station relevant to the control apparatus included in the group robot system set forth above. The base station of the present aspect controls the sensing robot capable of a fluttering flight through a fluttering motion.

According to an additional aspect of the present invention, a pheromone robot included in a group robot system is a pheromone robot included in the group robot system set forth above. The pheromone robot controls the travel of a sensing robot capable of a fluttering flight through a fluttering motion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a front view of a structure of a fluttering apparatus according to a second specific example.

FIG. 39 is a table representing correspondence between change in the manner of fluttering of a left wing and the resulting change in the lifting state.

DESCRIPTION OF THE PREFERRED EMBODIMENTS

Figure 1:
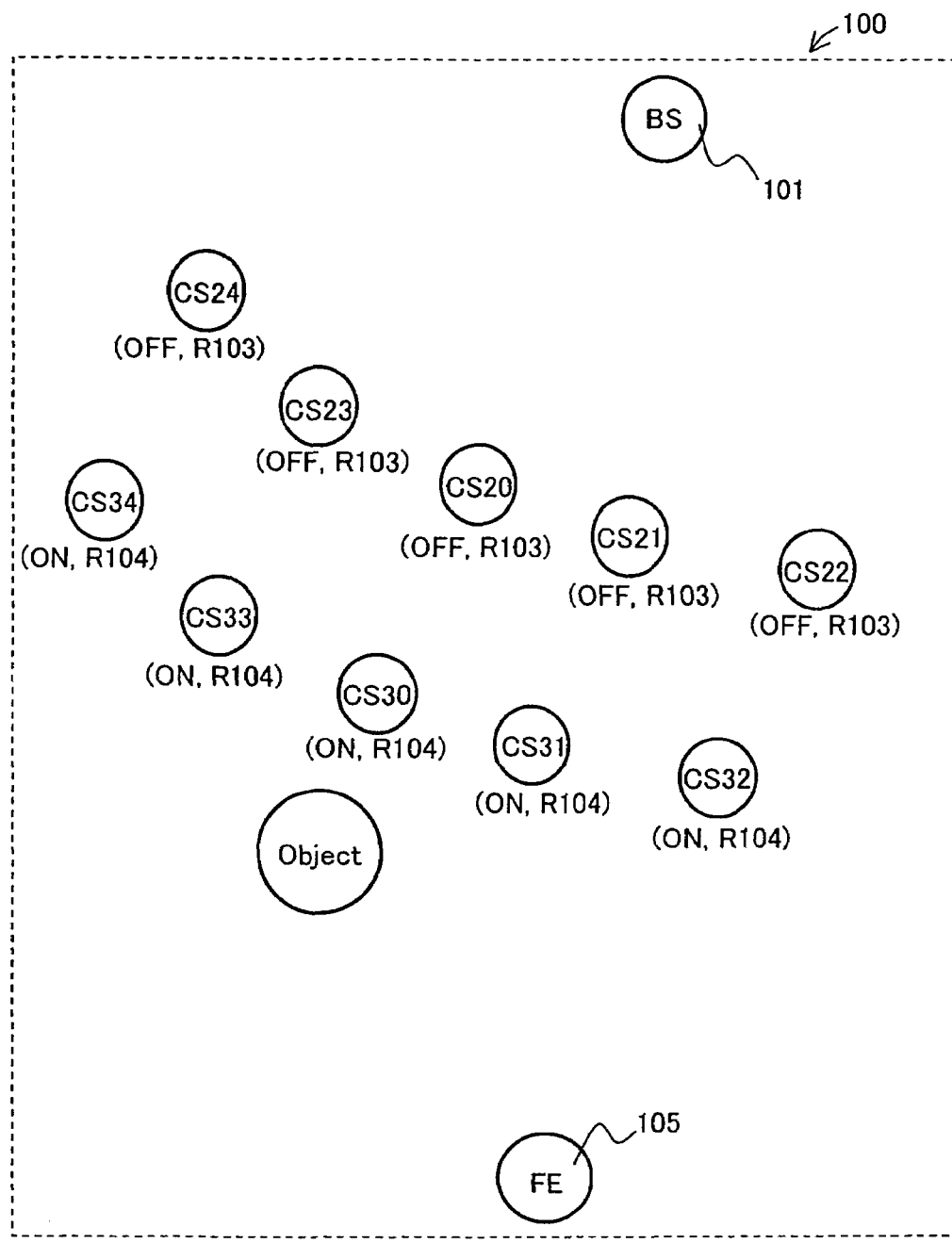
FIG. 1 shows a specific example of a group robot system 100 of the present embodiment in an initial state.

An embodiments of the present invention will be described with reference to the drawings. In the description set forth below, the same components and structural elements have the same reference characters allotted. Their designation and function are also identical. Therefore, detailed description thereof will not be repeated.

FIG. 1 shows a specific example of a structure of a group robot system 100 of the present embodiment. Referring to FIG. 1, group robot system 100 of the present embodiment includes a base station BS101, a plurality of fluttering sensing robots CSn, and a fluttering pheromone robot FE105.

At the beginning, the basic structure, the method of flight, and the control method of a fluttering apparatus identified as a sensing robot CS and a pheromone robot FE105 will be described.

First Specific Example of Fluttering Apparatus

A first specific example of a fluttering apparatus of the present embodiment will be described hereinafter.

<Main Structure>

Figure 2:
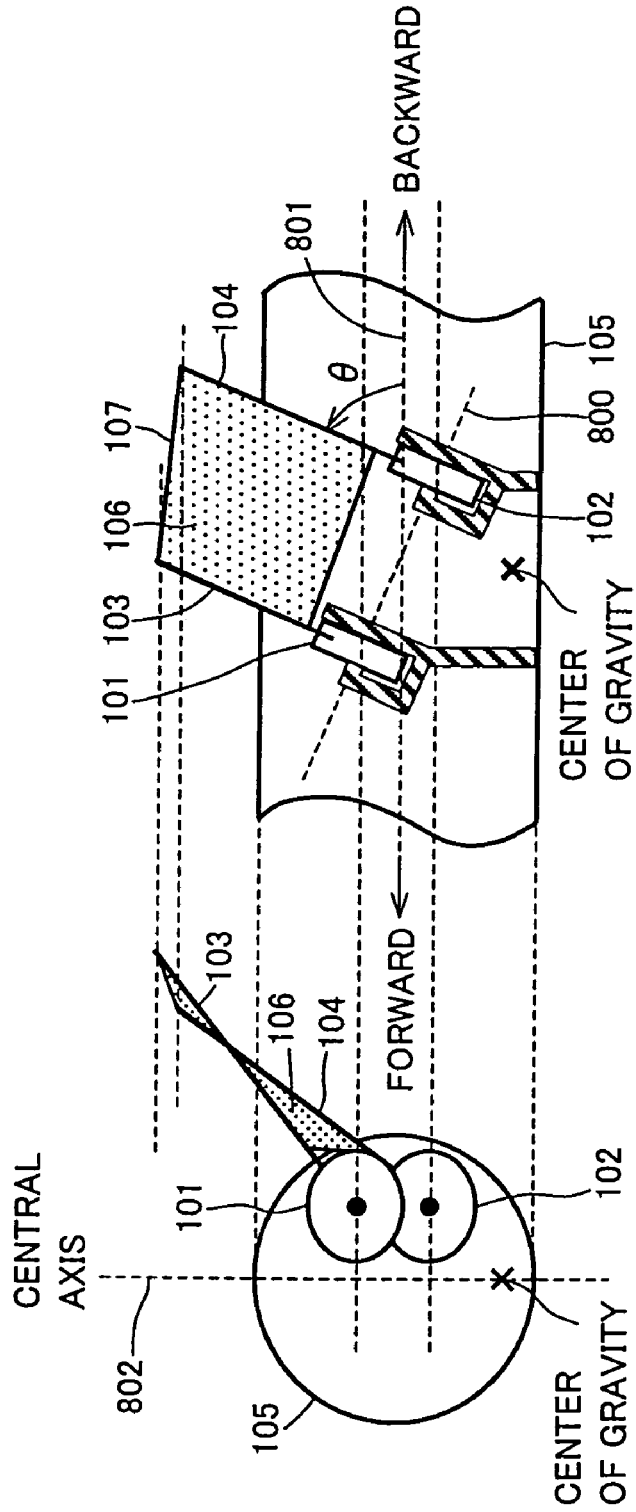
FIGS. 2A and 2B are a partial front view and partial side view, respectively, of a fluttering apparatus according to a first specific example.

FIG. 2A and FIG. 2B show the fluttering sensing robot having two wing shafts as the wing portion, in which FIG. 2A shows a front view of the fluttering sensing robot and FIG. 2B shows a left side view with respect to the front face of the fluttering sensing robot.

Though only the left wing viewed from the front face of the fluttering apparatus is shown in FIG. 2A and FIG. 2B, a right wing is also formed in line symmetry with respect to the central axis of a main body 105 in practice. For simplicity of description, it is assumed that an axis (main body axis 801) along the direction of extension of main body 105 is in a horizontal plane, and that a central axis 802 passing through the center of gravity is kept in the vertical direction.

As can be seen from FIG. 2A and FIG. 2B, on main body 105 of the fluttering apparatus, a wing (left wing) is formed, which has a front wing shaft 103 and a rear wing shaft 104 and a wing film 106 provided bridging across the front and rear wing shafts 103 and 104.

Further, a rotary actuator 101 for driving front wing shaft 103 and a rotary actuator 102 for driving rear wing shaft 104 are mounted on main body 105. Such an arrangement of actuators 101 and 102 as well as the shape of the wing including front wing shaft 103, rear wing shaft 104 and wing film 106 are not limited to those described herein, provided that the flight function is assured.

Further, in the fluttering sensing robot, when the cross sectional shape of the wing is adapted to protrude vertically upward, a reaction as well as lift are generated for the flight in the horizontal direction, resulting in larger buoyancy force.

The position of center of gravity of the fluttering sensing robot is set to be lower than the point of application of the force received by the wing from ambient fluid to the actuator, to enhance stability of the fluttering apparatus. When swift change of the attitude of the fluttering apparatus is of higher priority, it is desirable that the center of gravity and the point of application are substantially the same. In that case, difference of the force exerted by the fluid on the left and right wings necessary for attitude control becomes smaller, and hence change in attitude of the fluttering apparatus becomes easier.

Two rotary actuators 101 and 102 have a common axis of rotation 800. The axis of rotation 800 forms a prescribed angle (90°−θ) from the axis of the main body. Front (rear) wing shaft 103, 104 performs a reciprocating operation in a plane that orthogonally crosses the axis of rotation 800, with the actuator 101, 102 being a fulcrum. The angle formed by the plane orthogonally crossing the axis of rotation 800 and the axis 801 of the main body is the angle of elevation θ.

In order to ensure both mechanical strength and light weight, main body 105 should desirably be formed by polyethylene terephthalate (PET) molded to a cylindrical shape. The material and the shape, however, are not limiting.

An ultrasonic progressive wave actuator using a piezoelectric element is desirable as the actuators 101 and 102, as it has large activation torque, enables reciprocating operation in a simple manner and has a simple structure. Such an actuator is classified into two types, that is, rotary actuator and linear actuator. In the example shown in FIG. 2A and FIG. 2B, rotary actuators are used.

A method of directly driving the wing by an ultrasonic element using progressive wave will be mainly discussed in the following. The mechanism for driving the wing and the type of the actuator used therefor, however, are not limited to those described with respect to the present embodiment.

Figure 12:
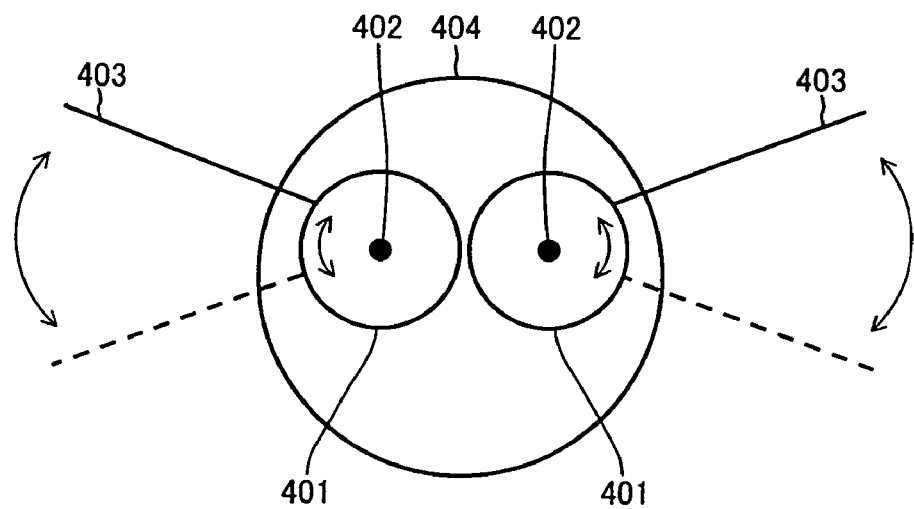
FIG. 12 is a schematic front view of a fluttering apparatus in accordance with a modification of the first specific example.

As the rotary actuator, a rotary actuator 401 shown in FIG. 12, for example, may be used, other than the rotary actuators 101 and 102 shown in FIG. 2A and FIG. 2B.

In the fluttering sensing robot shown in FIG. 12, a wing 403 is attached to a rotary actuator 401 mounted on main body

404. Wing 403 performs a reciprocating operation about the rotation axis 402 of rotary actuator 401.

Figure 13:
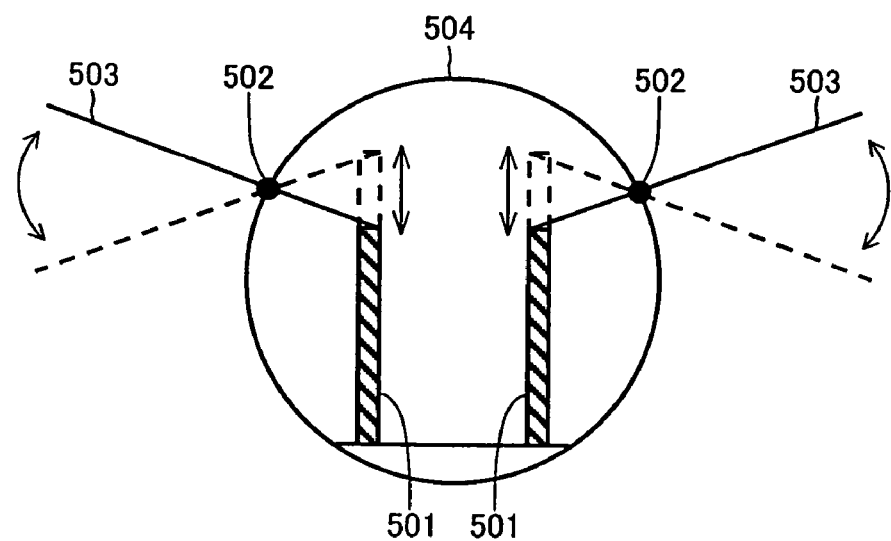
FIGS. 13 and 14 are schematic front views of a fluttering apparatus in accordance with another modification of the first specific example.
Figure 14:
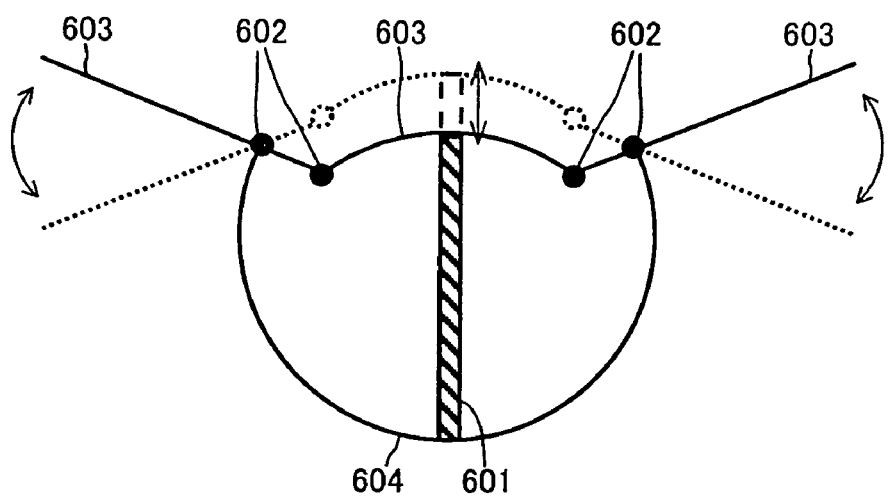

As a mechanism for driving the wing, a mechanism having an exoskeleton structure and a linear actuator combined may be applied to provide such a fluttering apparatus as shown in FIG. 13 or 14, for example.

In the fluttering sensing robot shown in FIG. 13, a front wing shaft or a rear wing shaft 503 is connected to one end of a linear actuator 501. Motion of linear actuator 501 is transmitted to the front or rear wing shaft 503 through a hinge 502 attached to main body 504, so that fluttering motion occurs. The fluttering motion is conceived from the fluttering motion of a dragonfly with the wing of which is directly driven by the muscle.

In the fluttering sensing robot shown in FIG. 14, the main body is divided into an upper main body 603 and a lower main body 604. Motion of a linear actuator fixed on lower main body 604 is transmitted to upper main body 603. The motion of upper main body 603 is transmitted to the front or rear wing shaft 603 through a hinge 602, and the fluttering motion occurs. This fluttering operation is conceived from the fluttering operation of a bee, not the dragonfly.

In the fluttering sensing robot shown in FIG. 14, the left and right wing shafts 603 are simultaneously driven by one actuator 601, and therefore, separate driving of left and right wing shafts is not allowed. Therefore, delicate flight control is not possible. However, as the number of actuators can be reduced, weight and power consumption can be reduced.

In the fluttering sensing robot shown in FIG. 2A and FIG. 2B, front wing shaft 103 and rear wing shaft 104 are respectively connected to rotary actuators 101 and 102. A wing film 106 is provided between the front and rear wing shafts 103 and 104. The wing film 106 has initial stress in a direction of contraction in its plane, which serves to enhance stiffness of the entire wing.

In order to reduce weight, front and rear wing shafts 103 and 104 are formed to have a hollow structure, from carbon graphite. Thus, the front and rear wing shafts 103 and 104 have elasticity, and front and rear wing shafts 103 and 104 are deformable by the tension of wing film 106.

Figure 15:
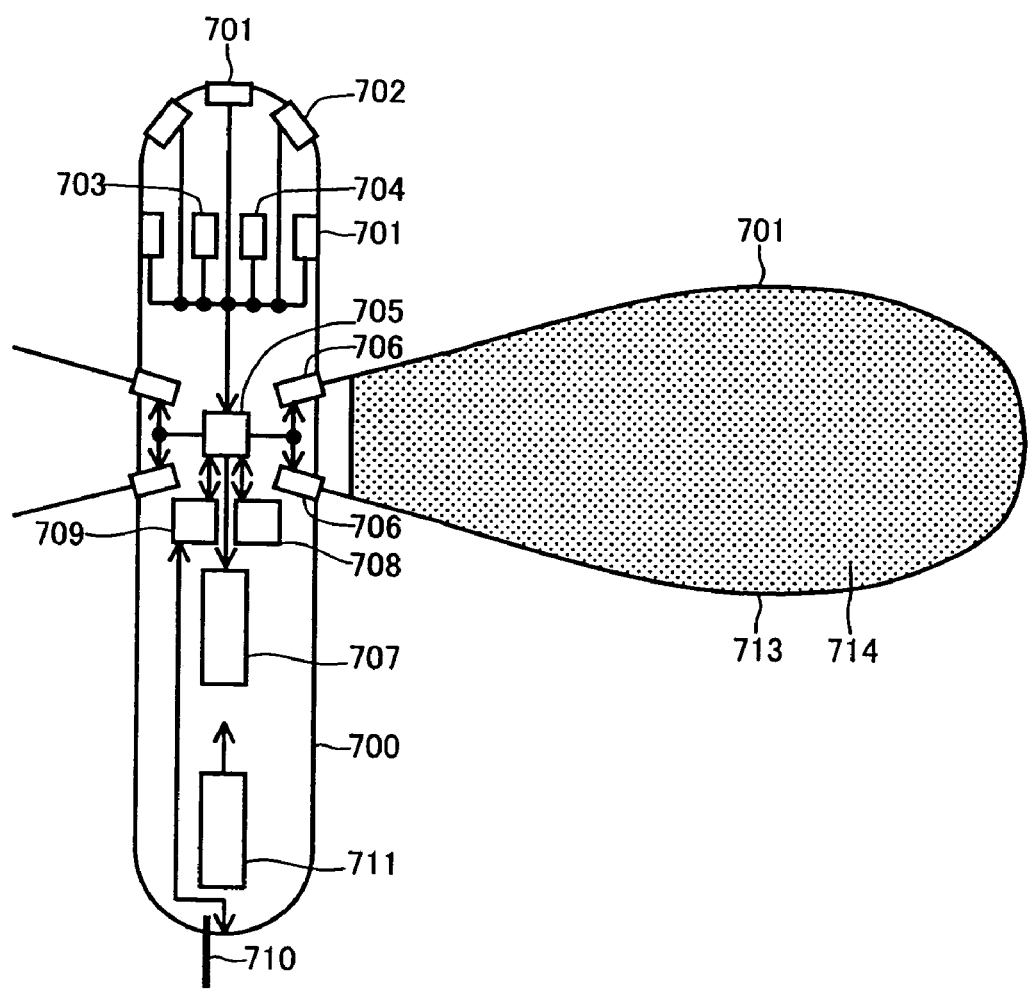
FIG. 15 is a schematic plan view of a structure of the fluttering apparatus of FIG. 1 in the first specific example.

FIG. 15 shows an overall structure of the fluttering apparatus of the present invention. The wing on the left side along the direction of progress (upward on the sheet) is not shown.

On a main body 700, an ultrasonic sensor 701, an infrared sensor 702, an acceleration sensor 703 and an angular acceleration sensor 704 are arranged. Results of detection by these sensors are transmitted to a fluttering control portion 705.

Fluttering control portion 705 processes information such as distance between the fluttering apparatus and an obstacle or a person near the apparatus, from the results detected by the ultrasonic sensor 701 or infrared sensor 702. Further, information such as the state of flight, target position or attitude of the fluttering apparatus is processed from the results detected by acceleration sensor 703 or angular acceleration sensor 704, and driving control of left and right actuators 706 and a center of gravity control portion 707 is determined.

Though ultrasonic sensor 701 and infrared sensor 702 are used as means for detecting an obstacle existing around the fluttering sensing robot and acceleration sensor 703 and angular acceleration sensor 704 are used as means for detecting the position and attitude of the fluttering sensing robot, the sensors are not limited to these, and any sensor that can measure environmental conditions, position and attitude of the present fluttering sensing robot may be used.

For example, the attitude of the fluttering apparatus can be calculated from acceleration information obtained by arranging two acceleration sensors capable of measuring acceleration in three axial directions orthogonally crossing with each other, arranged at different positions of main body 700. Further, it is possible to calculate the position and attitude of the fluttering apparatus by providing a magnetic field distribution in the space in which the fluttering apparatus moves, and by detecting the magnetic field distribution by a magnetic sensor.

In FIG. 15, sensors represented by acceleration sensor 703 and angular acceleration sensor 704 are shown as components separate from fluttering control portion 705. In order to reduce weight, the sensors may be formed integrally with and on the same substrate as fluttering control portion 705 by micromachining technique, for example.

Though wing drive is open-loop controlled in the present fluttering apparatus, closed-loop control is also allowed by providing an angle sensor of the wing at a root of the wing and using angle information obtained from the angle sensor.

When flow of the fluid in the space where the apparatus flies is known and flight is allowed in accordance with a predetermined method of fluttering, the sensors cited above are not essential.

Fluttering control portion 705 is connected to a memory portion 708, and existing data necessary for fluttering control can be read out from memory portion 708. Further, information obtained by sensors 701 to 704 may be fed to memory portion 708 and to rewrite information in memory portion 708 as needed, whereby the fluttering sensing robot may have learning capability.

When the information obtained by sensors 701 to 704 is to be simply stored in memory portion 708, sensors 701 to 704 may be directly connected to memory portion 708 instead of through fluttering control portion 705. Alternatively, fluttering control portion 705 may be connected to communication control portion 709, for data input to/output from communication control portion 709. Communication control portion 709 transmits/receives data to/from an external apparatus (other fluttering apparatus, a base station or the like) through an antenna portion 710.

Such a communication function enables speedy transfer of data obtained by the fluttering sensing robot and stored in memory portion 708 to an external apparatus. Further, it is possible to receive from an external apparatus information that cannot be obtained by the fluttering sensing robot and to store such information in memory portion 708, so that such information can be used for fluttering control. Without storing a large amount of map information fully in the fluttering sensing robot, it is possible to obtain map information of a desired area as needed from a base station.

Though antenna portion 710 is shown as a bar protruding from an end of main body 700 in the example shown in FIG. 15, it may have any shape or arrangement provided that an antenna function is attained. For example, a loop shaped antenna may be formed on the wing, utilizing front wing shaft 712 or rear wing shaft 713. Alternatively, the antenna may be contained in main body 700, or the antenna and communication control portion 709 may be integrated.

Ultrasonic sensor 701, infrared sensor 702, acceleration sensor 703, angular acceleration sensor 704, fluttering control portion 705, left and right actuators 706, center of gravity control portion 707, memory portion 708, communication control portion 709 and antenna portion 710 are driven by a current supplied from a power supply portion 711.

Though electric power is used as driving energy, an internal combustion engine may be used. An actuator utilizing physiological oxidation-reduction reaction as can be seen in the muscle of insects may be used. Further, a method of obtaining energy for driving the actuator from the outside is allowed.

For example, a thermionic element, an electromagnetic wave or the like may be used for the electric power.

(Method of Flight)

For simplicity of description, it is assumed that external force acting on the present fluttering sensing robot is only the fluid force received by the wing from the fluid and the gravity acting on the fluttering sensing robot (a product of the mass of the fluttering apparatus and gravitational acceleration). For the fluttering sensing robot to fly constantly, it is necessary that the following relation is satisfied in time average of one fluttering operation:

(vertically upward fluid force acting on the wing)>
(gravity acting on the fluttering apparatus).

One fluttering operation means a downstroke of the wing followed by an upstroke of the wing.

For the robot to rise with the vertically upward fluid force being dominant, the following relation must be satisfied:

(vertically upward fluid force acting on the wing in a downstroke)>(vertically downward fluid force acting on the wing in an upstroke).

Here, a method by which the vertically upward fluid force acting on the wing in a downstroke (hereinafter referred to as "fluid force for downstroke") is made larger than the vertically downward fluid force acting on the wing in an upstroke (hereinafter referred to as "fluid force for an upstroke") will be described, which is a method of fluttering corresponding to, but simplified, the manner of fluttering of an insect.

For simplicity of description, the behavior of the fluid or the force of the fluid on the wing will be described with reference to main components thereof. The magnitude of the buoyancy force obtained by the fluttering method and the gravity acting on the fluttering sensing robot (hereinafter referred to as "weight") will be described later.

In order to make the fluid force for a downstroke larger than the fluid force for an upstroke, the downstroke should be such that the volume of the space in which the wing film 106 moves in the downstroke is maximized. For this purpose, the wing film 106 should be moved downward approximately parallel to the horizontal plane, whereby substantially the maximum fluid force can be obtained.

By contrast, for the upstroke, the wing should be moved upward such that the volume of the space in which wing film 106 moves is minimized. For this purpose, the wing film 106 should be moved upward approximately at a right angle with respect to the horizontal plane, and the fluid force exerted on the wing is approximately minimized.

Figure 3:
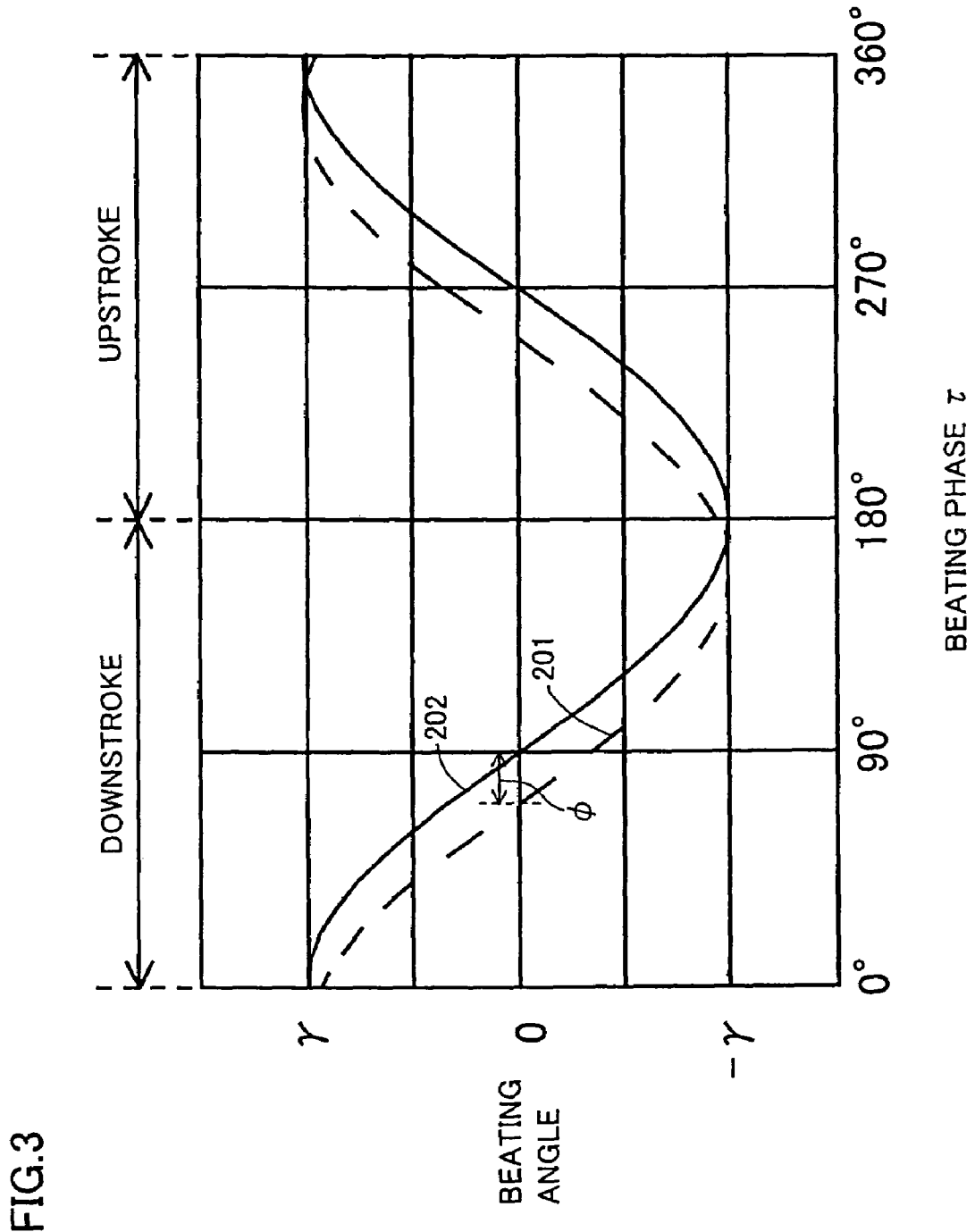
FIG. 3 is a graph representing the relationship between a fluttering motion and the phase of a fluttering motion in the first specific example.
Figure 4:
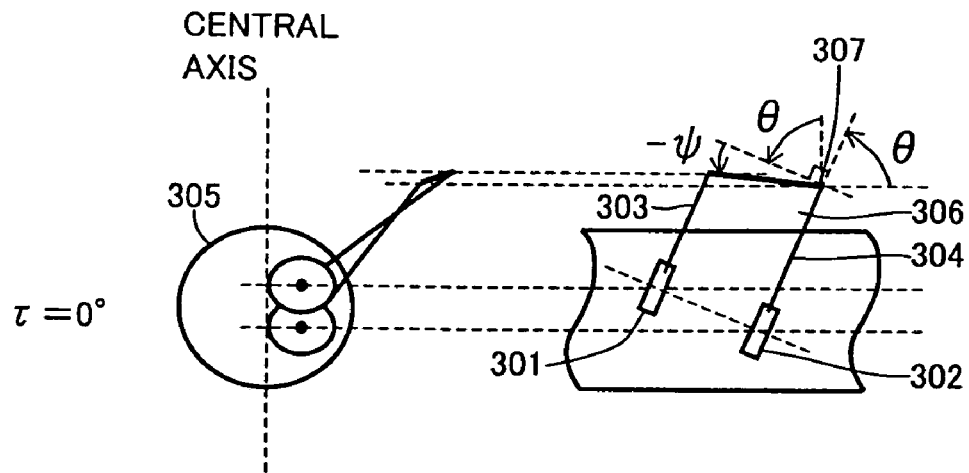
FIGS. 4-11 represent first to eighth states of a fluttering motion of the fluttering apparatus of the first specific example.
Figure 5:
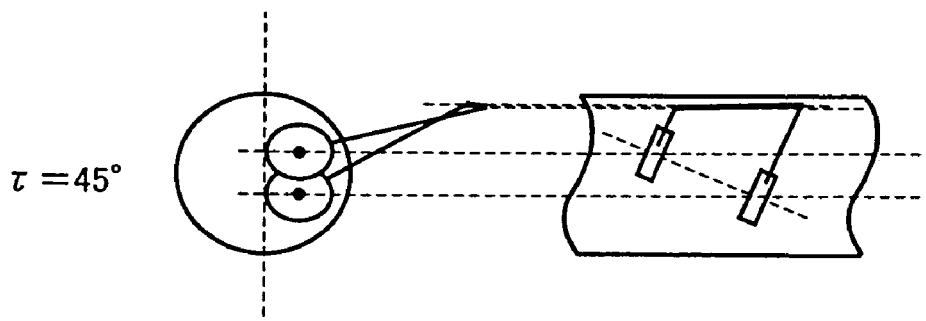
Figure 6:
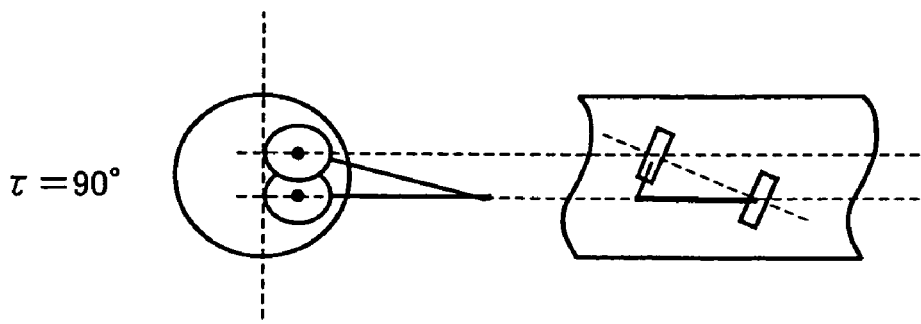
Figure 7:
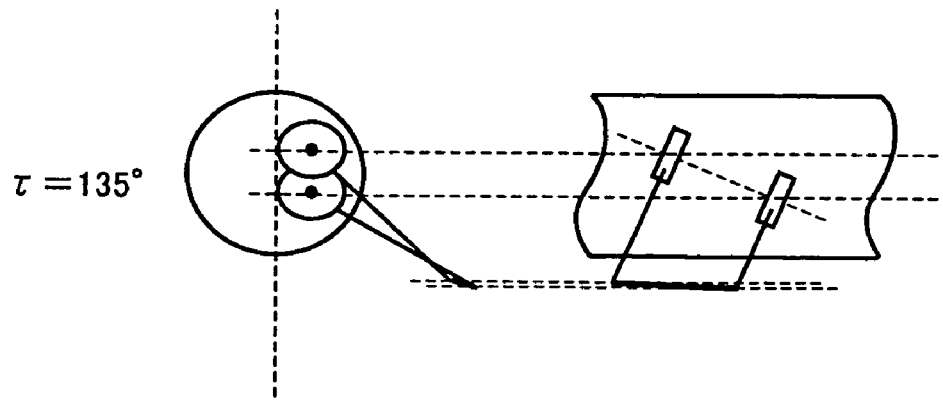
Figure 8:
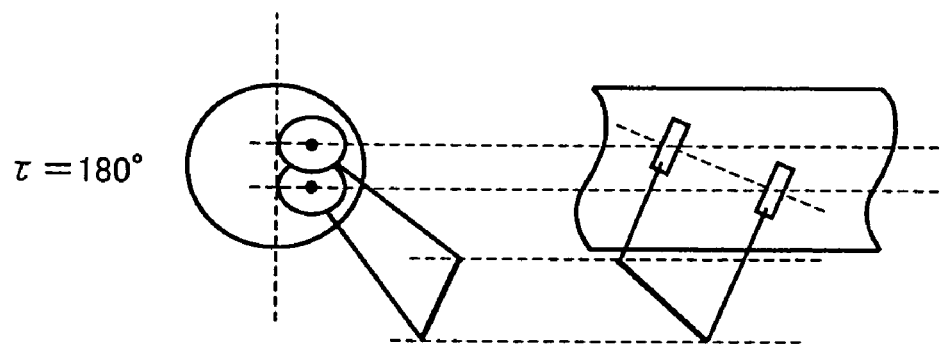
Figure 9:
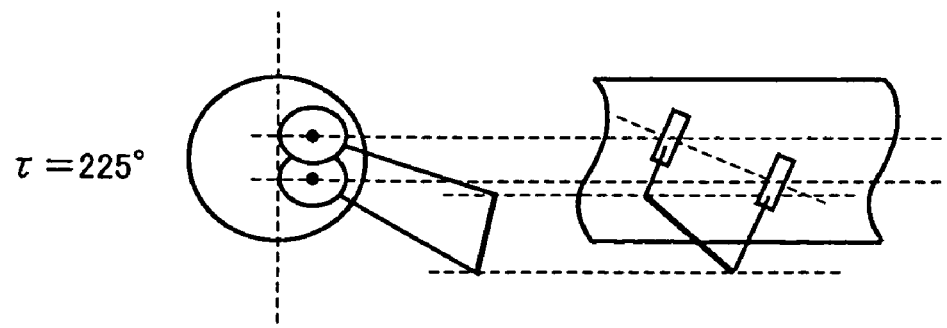
Figure 10:
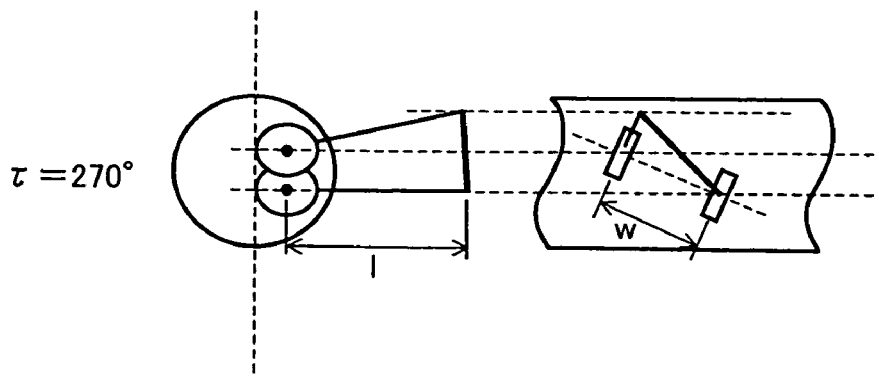
Figure 11:
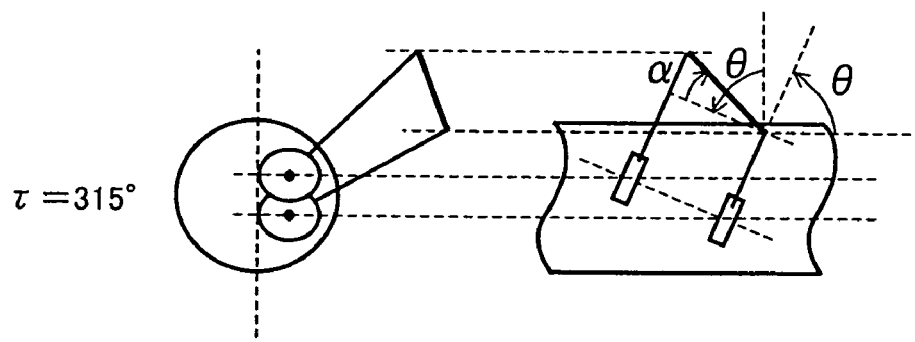

Thus, assume that wing shafts 103 and 104 are reciprocated by an angle $\gamma$ upward and downward with the position where the shafts are aligned approximately with the horizontal plane being the center, when the wing shafts 103 and 104 are reciprocated about the rotation axis 800 by rotary actuators 101 and 102. Further, the reciprocating motion of rear wing shaft 104 is adapted to be delayed by an appropriate phase $\phi$ from the reciprocating motion of the front wing shaft 103, as shown in FIG. 3.

Accordingly, in the series of reciprocating motions of the wing shown in FIGS. 4 to 11 (representing an example where $\phi=20°$), front wing shaft 303 of rotary actuator 301 which is at a higher position is moved downward earlier in the downstroke shown in FIGS. 4 to 8, and therefore tip ends of front and rear wing shafts 303 and 304 and the wing film 306 come closer to horizontal.

In the upstroke shown in FIGS. 8 to 11, difference in height of the tip ends of wing shafts 303 and 304 increases and wing film 306 comes closer to vertical. As a result, the amount of fluid moved downward or upward by the wing film 306 spread across front and rear wing shafts 303 and 304 will differ. In this fluttering sensing robot, the fluid force for the downstroke becomes larger than the fluid force for the upstroke, and hence buoyancy force is generated.

The vector of the buoyancy force inclines forward or backward by changing the phase difference $\phi$. When it is inclined forward, the apparatus moves forward, when it is inclined backward, the apparatus moves backward and when it is directed directly upward, the apparatus hovers. In the actual flight, it is possible to control fluttering frequency f or fluttering angle $\gamma$, in addition to phase difference $\phi$. Though fluttering elevation $\theta$ is fixed in the present fluttering apparatus, a function of changing this angle may be added to increase the degree of freedom.

(Fluttering Control)

The actual fluttering control will be described in greater detail. In the above described fluttering apparatus, the torsion angle $\Phi$ provided by the tip end of the wing in the downstroke or upstroke can be approximately represented by the following equation, where l represents wing length (length of the wing film along the front and rear wing shafts), w represents wing width (distance between front and rear wing shafts), $\gamma$ represents fluttering angle, $\tau$ represents phase of the fluttering motion (the instant of highest upstroke being 0° and the lowest downstroke being 180°), and $\phi$ represents phase difference between the front and rear wing shafts (see FIGS. 4, 10, 11):

$$\tan \Phi = (w/l) \cdot [\sin(\gamma \cdot \cos \tau) - \sin\{\gamma \cdot \cos(\tau + \phi)\}]$$

Actually, the front and rear wing shafts are elastic and deformable, and therefore, the torsion angle $\Phi$ may vary to some extent. Further, the angle becomes smaller when closer to the root of the wing shaft. For simplicity of description, the angle $\Phi$ in accordance with the above equation will be used for the following discussion.

Vertical component F of the fluid force acting on the wing free of torsion is approximately given by the following equation, where $\rho$ represents density of the fluid, $\gamma$ represents fluttering angle and f represents fluttering frequency.

$$F = (4/3) \cdot \pi^2 \rho w \gamma^2 f^2 l^3 \cdot \sin^2 \tau \cdot \cos(\gamma \cdot \cos \tau)$$

Horizontal component of the fluid force acting on the wing is canceled, when motions of the left and right wings are the same.

When the wing has a torsion angle of $\Phi$ components L and D which are vertical and horizontal to the plane of fluttering motion, respectively, can be given by:

$$L = F \cdot \cos \Phi \cdot \sin \Phi$$

$$D = F \cdot \cos^2 \Phi$$

Considering elevation $\theta$ of fluttering, vertical component A that must be balanced with gravity and horizontal component J that will be the thrust of forward/backward motion are as follows:

For the downstroke $$A\downarrow = -L \cdot \cos \theta + D \cdot \sin \theta$$

$$J\downarrow = -L \cdot \sin \theta - D \cdot \cos \theta$$

For the upstroke $$A\uparrow = L \cdot \cos \theta - D \cdot \sin \theta$$

$$L\uparrow = L \cdot \sin \theta + D \cdot \cos \theta$$

Actual buoyancy or thrust is given as an integration of one period of the fluttering motion.

Figure 16:
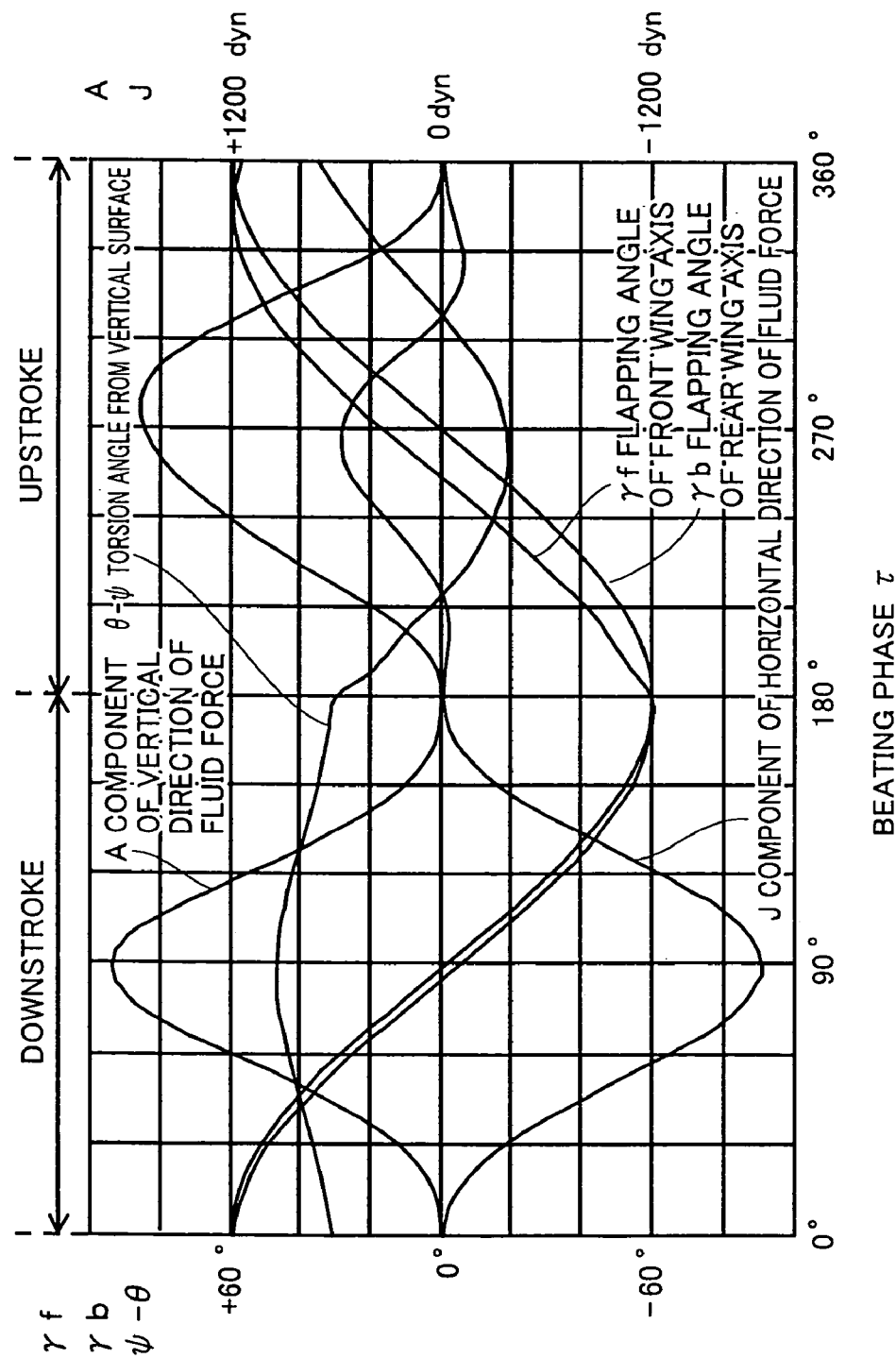
FIGS. 16 and 17 are first and second graphs, respectively, representing changes with respect to the phase of a fluttering motion for the force acting on the wing and respective angles in the first specific example.

Based on the foregoing, time change of the vertical component A and the horizontal component J together with the time change of angles are plotted in FIG. 16 as an example of flight control, where the length of the wing of the fluttering sensing robot l=4 cm, wing width w=1 cm, fluttering elevation θ=30°, fluttering angle γ=60°, fluttering frequency f=50 Hz, phase difference for the downstroke θ↓=4° and phase difference for the upstroke θ↑=16°.

The abscissa represents the time corresponding to one period, as phase τ. The former half represents a downstroke and the latter half represents an upstroke. Curves of the graphs represent changes with time of fluttering angle γ f of the front wing shaft, fluttering angle γ b of the rear wing shaft, torsion angle of the wing from a horizontal plane (θ−Φ), and vertical and horizontal components A and J of the fluid force.

In this example, vertical component A of the fluid force per unit time is larger in the downstroke than in the upstroke, and therefore, one wing provides vertically upward fluid force of about 500 dyn as an average for one period. Namely, if the weight of the fluttering sensing robot is about 1 g or smaller, it can be lifted by two wings. The horizontal component J of the fluid force per unit time is almost cancelled in one period, and hence, a fluttering sensing robot having the weight of about 1 g can hover.

Here, when the phase difference for the downstroke φ↓ is made larger or when the phase difference for the upstroke φ↑ is made smaller, the apparatus can move forward. At this time, for horizontal forward movement, it is desired that the frequency f be reduced slightly. On the contrary, when the phase difference for the downstroke φ↓ is made smaller or the phase difference for the upstroke φ↑ is made larger, the apparatus can move backward. For horizontal backward movement, it is desired that the frequency f be increased slightly.

When the phase difference for the upstroke φ↑ is kept at 16° while the phase difference for the downstroke φ↓ is enlarged to 7°, or when the phase difference for the downstroke φ↓ is kept at 4° while the phase difference for the upstroke φ↑ is made smaller to 11° with the fluttering frequency f decreased to f=48 Hz, the fluttering sensing robot can move horizontally forward at the speed of 1 m in the initial 1 second.

When the phase difference for the upstroke φ↑ is kept at 16° and the phase difference for the downstroke φ↓ is made smaller to 1°, or when the phase difference for the downstroke φ↓ is kept at 4° while the phase difference for the upstroke φ↑ is enlarged to 24° with the fluttering frequency f increased to f=54 Hz, the robot can move horizontally backward at the speed of about 1 m for the initial 1 second.

In order to raise or lower the fluttering apparatus in the hovering state, the frequency f may be increased or decreased. During horizontal flight, upward movement and downward movement can be controlled mainly by the frequency f. By increasing the frequency f, the fluttering sensing robot moves upward, and by lowering frequency f, the fluttering sensing robot moves downward.

In the present example, the torsion angle Φ of the wing is slowly changed during an upstroke or a downstroke, in order to reduce load on the actuator. As the fluttering motion to obtain buoyancy, the torsion angle Φ may be set at a predetermined value during an upstroke or downstroke and the torsion angle Φ may be abruptly changed at the transition point from a downstroke to an upstroke or from an upstroke to the downstroke.

Figure 17:
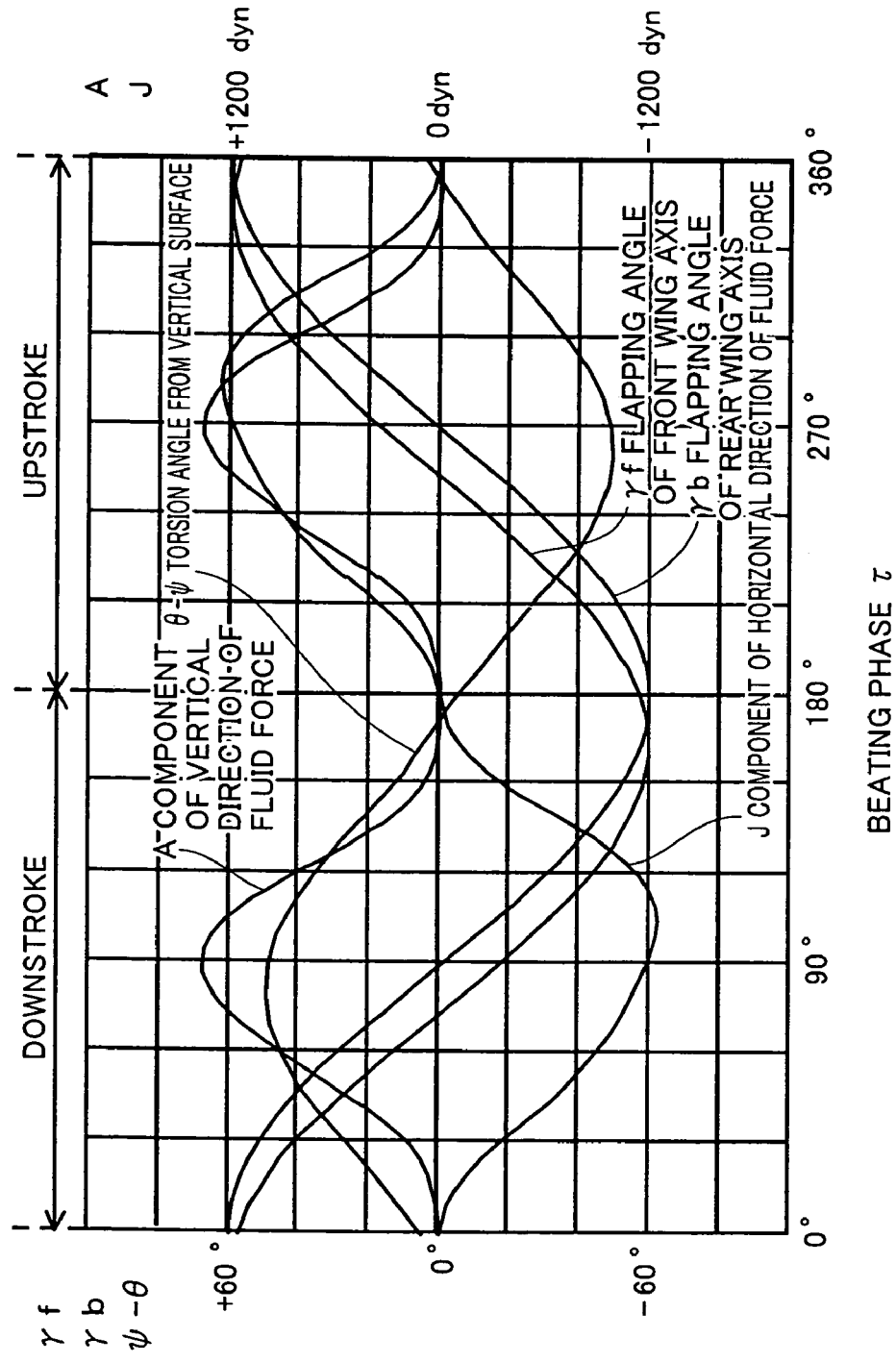

FIG. 17 shows change with time of the vertical component A and horizontal component J together with the change with time of the angles, where fluttering elevation θ=0°. This example shows a fluttering motion conceived from the hovering of a humming bird. Steering to the left or to the right may be realized by generating a difference in thrust of left and right wings, if it is possible to separately control fluttering motions of the left and right wings. For example, when the apparatus is flying forward and is to be turned to the right, the fluttering angle γ of the right wing should be made smaller than that of the left wing, or phase difference between the front wing shaft and the rear wing shaft of the right wing is made larger than that of the left wing, or alternatively, the fluttering elevation θ of the right wing should be made smaller than the left wing, if the fluttering elevation θ is controllable. Thus, the thrust of the right wing becomes lower relative to the thrust of the left wing, and hence the robot can turn to the right. When the fluttering sensing robot is to be turned to the left, the control is opposite.

When separate control of the left and right wings is not possible as in the fluttering sensing robot shown in FIG. 14, a center of gravity control portion 707 that is mounted in the fluttering apparatus shown in FIG. 15 may be mounted in the present fluttering sensing robot so as to shift the center of gravity of the fluttering sensing robot to the left or to the right, to enable turning to the left or to the right.

For example, by shifting the center of gravity to the right, inclining the right wing downward and the left wing upward, and by increasing the frequency f, the fluttering sensing robot can turn to the right. By shifting the center of gravity to the left and by increasing the frequency f in the similar manner, the fluttering sensing robot can turn to the left. This method is also applicable when separate control of the two wings is allowed. In any type of the fluttering sensing robot, it is desired that fluttering frequency f for the left be set to the same value as the fluttering frequency f for the right, so as to keep stable the attitude of the robot.

The above description is based on the case where the plane of the reciprocation of front and rear wing shafts 103 and 104 is orthogonal to rotational axis 800. In this case, the planes are parallel to each other. As shown in FIG. 15, the plane of reciprocation of front wing shaft 712 and the plane of reciprocation of rear wing shaft 713 may be angled. This is advantageous in that the change of the wing torsion angle Φ from a positive value to a negative value or from a negative value to a positive value in the transition from an upstroke motion to a downstroke motion or from a downstroke motion to an upstroke motion is speeded by virtue of the elasticity of front (rear) wing shafts 712 and 713 and the tension of wing film 714.

Figures 40, 41:
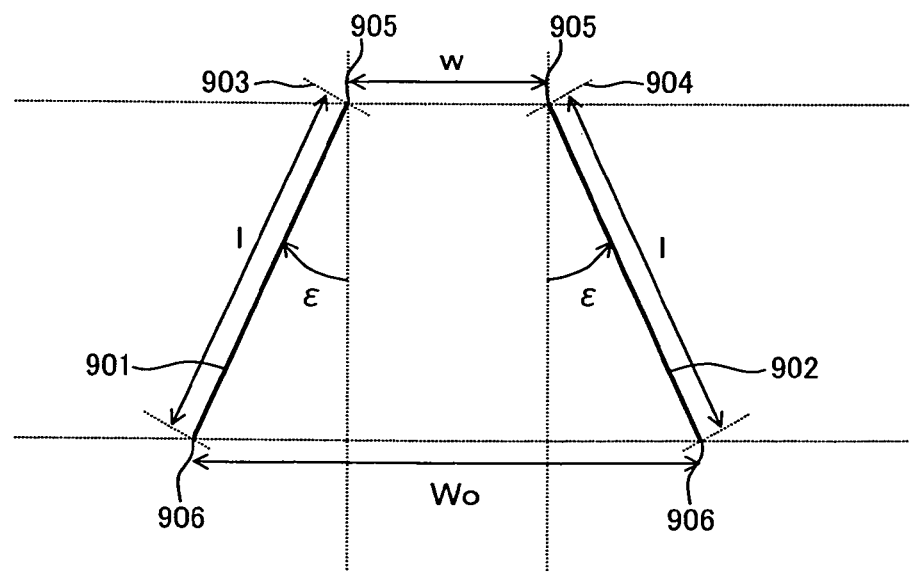
FIG. 40 is a table representing correspondence of the pattern in the manner of fluttering to realize the basic motion of a fluttering lift.
FIG. 41 represents the relationship between two wing shafts when the tip direction of a front wing shaft and a rear wing shaft are inclined outwards by an angle $\epsilon$ from a position parallel to each other.

FIG. 41 shows the relationship between two wing shafts in the case where the direction of the leading edges of the front and rear wing shafts are directed outwards by angle ε from the position parallel to each other.

Referring to FIG. 41, the distance Wo between the leading edges 906 of the wing shafts with wing torsion angle Φ=0° (γf=γb) exhibits the largest value when ε satisfies the expression of:

$$\sin \epsilon > \{(w^2 + 8 \cdot l^2)^{1/2} - w\}/4 \cdot l$$

where w is the width of root 905 of the wing shaft, and the l is the length of the wing shaft. Therefore, the elasticity of the wing shaft and the tension of the wing film exhibit maximum values thereat. The state of |Φ|>0 offers stability. Also, the change of torsion angle Φ can be increased in speed.

The value of ε satisfying the above expression is ε>30° when the wing aspect ratio Ap (l/w)=1, and ε>17.2° when Ap=4, and ε>11.5° when Ap=10.

By adding the degree of freedom of front (rear) wing shafts 712 and 713 rotatable about the axis, rotation is allowed with the portion of wing film 714 fixed to front (rear) wing shafts 712 and 713 substantially facing each other, even if the position relationship between front (rear) wing shafts 712 and 713 is altered. Accordingly, the load on actuator 706 can be alleviated to allow efficient control.

Second Specific Example of Fluttering Apparatus

A second specific example of a fluttering apparatus of the present embodiment will be described hereinafter. Likewise the first specific example, the force the wing receives from the fluid is referred to as fluid force. For the sake of simplification, description is provided based on the state where air flow occurs by only the wing fluttering, i.e., a no-wind state.

(Main Configuration)

First, the main configuration of the fluttering apparatus in accordance with the second specific example will be described. As shown in FIG. 18, a right actuator 21 and a left actuator 22 are fixed on an upper portion of support structure 1. A right wing 31 is attached to right actuator 21, and a left wing 32 is attached to left actuator 22.

Actuators 21 and 22 allow wings 31 and 32 respectively attached thereto to rotate with three degrees of freedom, approximately about the fulcrum of the actuators. Rotation of each of the actuators 21 and 22 is controlled by a control apparatus 4 mounted on support structure 1.

It is preferred that support structure 1 is sufficiently light in weight, while assuring mechanical strength. Polyethylene terephthalate (PET) molded to substantially a spherical shell shape is employed for support structure 1 of the fluttering apparatus.

An acceleration sensor 51 and an angular acceleration sensor 52 are incorporated in support structure 1. Detected results of these sensors 51 and 52 are delivered to control apparatus 4. Control apparatus 4 senses the lifted state of the fluttering apparatus by the information sent from acceleration sensor 51 and angular acceleration sensor 52. At control apparatus 4, the drive of left and right actuators 21 and 22 is determined based on the target position and posture at that time.

Left and right actuators 21 and 22, control apparatus 4, acceleration sensor 51 and angular acceleration sensor 52 are driven by the current supplied to power source 6. The center of gravity of the fluttering apparatus is located lower than the point of action on the actuator of the force the wing receives by the fluid.

(Actuator)

For actuators 21 and 22, a piezo-electric element (piezo element) is preferably employed in view of its large torque, reliable reciprocating operation, and simple structure. Such an actuator is referred to as an ultrasonic motor, driven by progressive waves generated by the piezo-electric element.

Figure 19:
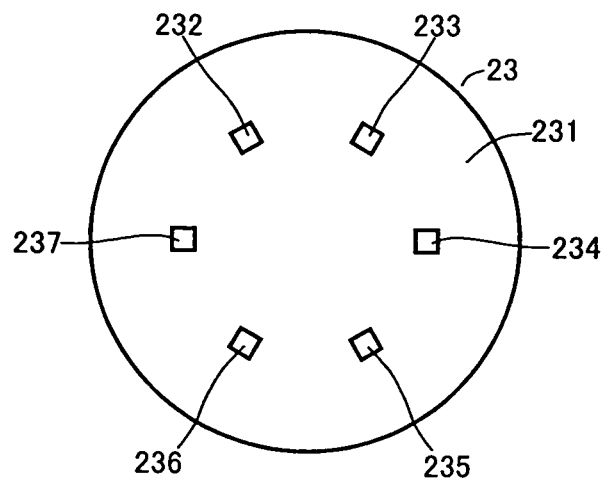
FIGS. 19 and 20 are a plan view and a side view, respectively, of an ultrasonic motor to describe an actuator employed in the fluttering apparatus of the second specific example.
Figure 20:
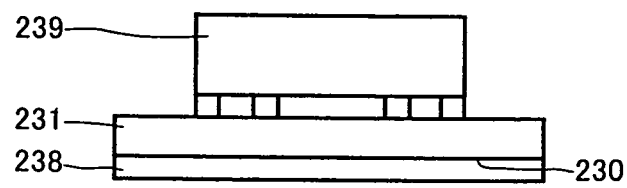

FIGS. 19 and 20 represent a commercially available ultrasonic motor 23. As shown in FIGS. 19 and 20, a piezo-electric element 230 is attached at the lower surface of an aluminum disc 231. A plurality of projections 232-237 are provided at the top plane of disc 231. Each of projections 232-237 is located at respective apexes of a regular hexagon with the center of disc 231 as the center of gravity.

Figure 21:
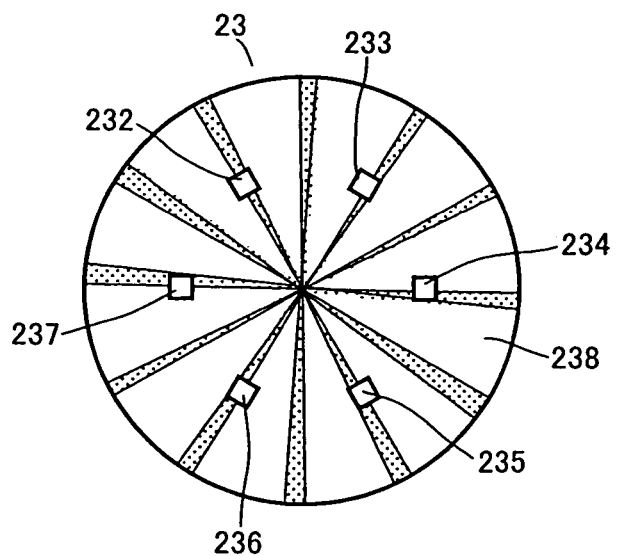
FIG. 21 is a diagram to describe the operation of the ultrasonic motor shown in FIGS. 19 and 20 of the second specific example.

At the lower surface of piezo-electric element 230 is arranged an electrode 238 divided into 12 along the circumferential direction. Every other one electrode is short-circuited. A voltage is applied to each electrode, with disc 231 being the reference. Thus, as shown in FIG. 21, voltages of two different phases, the hatched portion and the non-hatched portion, are applied to piezo-electric element 230.

A progressive wave is generated on disc 231 by altering the voltage applied to each electrode over time, whereby the tip end portions of projections 232-237 exhibit an elliptic motion. Accordingly, rotor 239 can be driven. The stator of the ultrasonic motor is constituted as described above.

The ultrasonic motor 23 has the torque of 1.0 gf·cm, rotation speed with no-load of 800 rpm and maximum current consumption of 20 mA. The diameter of disc 231 is 8 mm. Projections 232 to 237 are arranged at an interval of 2 mm. The thickness of disc 232 is 0.4 mm. The height of projections 232 to 237 is about 0.4 mm. The driving frequency of piezo-electric element 230 is 341 kHz.

Figure 22:
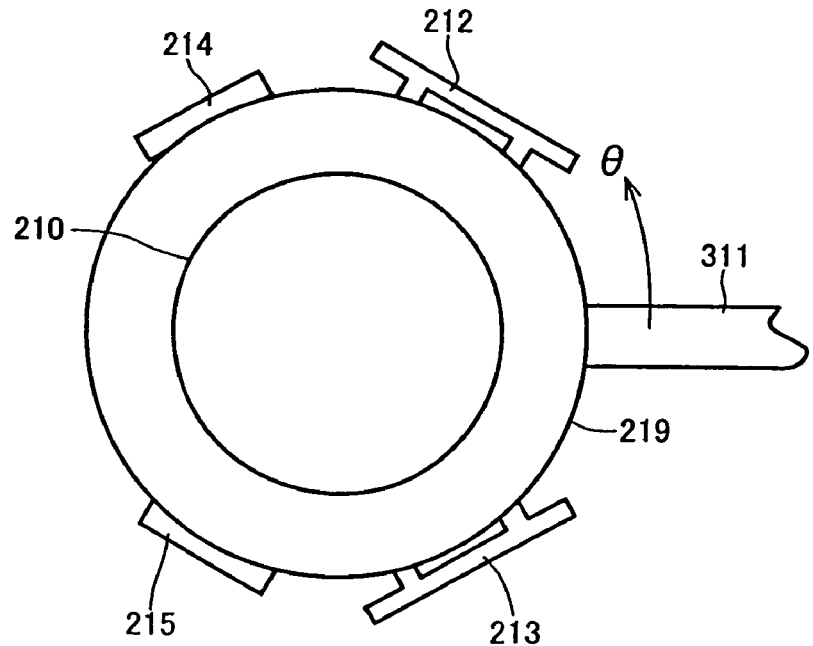
FIGS. 22 and 23 are first and second diagrams, respectively, to describe a structure of the actuator employed in the fluttering apparatus of the second specific example.
Figure 23:
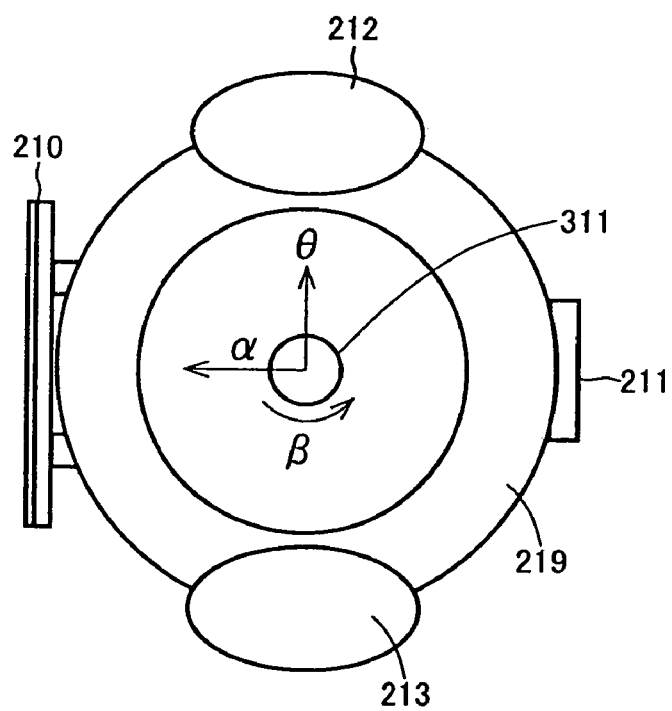

In this fluttering apparatus, an actuator utilizing this stator portion is used. As shown in FIGS. 22 and 23, right actuator 21 has the spherical rotor 219 located between a bearing 211 and a stator 210. The portion of stator 210 which is in contact with rotor 219 is worked to conform to the surface of rotor 219.

Rotor 219 is of a spherical shape having an outer diameter of 3.1 mm and an inner diameter of 2.9 mm, and right wing main shaft 311 is attached to the surface thereof. When an operation is performed to convey rotor 219 clockwise to the surface of stator 210 which has the projections thereof, the main shaft 311 of the right wing moves in the direction θ shown in FIG. 23. The clockwise rotation towards the plane where the projections of stator 210 are provided is referred to as forward rotation, whereas the counterclockwise rotation is referred to as backward rotation.

In order to drive rotor 219 with three degrees of freedom, an upper auxiliary stator 212, a lower auxiliary stator 213 and bearings 214 and 215 are further arranged as shown in FIGS. 22 and 23. The size of each auxiliary stator is about 0.7 times that of stator 210.

Although each of stators 210, 212, and 213 is not disposed orthogonal with each other about rotor 219, mutually independent rotations can be applied to rotor 219 by each of stators 210, 212, and 213. Therefore, by the combination of these motions, rotor 219 can be driven with three degrees of freedom.

For example, by causing forward rotation of rotor 219 by upper auxiliary stator 212 and generating forward rotation by lower auxiliary stator 212, rotor 219 can be rotated in the direction β. Also, by causing backward rotation of rotor 219 by upper auxiliary stator 212 and forward rotation by lower auxiliary stator 212, rotor 219 can be rotated in the direction α.

In practice as to driving, combining two rotations based on different centers of rotation will lower the efficiency of the ultrasonic motor, because of friction. Therefore, it is desirable to adopt such a method of driving that the upper auxiliary stator 212 and the lower auxiliary stator 213 are operated alternately in a very short period, while the projection of the stator which is not in operation is inhibited from forming contact with rotor 219.

This can be attained readily without the necessity of adding any element, by applying a voltage to every electrode of the stator, in the direction of contraction of the piezo-electric element.

The driving frequency of the piezo-electric element is at least 300 kHz. This is sufficiently higher than the fluttering frequency which is, at most, about 100 Hz. Therefore, even when actuators are operated alternately, substantially smooth motion can be generated through the main shaft 311 of the right wing.

The above-described stator of the actuator is already realized and available. As to bearings employed in the actuator, those already available in the field of compact information equipment such as a disc drive, or in the field of space equipment in view of their weight can be applied to the fluttering apparatus of the present invention.

Since the amplitude of the progressive wave generated by the stator is in the order of submicrons, it is necessary that the rotor has sphericity of this order. The machining accuracy of a paraboloidal mirror used in optical products for consumer use is approximately ⅛ the optical wavelength, i.e., not more than 70 nm for optical products employed in the visible range. Also, the machining accuracy of optical components used for an optical interferometer is approximately 1/100 the optical wavelength, i.e. the order of several nm. Therefore, a rotor having the sphericity of such submicron order can be formed by the currently available machining methods.

Thus, an actuator having characteristics equal to those of a commercially available ultrasonic motor, and that can provide the motion with three degrees of freedom is implemented. It should be understood that such an actuator realizing motion with three degrees of the freedom of the wing implemented by an ultrasonic motor is only a way of example. The arrangement, size, material and driving method of respective components of the fluttering apparatus are not limited to those described above, provided that physical functions such as the torque required for a fluttering flight can be realized.

(Wing and Its Operation)

The wing and its operation will be described in the following. For simplicity of description, a coordinate system corresponding to a fluttering apparatus is defined as shown in FIG. 18. First, approximately the center of support structure 1 is regarded as the origin. The direction of gravitational acceleration is regarded as the downward direction, and the opposite is regarded as the upward direction. The z axis is defined as extending from the origin to the upward direction. Next, the direction coupling the center of the shape of right actuator 21 and the center of the shape of left actuator 22 is regarded as the left/right direction. The y axis is defined as extending from the origin to the left wing. Further, the x axis is defined as extending in the direction of vector product, in the right hand system of the y and z axes from the origin. The positive direction along this axis will be referred to as forward, and the opposite direction will be referred to as backward.

In the fluttering sensing robot shown in FIG. 18, the center of gravity O is positioned on a line extending downward along the direction of gravitational acceleration from a midpoint A0 between the point of application A1 of right actuator 21 of right wing 31 and point of application A2 of left actuator 22 of left wing 32.

In this fluttering robot, a rotor 229 of left actuator 22 is approximately spherical, and left wing 32 is arranged such that the center of the sphere of this rotor 229 is positioned on a line extended from main shaft 321. The point of application A2 of left actuator 22 and the fulcrum of rotating motion of main shaft 321 correspond to the spherical center. The same applies to right actuator 21.

In the following, it is assumed that the x, y and z axes described above constitute a unique coordinate system of the fluttering apparatus fixed on support structure 1.

Relative to the coordinate system fixed for fluttering robot x', y' and z' axes are defined as space coordinates fixed in the space and having an arbitrary point as the origin. Thus, the coordinates of the space in which the fluttering robot moves can be represented by the coordinates of x', y' and z' axes, respectively, while the coordinates unique to the fluttering apparatus can be represented by the coordinates of x, y and z axes, respectively.

Figure 24:
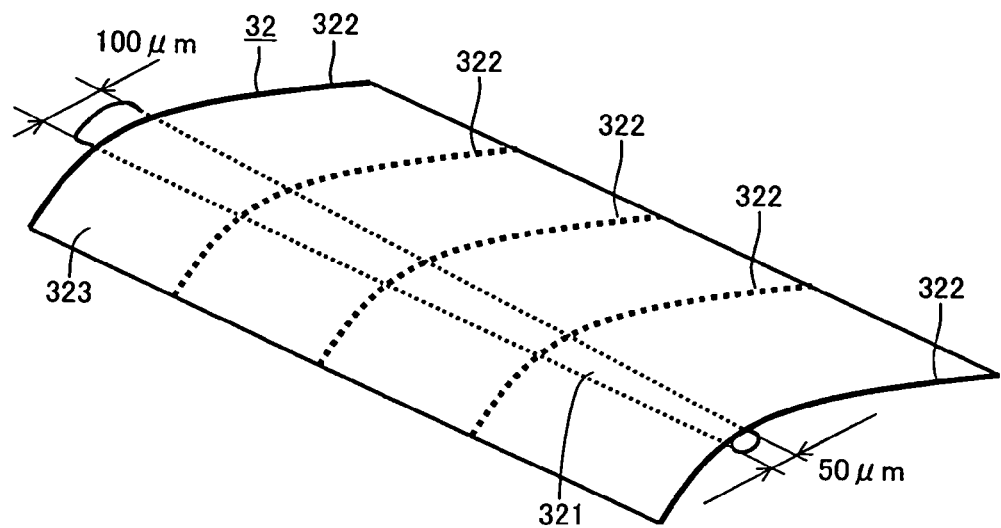
FIG. 24 is an enlarged perspective view of a wing in the second specific example.

The wing structure will be described in the following. Left wing 32, for example, is formed by spreading a film 323 over a support member having a main shaft 321 and branches 322, as shown in FIG. 24. Main shaft 321 is arranged at a position closer to the front of left wing 32. Branches 322 are bent downward as a function of approaching the tip end portions.

Left wing 32 has a convex cross sectional shape. Thus, high stiffness is obtained against the force exerted by the fluid especially in a downstroke. In order to reduce weight, main shaft 321 and branches 322 have a hollow structure, and are formed of carbon graphite. Film 323 has initial stress in a direction of contraction in its plane, so as to enhance stiffness of the entire wing.

The diameter of main shaft 321 of the wing used for the experiment by the inventors was 100 μm at the root supported by support structure 1 and 50 μm at the tip end, and the main shaft 321 is tapered, made thinner from the root to the tip end portion. Film 323 is of polyimide, of which size is about 1 cm in the forward/backward direction, about 4 cm in the left/right direction, and the thickness was about 2 μm;

In left wing 32 shown in FIG. 24, main shaft 321 is enlarged in its thickness, for easier description. The right wing 31, not shown, is attached to the support structure to be mirror-symmetry with the left wing 32, with the xz plane at the center.

The operation of the wing will be described with reference to the left wing 32 as an example.

Left actuator 22 is capable of rotating left wing 32 with three degrees of freedom. Namely, the state of driving of left wing 32 can be represented as the attitude of left wing 32. For the simplicity of description, in the following, the attitude of left wing 32 will be defined as follows, based on the state shown in FIG. 18.

Figure 25:
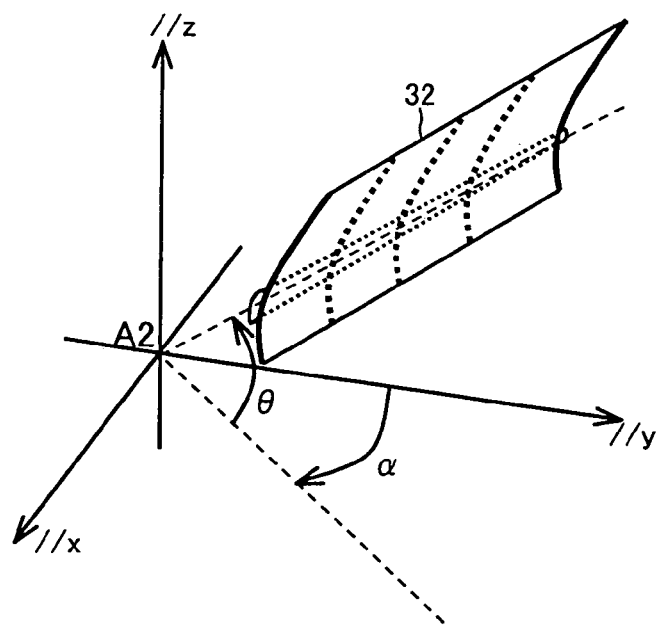
FIG. 25 represents a stroke angle $\theta$ and declination $\alpha$.

First, referring to FIG. 25, using a plane parallel to the xy plane and including a fulcrum of rotational motion of the main shaft (mechanical point of application A2) and axes (//x, //y) parallel to the x and y axes, respectively, as a reference, an angle formed by a line connecting the point A2 and the root of main shaft 321 of left wing 32 with that plane is referred to as a stroke angle θ of fluttering. Further, using a plane parallel to the yz plane and including a fulcrum of the rotational motion of the main shaft (mechanical point of application A2) and axes (//y, //z) parallel to the y and z axes, respectively, as a reference, an angle formed by a line connecting the point A2 and the root of main shaft 321 of the left wing 32 and that plane is referred to as declination α.

At this stage, the stroke angle θ is considered positive when it is above the plane parallel to the xy plane, and negative when it is below that plane. The declination α is considered positive when it is in front of the plane parallel to the yz plane and negative when it is behind.

Figure 26:
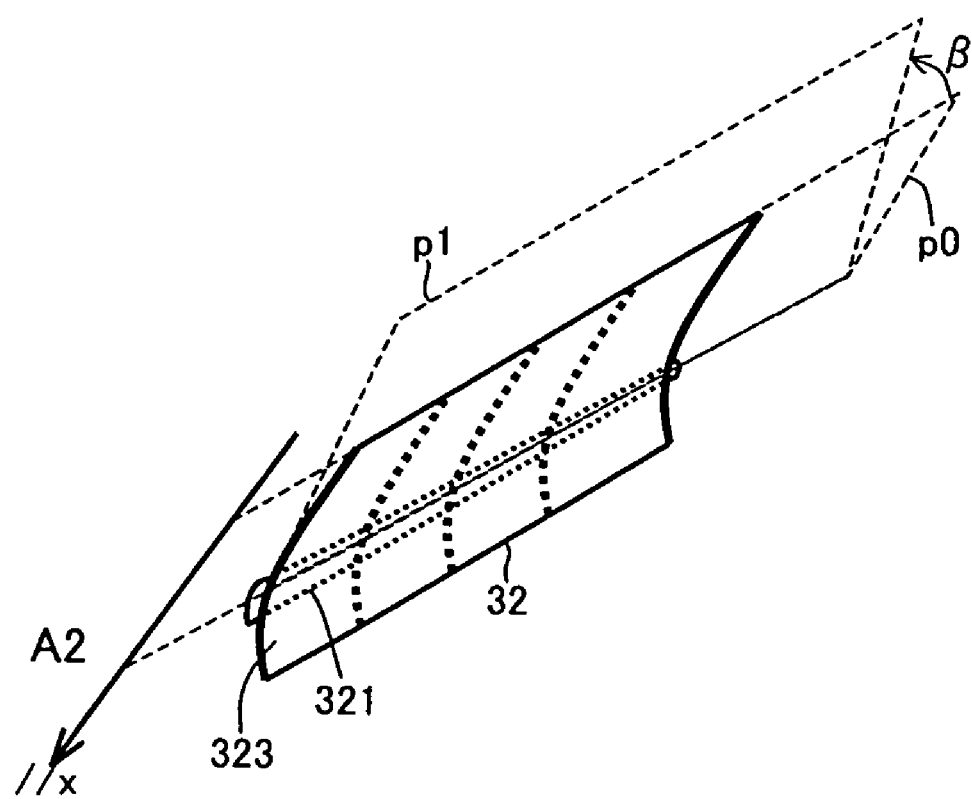
FIG. 26 shows a torsion angle $\beta$ of the second specific example.

Referring to FIG. 26, an angle formed by a tangential plane p1 of film 323 at the root of main shaft 321 of left wing 32 with a plane p0 passing through the point A2 and including the axis (//x) parallel to the x axis and the main shaft 321 is referred to as torsion angle β. Here, the torsion angle β in the clockwise direction when viewed from the root to the tip end of main shaft 321 is considered positive.

(Method of Flight)

The method of flight will be described hereinafter. For the sake of simplification, it is assumed that the external force acting on the fluttering apparatus is only the fluid force received by the wing from the fluid and the gravity (the product of the mass of the fluttering apparatus and the gravitational acceleration) acting on the fluttering apparatus. For the fluttering apparatus to be lifted constantly, the following relation must be satisfied in time average during one fluttering operation:

(Vertically Upward Fluid Forces Acting on the Wing)
>(Gravity Acting on the Fluttering Apparatus).

Here, a method by which the fluid force in a downstroke is made larger than the fluid force in an upstroke will be described, which method corresponds to a simplified manner of fluttering of an insect. For simplicity of description, the behavior of the fluid or the force of the fluid on wing will be described with reference to main components thereof. The magnitude of the buoyancy force obtained by the fluttering and the gravity acting on the fluttering apparatus will be described later.

On the wing, fluid force in the direction opposite to the direction of motion of the wing acts. Therefore, in a downstroke of the wing, fluid force acts upward on the wing, and in an upstroke, fluid force acts downward on the wing. Therefore, an upward fluid force can be obtained by time average in one fluttering operation (downstroke and upstroke), when fluid force for the downstroke is made larger and the fluid force for the upstroke, is made smaller.

For this purpose, the downstroke should be such that the volume of a space in which the wing moves is maximized, so that almost maximum fluid force acts on the wing. This corresponds to downstroke of the wing approximately vertical to the tangential plane of the wing. For the upstroke, the wing should be moved upward such that the volume of the space in which the wing moves is minimized, so that the fluid force acting on the wing is almost minimized. This corresponds to upstroke of the wing approximately along the curve of wing cross section.

Figure 27:
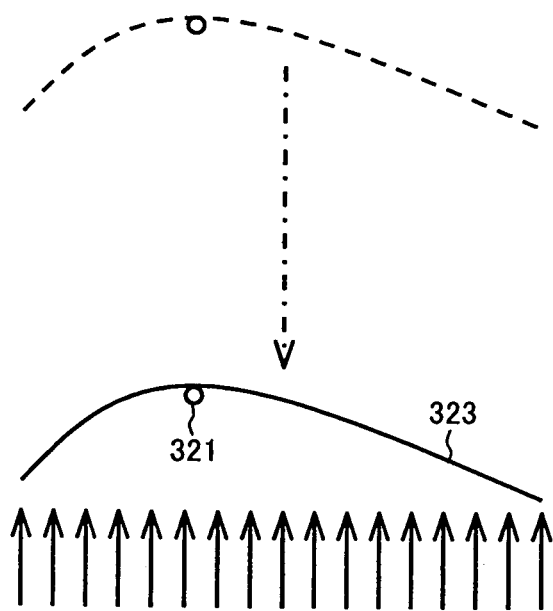
FIGS. 27 and 28 represent a downstroke motion and upstroke motion of the fluttering apparatus of the second specific example.

Such operation of the wing will be described with reference to a cross section vertical to the main shaft 321 of the wing. FIG. 27 shows a downstroke made to maximize the volume of the space in which the wing moves and FIG. 28 shows an upstroke made to minimize the volume of the space in which the wing moves.

Figure 28:
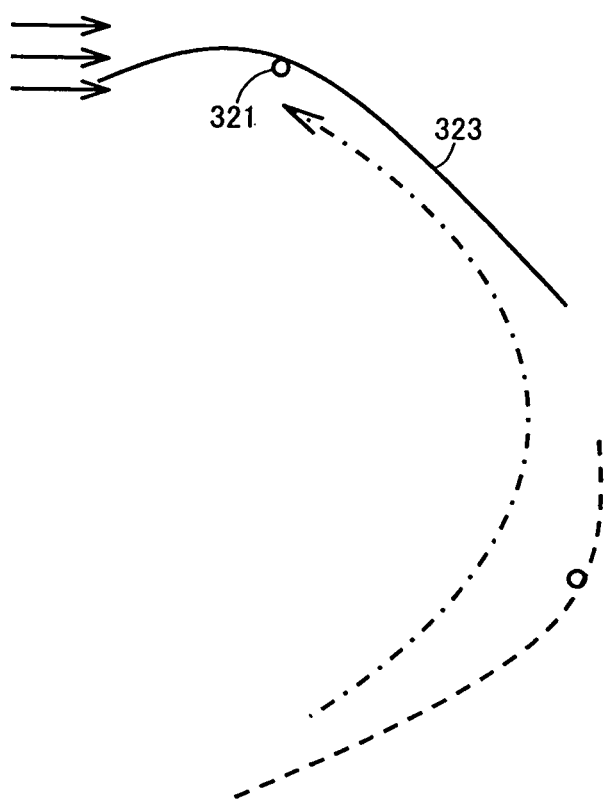

In FIGS. 27 and 28, the position of the wing before movement is represented by a dotted line, and the position of the wing after movement is represented by the solid line. Further, the direction of movement of the wing is represented by a chain dotted arrow. Further, the direction of the fluid force acting on the wing is represented by solid arrows. As can be seen in the figures, the fluid force acts on the wing in the direction opposite to the direction of movement of the wing.

In this manner, the attitude of the wing is changed relative to the direction of movement of the wing such that the volume of the space in which the wing moves in the upstroke is made larger than the volume of the space in which the wing moves in the downstroke, whereby the upward fluid force acting on the wing can be made larger than the gravity acting on the fluttering apparatus in time average of one fluttering operation.

In the fluttering robot, torsion angle $\beta$ can be controlled, and the above described wing motion is realized by changing with time the torsion angle.

Figure 29:
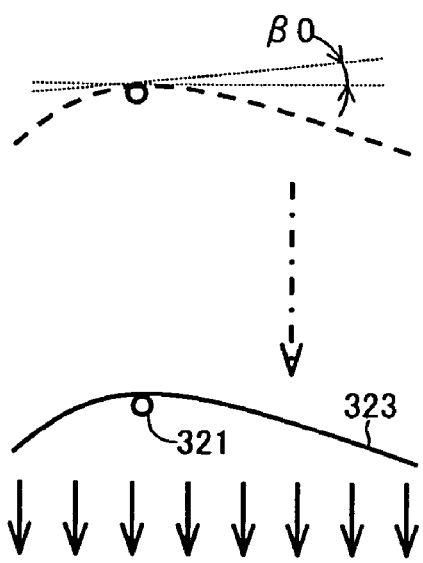
FIGS. 29-32 represent first to fourth states, respectively, of a fluttering motion of the fluttering apparatus of the second specific example.
Figure 30:
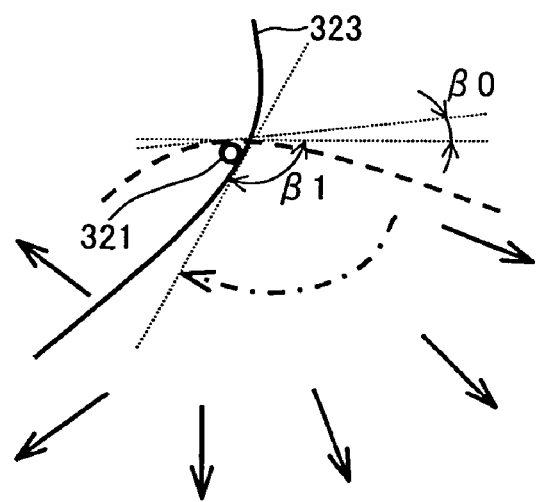
Figure 31:
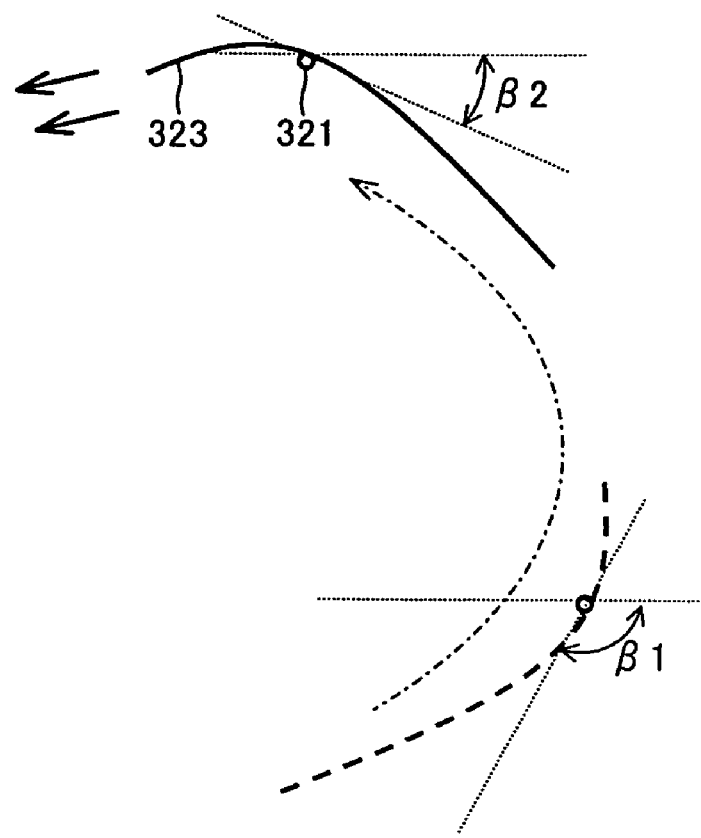

More specifically, the following steps S1 to S4 are repeated. First, in step S1, the wing is moved downward as shown in FIG. 29 (stroke angle $\theta=+\theta_0 \to -\theta_0$). In step S2, the wing rotation 1 operation (torsion angle $\beta$ of the wing=$\beta_0 \to \beta_1$) is performed as shown in FIG. 30. In step S3, the wing is moved upward as shown in FIG. 31 (stroke angle $\theta=-\theta_0 \to +\theta_0$, torsion angle $\beta=\beta_1 \to \beta_2$ (a motion along the curve of the wing cross section so as to maintain the fluid force minimum)). In step S4, wing rotation 2 operation (torsion angle $\beta$ of the wing=$\beta_2 \to \beta_0$) is performed as shown in FIG. 32.

When the fluid forces acting on the wing in steps S1 and S3 are time-averaged, the upward fluid force becomes greater than the gravity acting on the fluttering apparatus. It is desired that time-average of the fluid forces acting on the wing in steps S2 and S4 results in upward fluid force.

Figure 32:
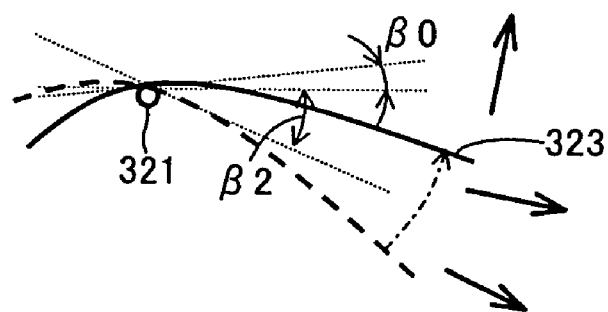

In the fluttering apparatus, the center of rotation of the wing (the portion of main shaft 321) is positioned near a front edge of the wing, as shown in FIGS. 29 to 32. More specifically, the length from main shaft 321 to the rear edge of the wing is longer than the length from main shaft 321 to the front edge of the wing. Therefore, as shown in FIGS. 30 to 32, in the rotating operation of the wing, in addition to the flow of the fluid generated along the direction of rotation of the wing, a flow of the fluid is generated along the direction from the main shaft 321 to the rear edge of the wing.

As a reaction of such flows of the fluid, forces opposite in direction to these flows act on the wing as a result, therefore in step S2 shown in FIG. 30, substantially upward fluid force is applied to the wing, and in step S4 shown in FIG. 32, mainly downward fluid force is applied to the wing.

In step S3 shown in FIG. 31, an upstroke is made with the torsion angle $\beta$ changed from $\beta_1$ to $\beta_2$ along the curve of the wing cross section. The angle of rotation of the wing in step S2 shown in FIG. 30 is larger than the angle of rotation of the wing in step S4 shown in FIG. 32. Therefore, in steps S2 and S4 also, the fluid force acting upward on the wing becomes stronger than the fluid force acting downward, and by time average, an upward fluid force acts on the wing.

In FIGS. 29 to 32, the attitude of the wing before movement in respective steps 1 to S4 is represented by the dotted line and the attitude after movement is represented by the solid line. The direction of movement of the wing in respective steps S1 to S4 is represented by the chain dotted arrow. The flow of fluid mainly generated in steps S1 to S4 is represented by solid arrows.

Figure 33:
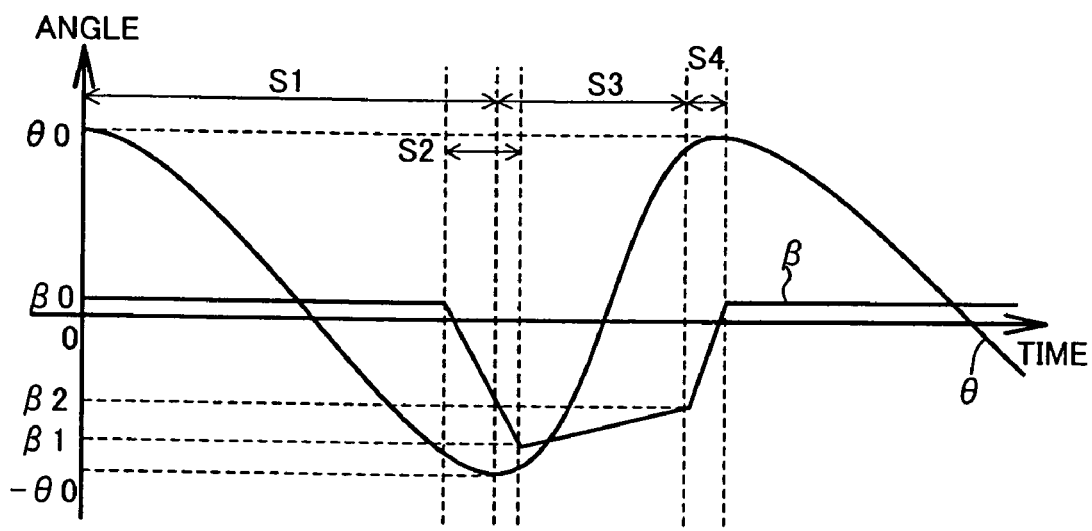
FIGS. 33 and 34 are first and second graphs, respectively, showing time dependency of stroke angle $\theta$ and torsion angle $\beta$.

FIG. 33 is a graph representing the values of stroke angle $\theta$ and torsion angle $\beta$ as functions of time. In FIG. 33, it is noted that the ratios of the ordinates for the stroke angle $\theta$ and torsion angle $\beta$ are different.

In the experiment performed by the inventors, $\theta_0$ is, for example, 60°. The value $\beta_0$ is, for example, 0°, $\beta_1$ is $-120°$ and $\beta_2$ is $-70°$.

In the description, steps S1 to S4 are described as independent operations, for simplicity of description. An operation, however, is also possible in which the torsion angle of the wing is enlarged while the wing is moved downward in step S1. Further, the example described above comes from primary approximation, and the method of fluttering that actually enables rising is not limited thereto.

Though description has been made with respect to the left wing, the same applies to the right wing, by defining the stroke angle $\theta$, declination $\alpha$ and torsion angle $\beta$ for the left hand system, which is in mirror-symmetry with respect to the xz plane. In the following, the upward fluid force acting on the wing will be referred to as buoyancy force, and a forward fluid force acting on the wing will be referred to as propulsion.

(Method of Control)

The method of control enabling arbitrary motion of the fluttering apparatus will be described next. Here, the stroke angle $\theta$, declination $\alpha$ and torsion angle $\beta$ based on the right hand system will be used for the left wing and the stroke angle $\theta$, declination $\alpha$ and torsion angle $\beta$ based on the left hand system in mirror symmetry with respect to the xz plane are used for the right wing, to represent the attitude of the wings.

(Control Flow)

The flying movement by fluttering is realized by the fluid force exerted on the wing. Therefore, what is directly controlled by the wing motion is acceleration and angular acceleration applied to the fluttering apparatus.

Figure 38:
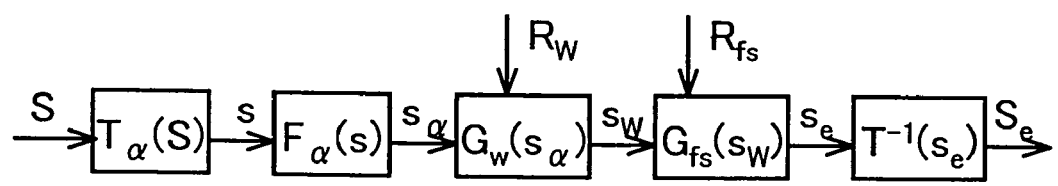
FIG. 38 is a diagram to describe the control function of fluttering lifting control.

First, the process through which an output Se is obtained from an input S is as shown in FIG. 38, where S represents difference between the target state of flight and the present state of flight, T(S) is a function representing conversion from the state of flight to acceleration and angular acceleration, s represents acceleration, angular acceleration Fα (s) represents a function of a control algorithm including sensor response of acceleration sensor 51 and angular acceleration sensor 53, sα represents actuator control amount, Gw (sα) is a function representing response of actuator and the wing, sw represents wing motion, $G_{fs}$ (sw) is a function representing acceleration or angular acceleration $s_e$ exerted on the fluttering apparatus by the wing motion, and Se represents change in the state of flight attained by the series of processes.

Actually, by the inertial force of the wing and the fluid, influences Rw and $R_{fs}$ that depend on time history of the wing motion and the fluid motion so far are added to Gw and $G_{fs}$.

(Division of Operation)

There is naturally a method of accurately calculating all functions other than Fα to calculate control algorithm Fα which realizes S=Se. For this method, time history of the fluid flow around the fluttering apparatus and the wing motion is necessary, which means that a formidable amount of data and high speed of arithmetic operation are necessary. The behavior resulting from the link between the fluid and the structure is so complicated that in most cases, the response would be chaotic, and hence such a method is impractical.

Therefore, a method in which basic operation patterns are prepared in advance, the target state of flight is divided and realized by time-sequentially combining the basic operation patterns is desired, as it is simple.

A motion of an object includes three translational degrees of freedom in x, y and z directions, and three rotational degrees of freedom in $\theta_x$, $\theta_y$ and $\theta_z$ directions, that is, 6 degrees of freedom. Namely, freedom in forward/backward directions, left/right directions and upward/downward directions as well as rotations in these directions.

Among these, the movement in left/right direction can be realized by combining rotation in the $\theta_z$ direction and movement in the forward/backward direction. Therefore, here, the method of realizing translational movement in the forward/backward direction, that is, along the x axis, translational operation in the upward/downward direction, that is, along the z direction and rotational operations about the x, y and z axes will be described.

(Operation)

(1) Operation in the upward/downward direction (along the z axis)

As the wing moves, the force exerted by the fluid on the wing depends on the speed of movement of the wing, and therefore, in order to increase (decrease) the upward fluid force acting on the wing, possible options include A: to increase (decrease) amplitude of stroke angle θ, and B: to increase (decrease) fluttering frequency.

By such operation, the fluttering apparatus may move upward (downward). Here, it is noted that the fluid force includes a negative value.

According to such approaches, the fluid force itself from the fluid to the wing increases. When there is any force exerted from a direction other than the upward/downward direction from the wing to the mechanical fulcrum of the wing as the fluid force is received by the wing from a direction other than the upward/downward direction, as the apparatus moves upward, the force acting on the fulcrum also increases in that direction. For example, when the apparatus is making a substantially uniform, forward linear motion and the fluttering frequency is increased, the fluttering apparatus moves upward with the velocity increased. In this manner, such a secondary motion occurs depending on the manner of fluttering at that time point. In the following, control from the hovering state will be described, unless stated otherwise.

Further, the buoyancy force changes when the volume of the space in which the wing moves is changed by changing the torsion angle β of the wing. For example, by setting an angle β such that the volume of the space in which the wing moves in an upstroke is larger or the volume of the space in which the wing moves in a downstroke is smaller, the time average of the upward fluid force acting on the wing becomes smaller.

Actually, the wing is not a rigid body and it deforms. Therefore, the volume of the space in which the wing moves differ even when the angle β is the same. According to the primary principle, the angle β which is vertical to the direction of movement of the wing provides the largest volume of the space in which the wing moves. Further, the angle β which is parallel to the direction of movement of the wing provides the smallest volume of the space in which the wing moves.

Here, secondary, the fluid force also acts in the direction vertical to the fluttering. If this action is of such a level that causes any problem in control, it becomes necessary to add wing motion that cancels such an action. It is realized, in the simplest manner, by changing the declination α.

It is also possible to perform the operation along the z axis by changing the rotational angular speed of the wing in the above described step S2 or S4. For example, when the rotational angular speed (−dβ/dt) of the wing is increased in step S2, downward flow rate of the fluid generated by the rotation increases, and by the reaction thereof, the upward fluid force acting on the wing increases.

Here, the torque of which axis of rotation is the main shaft of the wing, which acts on the fluttering apparatus, changes as a secondary result. Therefore, the change of the rotational angular speed should desirably be performed within such a range in that the change of the torque does not affect control.

Further, here the force in the forward/backward direction acting on the fluttering apparatus also changes as a secondary result. Therefore, if the change affects controlled flight, control of the force in the forward/backward direction should desirably be performed simultaneously, which will be discussed in item (2) below.

(2) Operation in the forward/backward direction (along the x axis)

In the above described method of fluttering, the fluid force in the x direction acts on the wing mainly in steps S2 and S4. Therefore, by such an operation of the wing, the apparatus rises while moving forward.

When the declination α is increased in a downstroke and the wing is moved forward, a backward fluid force will act on the wing. Therefore, when the backward fluid force acting on the wing in step S1 is made larger than the forward fluid force mainly in the steps S2 and S4, the apparatus moves backward, and when the backward fluid force is made smaller, the apparatus moves forward, by controlling declination α in step S1, that is, in the downstroke. When these two forces are substantially balanced, the apparatus can remain still in the forward/backward direction.

Especially, when the fluttering apparatus remains still in the forward/backward direction, the left and right wings perform substantially symmetrical motions and the gravity is balanced with the buoyancy force of the fluttering apparatus, hovering is possible.

As the vertical component of the fluid force acting on the wing changes as a secondary result of the change in declination α, it becomes necessary to add wing motion that cancels this component, if the component is of such a level that affects control. This is mainly performed, in a simple manner, by the operation in the upward/downward direction described in item (1) above.

Further, when the angular velocity of rotational operation of the wing is increased in steps S2 and S4 described above, forward fluid force increases, and when it is decreased, the fluid force decreases. Thus, operation in the forward/backward direction can be changed.

Further, it is possible to utilize the component in the x direction of the secondary fluid force associated with the change in torsion angle β of the wing described in item (1). More specifically, when β>0 in a downstroke, there is a forward force and when β<0, there is a backward force, on the apparatus.

Though the relation between each of β, α and θ in an upstroke is limited to some extent, the above described fluid force control is also possible in step S3.

(3) Rotational operation with z axis being the axis of rotation

By performing the control in the forward/backward direction described in item (2) separately for the left wing and the right wing to be different from each other, a torque can be applied to the fluttering apparatus.

More specifically, when the forward fluid force on the right wing is made higher than that of the left wing, the fluttering apparatus turns to the left with respect to the positive direction along the x axis, and when it is made lower, the apparatus turns to the right.

(4) Rotational operation with x axis being the axis of rotation

Similar to (3), when the upward fluid force of the right wing is increased to be larger than that of the left wing, the right side is lifted and when it is made smaller, the left side is lifted. Thus, rotational operation about the x axis as the axis of rotation is possible.

(5) Rotational operation with y axis being an axis of rotation

By changing the angular velocity of torsion angle β of the wing described in (2), the torque about the y axis acting on the fluttering apparatus can be changed. Thus, rotational operation about the y axis as the axis of rotation is possible. For example, when the rotational angular velocity of torsion angle β in step S1 is increased, the nose of the fluttering apparatus moves downward, and when it is decreased, the nose moves upward.

(6) Hovering (stay still in the air)

Figure 34:
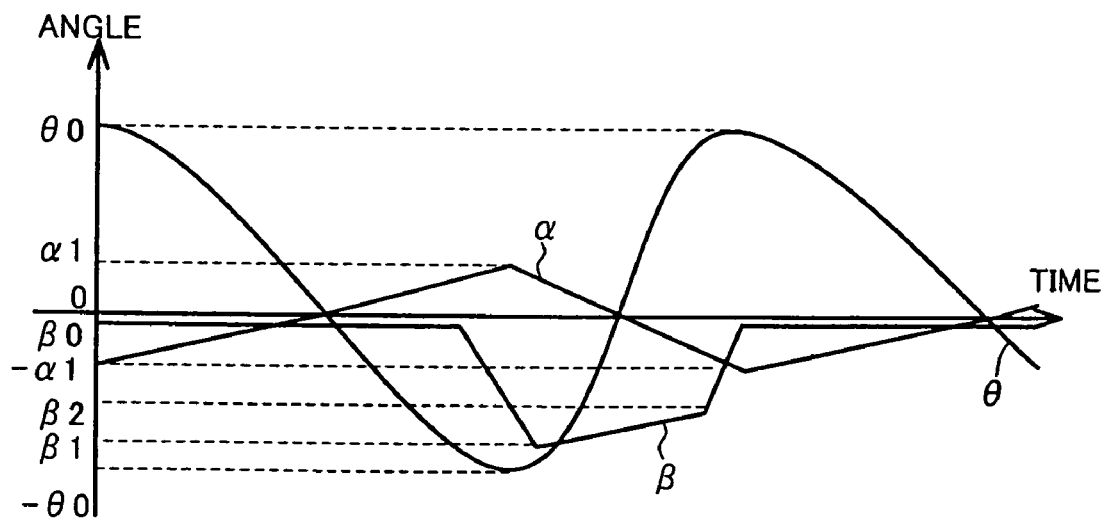

FIG. 34 is a graph representing the values of the stroke angle θ, declination α and torsion angle β when the fluttering apparatus is hovering, as functions of time. In FIG. 34, the ratio of the angles are different from that of the coordinate.

In the experiment performed by the inventors, by way of example, $\theta_0$ is 60°, $\beta_0$ is −10°, $\alpha_1$ is 30°, $\beta_1$ is −100° and $\beta_2$ is −60°.

FIG. 39 represents motions of the left wing in respective steps and acceleration and angular acceleration generated by the motions at the mechanical fulcrum A2 of the left wing. It is noted, however, that rotational operation about the x and z axes as axes of rotation discussed in (3) and (4) above are not shown. These operations are attained by asymmetrical motions of the left and right wings, as already described.

(Manner of Determining Control Method)

Figure 36:
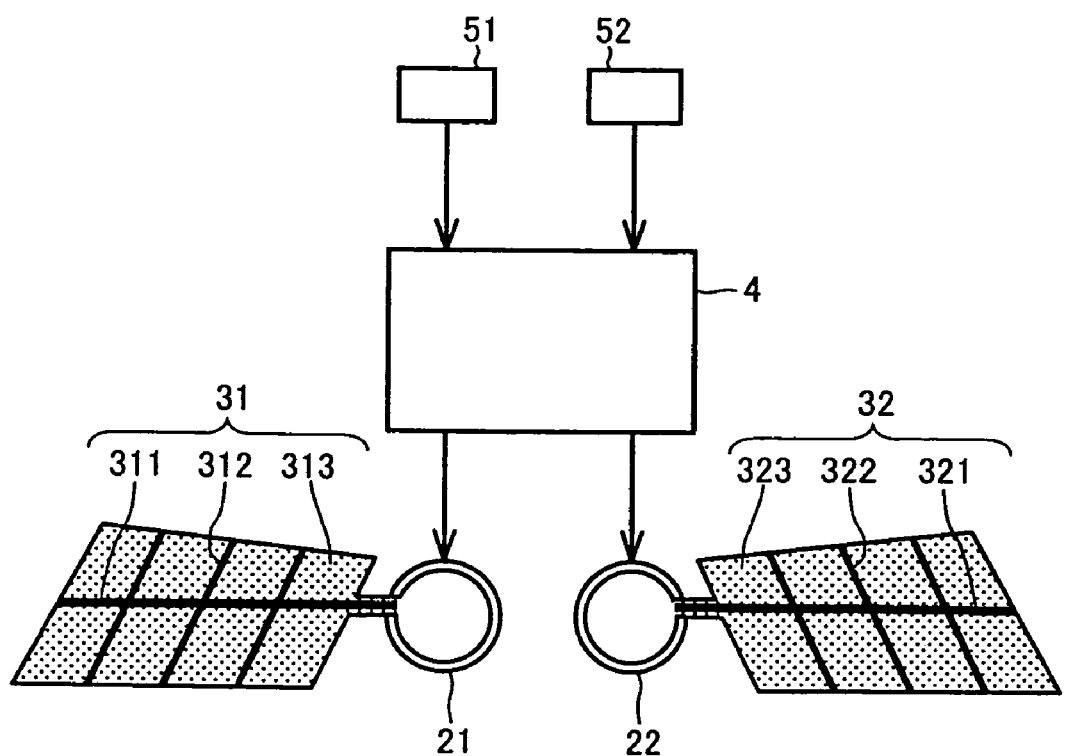
FIG. 36 is a block diagram of main components of the fluttering apparatus of the second specific example.

As shown in FIG. 36, the present status of flight is found by using values that are provided by appropriately changing the values obtained by acceleration sensor 51 or angular acceleration sensor 52 mounted on the fluttering apparatus. For example, the velocity can be calculated by applying an initial value of velocity to a value obtained by time-integration of acceleration. The position can be calculated by applying an initial value of position to the value obtained by time-integration of velocity. Further, it is also possible to use a method which includes time history of flying status, to find the status of flight.

Figure 35:
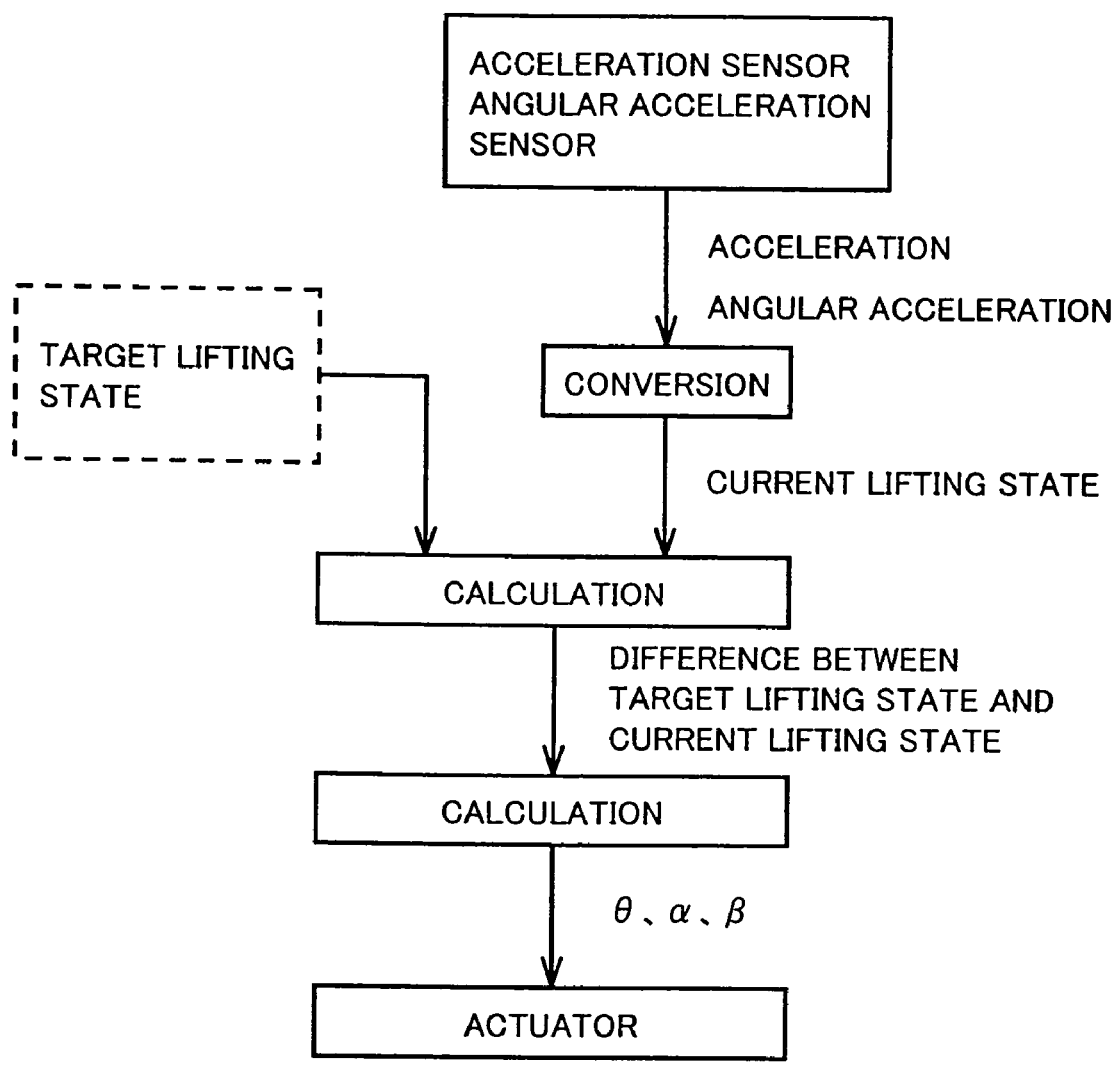
FIG. 35 is a flow chart of data flow in the fluttering apparatus of the second specific example.

As shown in FIG. 35, control apparatus 4 determines operation of the fluttering apparatus based on the current status of flight obtained from acceleration sensor 51 and angular acceleration sensor 52 and the target status of flight. Conventional control method is applicable to this control, provided that the present control is in three dimensions.

The operation of the fluttering apparatus is converted into actuator driving by control apparatus 4. This conversion may be realized at high speed by using table reference or complementation thereof. For example, basic operations and combinations of actuator drivings realizing the operations are prepared in advance, as shown in FIG. 40. In FIG. 40, the leftmost column represents target operation. Fluttering patterns A and B represent the pattern of fluttering for forward movement and for hovering, respectively, which are, more specifically, time-discrete time histories of α, β and θ represented in the graphs of FIGS. 33 and 34. Control apparatus 4 calculates the drive or the complemented drive from the table, based on the operation of fluttering apparatus.

Here, a method in which the operation of the fluttering apparatus is calculated and converted to actuator drive is used for convenience of description. It is also possible, however, to select driving of actuator directly from the status of flight.

For static control, for example, a method is possible in which of the actuator drives described above or complementation thereof may directly be calculated depending on the difference of the present status from the target status.

It is needless to say that physical amount representing the status of flight of the fluttering apparatus is not limited to the position, velocity, acceleration and the like mentioned above.

Further, the method of determining actuator drive is not limited to those described above.

(Weight that can be Lifted)

In the fluttering apparatus of the present invention, stator 210 is comparable to ultrasonic motor 23. Therefore, the torque with respect to the motion in θ direction is 1.0 gf·cm. Therefore, the inventors calculated, through simulation, the fluid force when the robot flutters with this torque.

The wing was taken as a rectangle having a longer side of 4 cm and a shorter side of 1 cm with the longer side in the direction away from the actuator, and deformation of the wing was neglected. Since the mass of wing of a dragon fly having the width of 8 mm and the length of 33 mm was about 2 mg, the mass of the wing was made 3 mg, based on the values.

The ultrasonic motor drives the rotor by accumulation of small elliptical motions at the tip end portion of the projections. Therefore, rise and fall of the actual driving torque is in the periodic order of elliptical motion, that is, in the order of 100 kHz. However, because of limitation from calculation stability, it was set to ±250 gf·c/sec.

Figure 37:
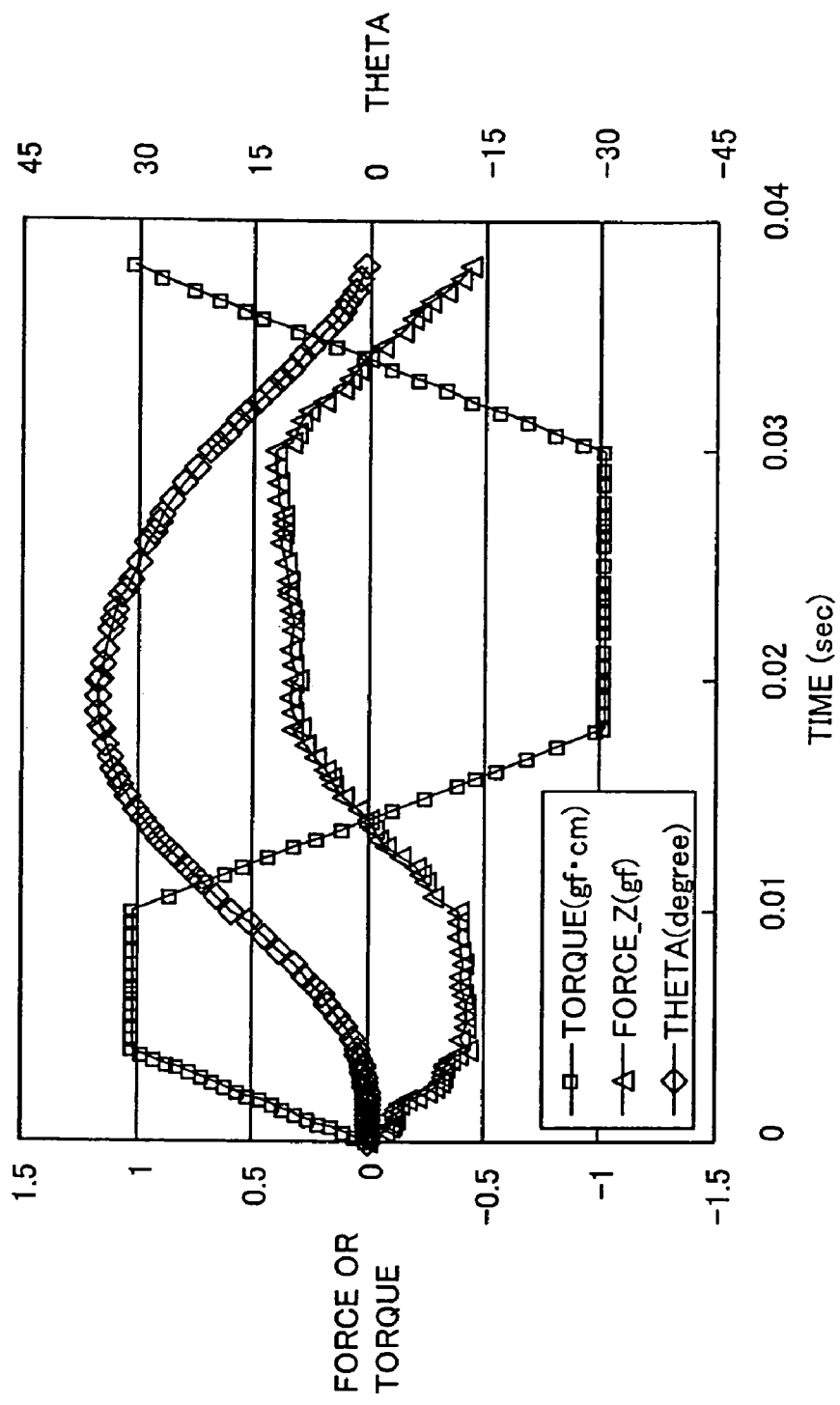
FIG. 37 is a graph showing the change of the beating torque, wing travel (stroke angle $\theta$), and supporting reaction over time in the second specific example.

One shorter side of the wing is fixed, leaving on the rotational degree of freedom with this side being the access of rotation, the torque is applied to the rotational degree of freedom, and reaction on the axis of rotation was calculated, with the result being shown in FIG. 37. Here, as defined above, declination α=0°, and secondary angle β=0°.

As shown in FIG. 37, at time 0, the wing is horizontal (stroke angle θ=0°). The torque value is substantially linearly increased to 1 gf·cm from time 0 to 0.004 sec. From the time point 0.004 sec to 0.01 sec, the torque value is kept at 1 gf·cm. From 0.01 sec to 0.018 sec, the torque value is substantially linearly changed from 1 gf·cm to −1 gf·cm. From time point 0.018 sec to 0.03 sec, the torque value is kept at −1 gf·cm. From time 0.03 sec to 0.038 sec, the torque value is substantially linearly changed from −1 gf·cm to 1 gf·cm.

The time-average of the fulcrum reaction during a downstroke, that is, from time 0.014 sec to 0.034 sec where the torque is negative, was about 0.29 gf.

Since the simulation provides the result of fluttering operation with one degree of freedom, the action of the fluid force in an upstroke is unknown. The resistance of the fluid, however, decreases as compared with the cross section, and therefore, considering the fact that the downward fulcrum reaction acting in the upstroke is small and that upstroke with the same torque as for the downstroke is possible, it is considered possible to lift an object having the mass of about 0.29 g, by using an actuator having the torque of 1 gf·cm.

More specifically, when the mass of the entire fluttering apparatus of the present embodiment is set to be 0.58 g at most, the fluttering robot can be lifted. The weight of the fluttering robot will be discussed in the following.

First, stator 210 has the mass of 0.054 g, as it is comparable to a disc having the specific gravity of 2.7, thickness of 0.4 mm and the radius of 4 mm, as the electrode and the piezoelectric elements are thin. The mass of each of auxiliary stators 212, 213 is 0.019 g, since the diameter of the stator is 0.7 times the diameter of stator 210.

Three bearings 211, 214, 215 are each a doughnut shaped ball bearing having the outer diameter of 4.2 mm, inner diameter of 3.8 mm and the thickness of 0.4 mm. The material of the bearing is titanium having the specific gravity of 4.8. As the bearing has an opening of about 30%, the mass of the bearing is about 0.013 g.

Rotor 219 is formed of aluminum and has a wall center radius of 3 mm and a thickness of 0.2 mm. Thus, the mass of rotor 219 is about 0.061 g. The mass of the actuator as the total sum of these is 0.192 g.

Further, the wing is 0.003 g. as mentioned above. As there are right and left two such structures, the total mass is 0.390 g for the entire fluttering apparatus.

The support structure 1 is a sphere having the diameter of 1 cm, specific gravity of 0.9 and the thickness of 0.1 mm. Therefore, the mass of support structure 1 is about 0.028 g.

Control apparatus 4, acceleration sensor 51, and angular acceleration sensor 52 are each formed of a semiconductor bare chip of 5 mm×5 mm, each having the mass of about 0.01 g. Thus, the total mass of control apparatus 4, acceleration sensor 51, and angular acceleration sensor 52 is about 0.03 g. The mass of power source 6 incorporated in the fluttering apparatus is 0.13 g.

Therefore, the total mass of all the components is 0.578 g. Since the buoyancy force obtained by one pair of wings is 0.58 gf, the structure can be lifted.

The mass power density set forth below is required for power source 6. The maximum power consumption of the left and right actuators of the fluttering apparatus is 40 mA in total. The power supply voltage is 3V. Since the mass of the electrolyte is 0.1 g, the mass power density of 0.12 W/0.1 g, i.e. 1200 W/kg is required.

For example, the mass power density of a commercially available lithium ion polymer secondary battery is approximately 600 W/kg. This value corresponds to a product that is at least 10 g in mass, employed in information apparatuses such as a mobile phone.

The ratio of the electrode area to the mass of the electrolyte is inversely proportional to the size of the power source. Power source 6 incorporated in the present fluttering apparatus has an electrode area ratio that is larger by ten times or more than that of the aforementioned second secondary battery used in the information apparatus. Therefore, power source 6 can attain the mass power density of approximately ten times greater than that of the secondary battery, and hence the mass power density set forth above. When the mass of the electrolyte of power source 6 is approximately 0.1 g, the fluttering apparatus can fly for about 7.5 minutes. Some fuel cells can attain a mass power density higher than that of a lithium ion polymer secondary battery. Such types can also be used, provided that the condition in terms of mass is applicable to flight.

The heat generated by the fluttering motion of the wing may be of concern. When the actuator is formed of the material of aluminum with a specific heat of 0.215 cal/(g·°C.), a temperature increase of 0.35° C. and 0.24° C. will be exhibited in the case where all the energy (energy conversion efficiency 0%) and 70% the energy, respectively, supplied to the actuator is converted into heat, since the mass of the actuator is 0.192 g.

In practice, the heat generated at the fluttering apparatus will be discharged outside the fluttering apparatus. For example, when a laser beam of approximately 6 mW is continuously directed onto the surface of an optical disc having the thickness of approximately 6 mm, the temperature rises to approximately 100° C. in average in an elliptical region of approximately 1 μm×10 μm at the surface of the optical disc. However, the temperature at a site several 10 μm deep from the surface as low as the level of the ambient temperature where the optical disc is placed.

Thus, it is considered that the actuator in the millimeter order cannot raise the temperature by even 1° C. with the energy of approximately 60 mW.

(Miscellaneous)

As shown in FIG. 18, polyethylene terephthalate (PET) molded in substantially a spherical shell shape has been cited as an example of support structure 1 for the fluttering apparatus of the present invention. The material and shape are not limited thereto. Also, the arrangement of the actuator and the shape of the wing are not limited to those shown in FIG. 18. They are arbitrary as long as the flight performance is not deteriorated.

The center of gravity is selected to be located lower than the mechanical point of action of the wing so that the posture as shown in FIG. 18 can naturally be taken, placing importance on the stability of the fluttering apparatus. It is to be noted that attitude control can be conducted with the smallest difference in the fluid force between the left wing and the right wing required therefor by setting the center of gravity and the mechanical point of action to be consistent, whereby the attitude of the fluttering apparatus can be easily modified.

Although the present fluttering apparatus has been described so as to have the position and attitude detected by an acceleration sensor and an angular acceleration sensor, the present invention is not limited to such sensors. Any means that can measure the position and attitude of fluttering apparatus may be employed.

For example, the attitude of the fluttering apparatus can also be calculated from the acceleration information obtained by at least two acceleration sensors disposed at different locations of support structure 1, which can measure the acceleration in triaxial directions that are orthogonal. Also, the position and attitude of the fluttering apparatus can be calculated by means of a magnetic sensor that senses the magnetic field distribution provided in the space where the fluttering robot travels.

Although the sensors such as acceleration sensor 51 and angular acceleration sensor 52 are depicted as discrete components apart from control apparatus 4, these sensors may be formed on the same silicon substrate as a unitary element with control apparatus 4 by micromachining, from the standpoint of reducing weight.

The present fluttering apparatus has the wing driven under open-loop control. Alternatively, a wing angle sensor may be provided at the root of the wing to effect closed-loop control based on the angle information obtained from the angle sensor.

If the flow of the fluid in the environment in which the fluttering apparatus flies is known and lifting is allowed by a predetermined wing-drive mechanism, the sensors cited herein are dispensable.

Also, although the present fluttering apparatus has been described as having the wing directly driven by an ultrasonic element using progressive waves, the structure of driving the wing and the type of actuator used therefor are not limited to those described above. For example, a fluttering structure employing the combination of an exoskeleton structure and a linear actuator can be employed.

Furthermore, although electric power is used as the driving energy, internal combustion may also be employed. Additionally, an actuator utilizing physiological oxidation-reduction reaction, as can be seen in the muscle of insects, may be used. Alternatively, the approach of obtaining the driving energy of the actuator from an external source is allowed. For example, a thermionic element, electromagnetic waves and the like can be cited for the power.

By virtue of the fluttering apparatus of the above-described first and second specific examples, the trade off between the capability of running over stepped portions and the capability of passing through gaps is eliminated since the apparatus can fly aloft the ground.

In a domestic environment, obstacles located at the height corresponding to the eyes of the common habitant (approximately 1.5 meters) such as large furniture and air conditioners have their position unchanged in most cases. The air conditioner, lighting, and the like are secured on the wall or at the ceiling, never moved in most cases.

By virtue of the lift of a fluttering apparatus in a region (space) with few obstacles and little change in the position of the obstacles, the fluttering apparatus can move freely around the corners of a house without being blocked by an obstacle. The ability of lifting allows a fluttering apparatus of a relatively small size to overcome high stepped portions and obstacles.

Since the fluttering apparatus can stay still in the air (hovering), it is suitable for moving around in a space in which many obstacles are located such as in a house that is relatively restricted in space. Thus, a prescribed task such as identifying the state in the house can be facilitated.

The direction of travel of the fluttering apparatus can be altered promptly by changing the declination, torsion angle, and the like as seen in the flight of a flying insect. The fluttering apparatus has high maneuverability superior than that of, for example, a helicopter.

Since the lifting force of the fluttering apparatus does not directly depend upon its volume, it can be reduced in size as compared to a traveling apparatus whose lifting force is proportional to its volume such as a balloon.

The fluttering apparatus can also be used outdoors without being hindered by the landscape or obstacles located outdoors. For example, the fluttering apparatus can be used in an area of disaster to readily collect information about a site where man cannot easily approach.

Sensing robot CS is equipped with a sensor function, moving function, and communication function, whereas pheromone robot FE105 is equipped with a moving function and communication function to directly control the movement of a mobile unit equipped with a sensor function. Preferably, they are fluttering robots that conduct a fluttering flight as described. However, any other apparatus that is equipped with the above-described means is adaptable.

Base station BS101 is formed of a general personal computer, a work station, or the like that has communication capability. Detailed description of a structure thereof will not be provided here. Base station BS101 of the present embodiment processes information of a search result to provide overall control of the robot group in group robot system 100. In the following description, it is assumed that base station BS101 is a stationary personal computer, a work station, or the like. However, the base station may be a mobile or stationary unit.

In the present embodiment, group robot system 100 of FIG. 1 will be described based on an example where a search is conducted to detect the heat source of a fire, a human being, or the like, to detect toxic gas such as CO or toxic radiation, to detect metal such as a land mine, or to collect three dimensional image data for urban planning over an area of at least several 10 meters up to several kilometers square at most.

In the case where a search is conducted for toxic gas or toxic radiation over the entire area of a town in the present embodiment, it is to be noted that the group robot will not search over the entire urban area at one time. Instead, the entire area is divided into a plurality of regions, and a group of fluttering sensing robots CS located centered about base station BS101 conducts the search. When the group of fluttering sensing robots CS completes the search for toxic gas or toxic radiation in one of the divided regions, base station BS101 begins to move towards the next divided region of search, and stops when arriving at the region of interest.

Following the travel of base station BS101, pheromone robot FE105 and sensing robots CS also begin to move. When base station BS101 comes to a stop at the next divided region, the group of sensing robots CS that are located about base station BS101 begin to conduct a search for toxic gas or toxic radiation in the divided area.

Thus, in accordance with group robot system 100 of the present embodiment, the group of sensing robots CS conducts a search in a divided region. Sensing robot CS sends the results of search to base station BS101 and pheromone robot FE105. Pheromone robot FE105 receives the information of the presence/absence of an object of search, and provides control of sensing robot CS to continue the search. Base station BS101 processes the results of search. After completing the search of a certain region, the entire group robot system 100 moves with base station BS101 at the center to conduct a search at the next region. Thus, a search is conducted over the entire area while repeating the operation of travel.

A method of detecting an object of search by group robot system 100 will be described hereinafter. In group robot system 100, a sensing robot CSn detects an object and provides information as to the presence of the object to pheromone robot FE105.

FIG. 1 corresponds to the initial state of the configuration of group robot system 100 of the present embodiment schematically showing the positioning of sensing robot CSn and the search capability (resolution and ON/OFF of sensor function) of each sensing robot CS prior to detection of an object.

Referring to FIG. 1, the sensor functions of sensing robots CS30-CS34 located far away from base station BS101, among sensing robots CS30-CS34 (with resolution R104)

and sensing robots CS20-CS24 (with resolution R103), are initially ON prior to detection of an object.

Figure 42:
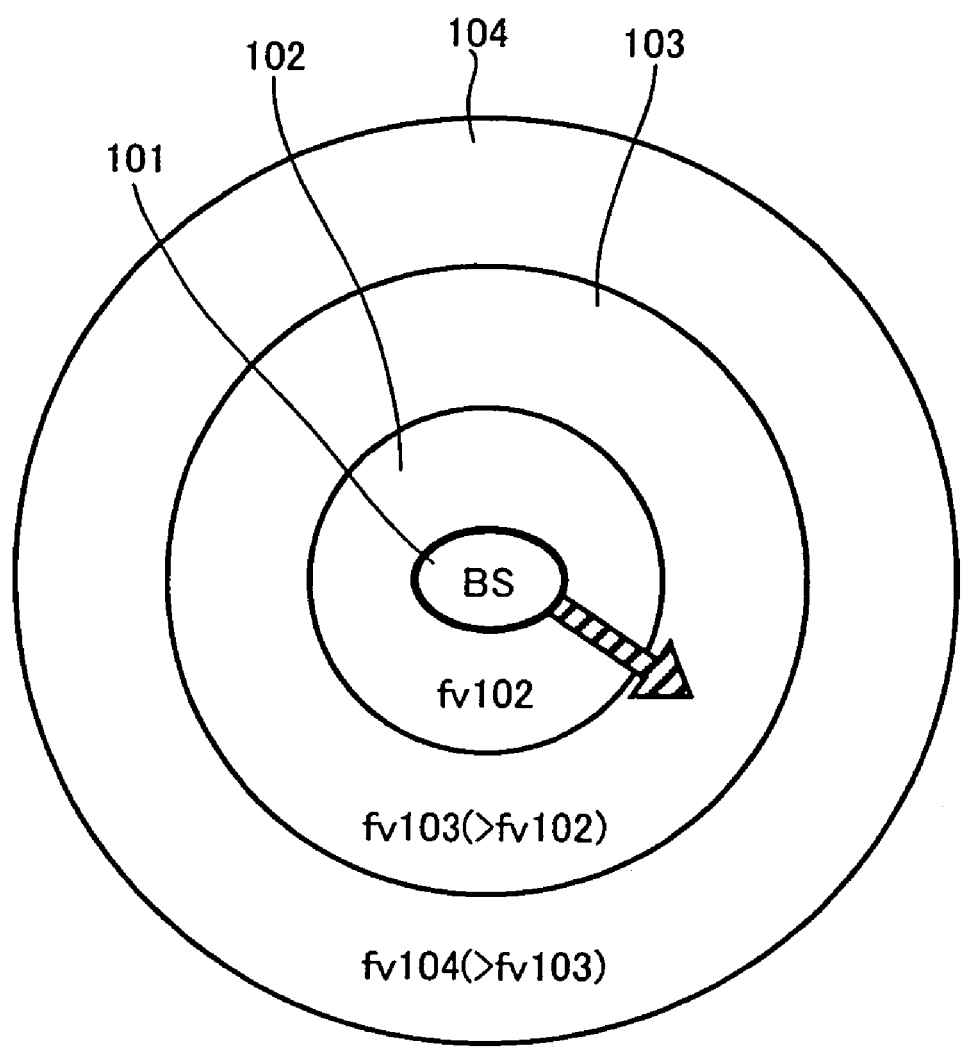
FIG. 42 represents the relation between the fluttering frequency and position of a fluttering sensing robot in a group robot system of the present embodiment.

FIG. 42 schematically shows, in a hierarchical manner, the relationship between a fluttering frequency fv and the position between respective sensing robots CS and between sensing robot CSn and base station BS in the group robot system.

Referring to FIG. 42, the distance of travel per unit time of a fluttering sensing robot CS104 located farthest from the base station BS 101 is larger than that of the sensing robot CS103 that is second farthest. In other words, fluttering frequency fv104 of fluttering sensing robot CS04 is larger than fluttering frequency fv103 of fluttering sensing robot CS103.

Similarly, the distance of travel per unit time of sensing robot CS103 is larger than that of sensing robot CS102 located closest to base station BS101. In other words, fluttering frequency fv103 of fluttering sensing robot CS103 is larger than fluttering frequency fv102 of fluttering sensing robot CS102.

Therefore, in the present embodiment, sensing robots CS of a lower level having a larger fluttering frequency, that is, the sensing robots belonging to the level farther away from the base station BS101, move faster and have lower resolution.

Figure 43:
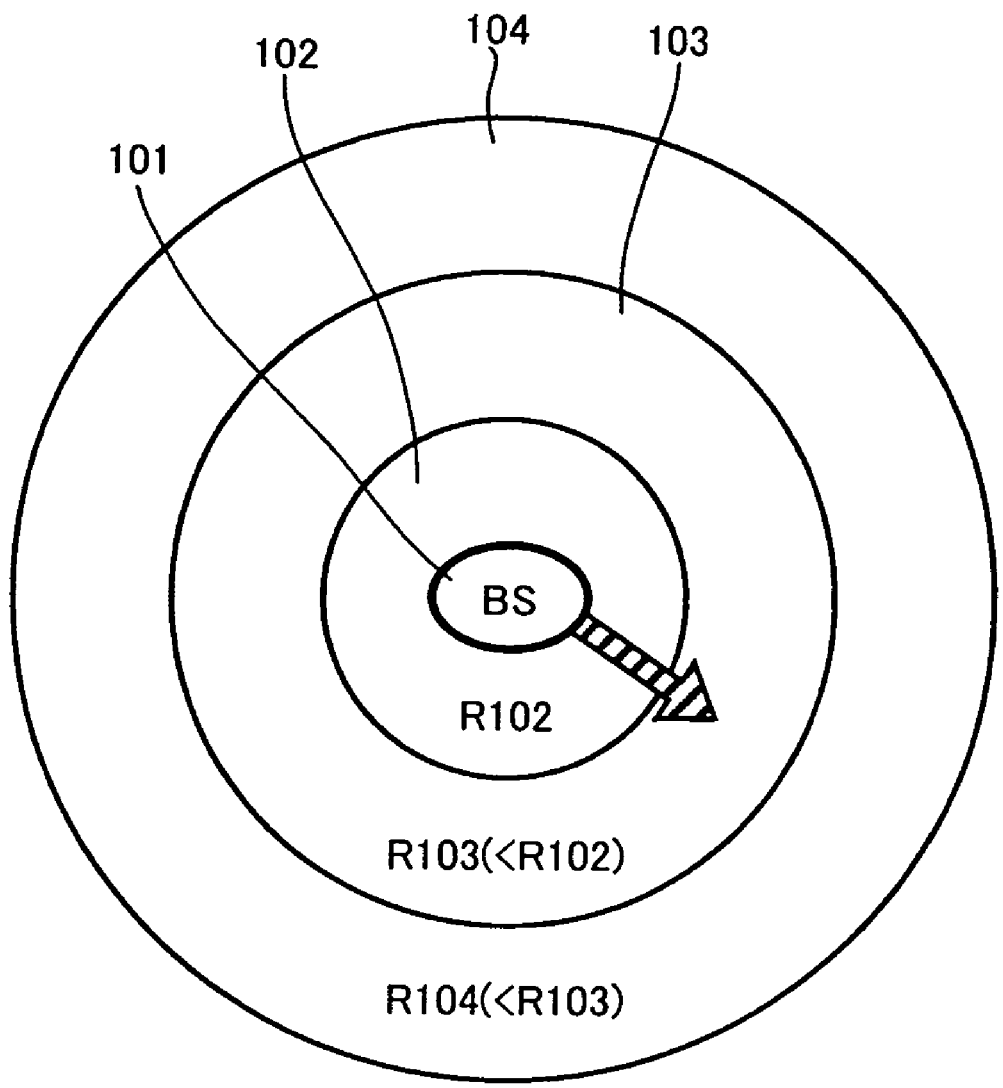
FIG. 43 represents the relation between the magnitude of resolution and position of a fluttering sensing robot in the group robot system of the present embodiment.

FIG. 43 represents the relation of the position and sensing resolution R between each of the sensing robots CS and between sensing robot CS and base station BS of the group robot system.

Referring to FIG. 43, in the case where the sensor accuracy and sampling rate are the same for all sensing robots CS, the spatial resolution R104 of sensing robot CS104 located farthest from base station BS101 directed to detecting an object is lower than the resolution R103 of fluttering sensing robot CS103 that is the second farthest from base station, based on the relation between the position of the robots and the distance of travel per unit time described above. Specifically, fluttering sensing robot CS104 located farthest from base station BS101 has lower accuracy of position detection for detecting an object, or lower precision of measurements of the size of an obstacle, as compared with fluttering sensing robot CS103 that is the second farthest.

Similarly, in the case where the sensor accuracy and sampling rate are the same for all sensing robots, the spatial resolution R103 of fluttering sensing robot CS103 directed to detecting an object is lower than the spatial resolution R102 of fluttering sensing robot CS102 that is located closest to base station BS101 based on the relation between the position of the robots and the distance of travel per unit time described above. Specifically, sensing robot CS103 has lower accuracy of position detection for detecting an object and lower precision of measurements of the size of the obstacle, as compared with fluttering sensing robot CS102 that is located closest to base station BS101.

In group robot system 100 of FIG. 1, sensing robots CS30-CS34 located distant from base station BS101 and arranged at the outer side of group robot system 100 have a resolution R104 set lower than resolution R103 of sensing robots CS20-CS24 arranged at the inner side since the fluttering velocity of sensing robots CS30-CS34 is higher than that of sensing robots CS20-CS24.

A different spatial resolution is achieved based on the difference in the distance of travel per unit time (travel velocity) under the same sampling rate. In the case where all the fluttering sensing robots move at substantially the same velocity, the spatial resolution can be altered by changing the sampling rate.

In group robot system 100, base station BS101 provides control such that the sensor functions of sensing robots CS30-CS34 arranged at the outer side are turned ON, whereby the search for an object is initiated by these sensing robots CS30-CS34. At this stage, sensing robots CS20-CS24 of higher resolution (resolution R103>R104) are under control of base station BS101 to have their sensor functions turned OFF. Therefore, sensing robots CS20-CS24 do not conduct a search at this time point.

Figure 44:
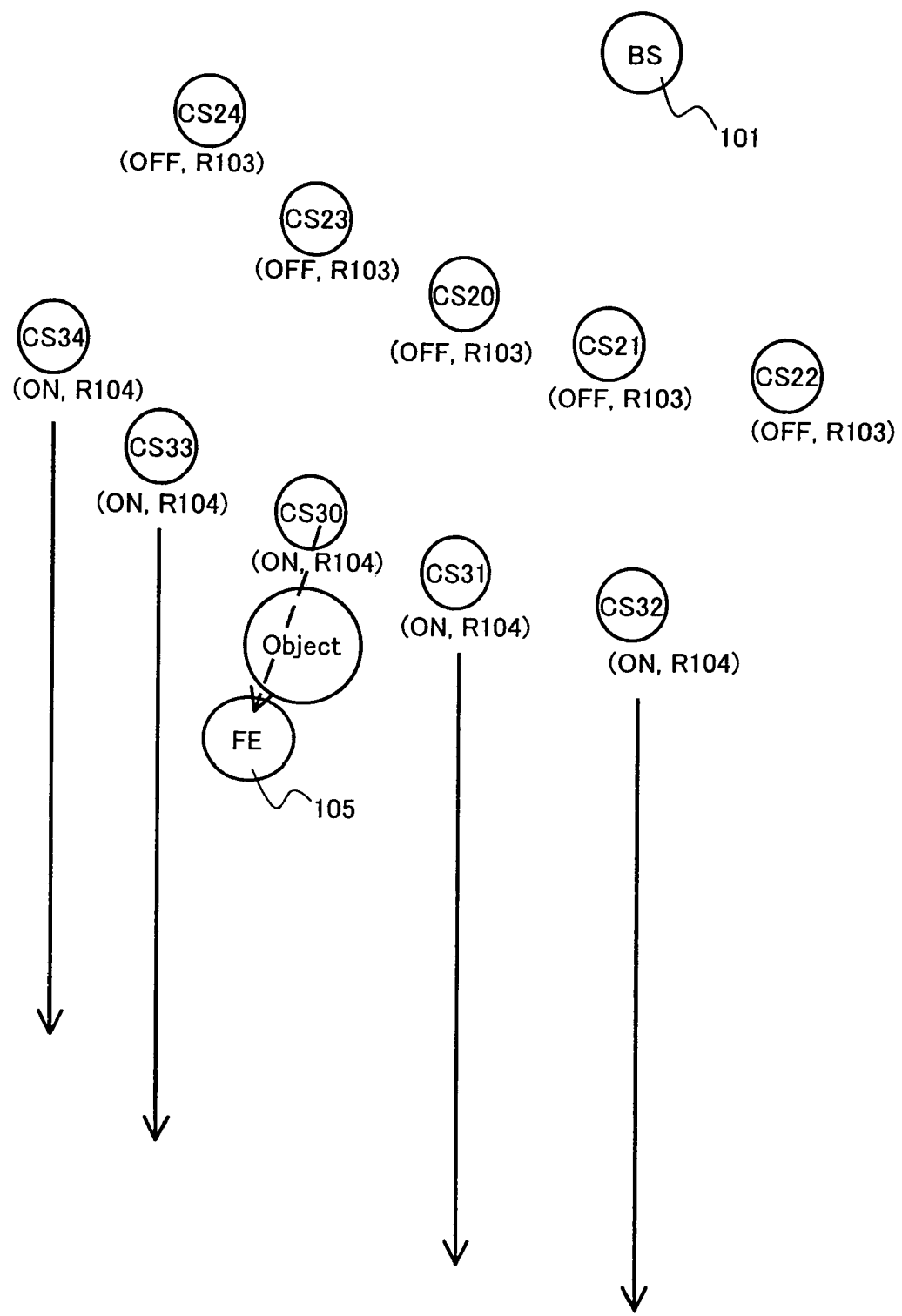
FIGS. 44-46 show specific examples of secondary to quaternary states, respectively, of a structure of group robot system 100 of the present embodiment.

A specific example of the secondary status of the configuration of group robot system 100 when sensing robot CS30 finds the object is shown in FIG. 44.

Referring to FIG. 44, in response to sensing robot CS30 finding an object, information notifying detection of the object (indicated by the dotted line in FIG. 44) is sent from sensing robot CS30 to pheromone robot FE105. Pheromone robot FE105 receives this information from sensing robot CS30, and moves towards the proximity of the object. The travel of pheromone robot FE105 is predetermined through a program stored in the storage device of pheromone robot FE105, and implemented by a control apparatus such as a CPU (Central Processing Unit) of pheromone robot FE105 reading out the program from the storage device for execution.

At this stage, sensing robots CS31, CS32, CS33 and CS34 that have not detected the object despite their ON sensing functions move from their current area of search, as indicated by the solid lines in FIG. 44. Generally, they move to the next area of search. In the case where there is only one object of search or when the search of the area has been completed, sensing robots CS31, CS32, CS33 and CS34 that have not detected an object move towards the initial position. The travel of sensing robots CS31, CS32, CS33 and CS34 not detecting an object is realized by pheromone robot FE105 sending a control signal towards sensing robots CS31, CS32, CS33 and CS34 not detecting an object upon receiving the information from sensing robot CS30 notifying detection of the object. Alternatively, the travel may be implemented by a method of communication that will be described afterwards, wherein base station BS101 receiving information related to the object of search from sensing robot CS30 provides a control signal towards sensing robots CS31, CS32, CS33 and CS34 not detecting the object so as to move.

Figure 45:
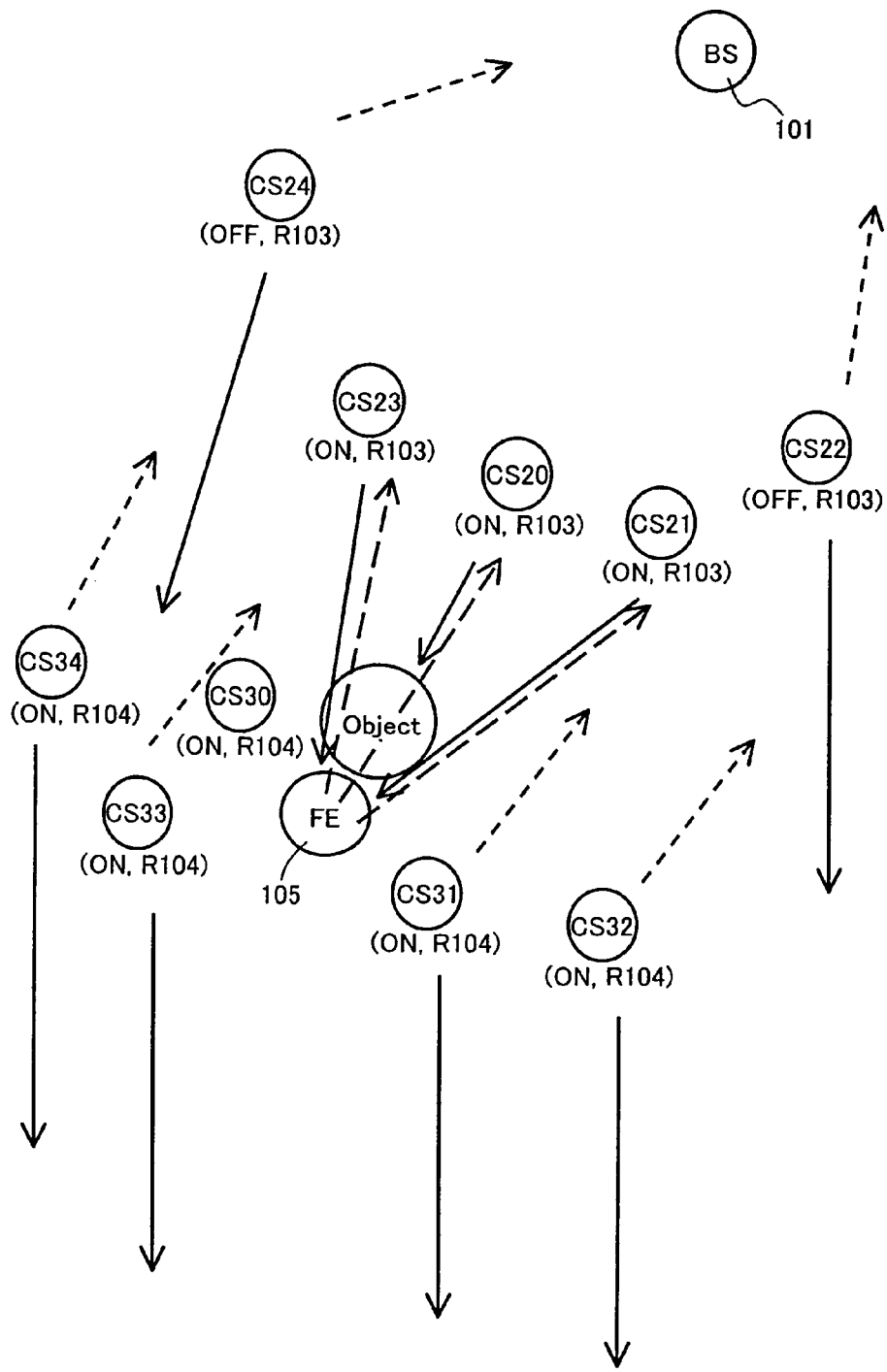

As shown in FIG. 45, pheromone robot FE05 receiving the information of detection from sensing robot CS30 notifies sensing robots CS20, CS21 and CS23 located relatively closer and with a resolution higher than the resolution of sensing robot CS30 that has initially detected the object of search about detection of the object (indicated by long broken lines in FIG. 45). Sensing robots CS20, CS21 and CS23 respond to the signal from pheromone robot FE105 to have their sensing function turned ON and initiate the searching operation (further search). Specifically, pheromone robot FE105 sends a control signal to sensing robots CS20, CS21 and CS23 so as to turn ON their sensor function. Also, pheromone robot FE105 sends a control signal to sensing robots CS20, CS21 and CS23 so as to move towards pheromone robot FE105.

At this stage, sensing robots CS31, CS32, CS33 and CS34 not detecting an object despite their ON sensor functions move from the current area of search, as indicated by the solid line in FIG. 45. Sensing robots CS22 and CS24 that do not conduct the further search also move from the current area of a search, as shown by the solid line in FIG. 45. In general, sensing robots CS22, CS24, CS31, CS32, CS33 and CS34 move to the next area of search for the next survey. In the case where there is only one object of search or when the search in the area has been completed, sensing robots CS31, CS32, CS33 and CS34 not detecting the object as well as sensing robots CS22 and CS24 not conducting further search move towards the initial position, as indicated by the dotted line in FIG. 45. The travel of sensing robots CS22, CS24, CS31, CS32, CS33 and CS34 are similar to the travel of sensing robot CS set forth above.

Figure 46:
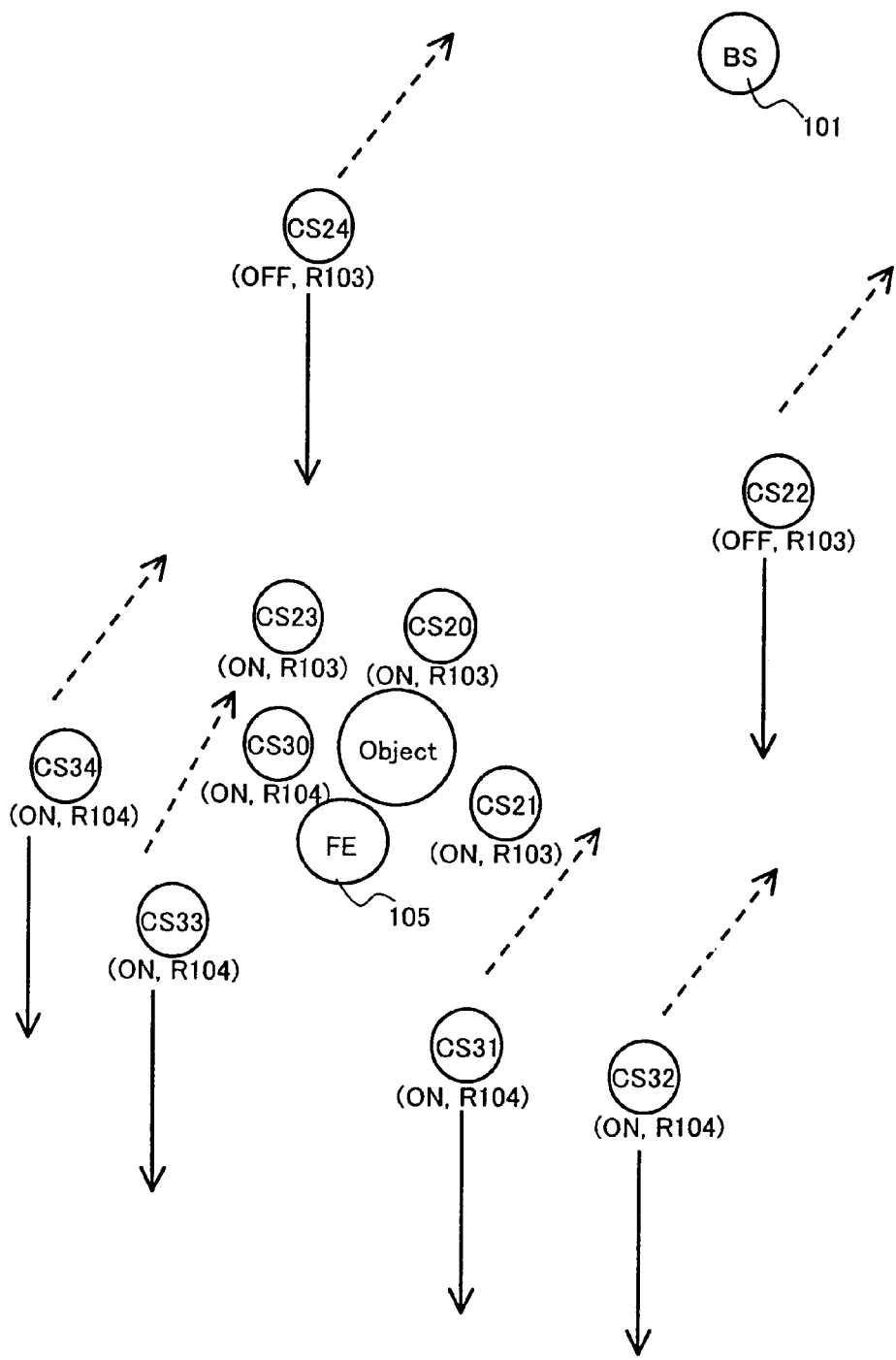

Then, sensing robots CS20, CS21 and CS23 having their sensing function turned ON and initiating the search operation (further search) move towards pheromone robot FE105 located close to the object and transmitting the signal, as shown in FIG. 46. The search is continued in the proximity of the object based on a sensing function of higher resolution than sensing robot CS30 that has initially detected the object.

At this stage, sensing robots CS31, CS32, CS33 and CS34 not detecting an object even though their sensor function is ON move from the current area of search, as indicated by the solid line in FIG. 46. Sensing robots CS22 and CS24 not conducting the further search also move from the current area of search, as indicated by the solid line in FIG. 46. Sensing robots CS22, CS24, CS31, CS32, CS33 and CS34 generally move to the next area of search for the next survey. In the case where there is only one object of search or when the search of the area has been completed, sensing robots CS31, CS32, CS33 and CS34 not detecting the object as well as sensing robots CS22 and CS24 not conducting the further search move towards the initial position, as indicated by the dotted line in FIG. 46. This travel of sensing robots CS22, CS24, CS31, CS32, CS33 and CS34 are similar to the travel of sensing robot CS described above.

The present embodiment is described as having sensing robots of different resolution, i.e. resolution of two stages, in group robot system. 100. The same applies for sensing robots CS with a resolution of three or more stages.

Figure 47:
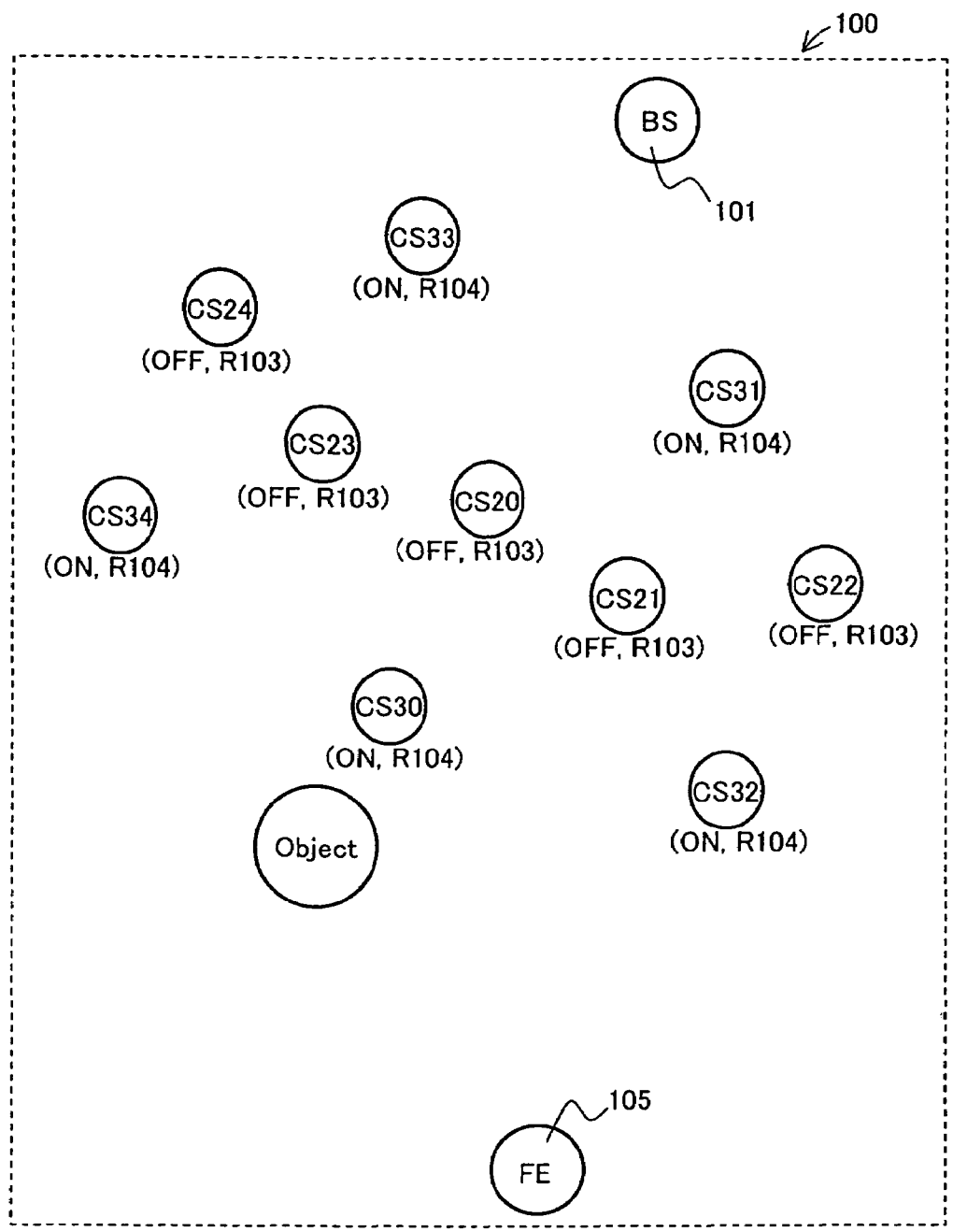
FIGS. 47 and 48 show specific examples of the initial state of a structure of group robot system 100 of the present embodiment.

The initial state of FIG. 1 shows the arrangement of sensing robots CS30-CS34 and sensing robots CS20-CS24 having different resolutions, located substantially concentrically about base station BS101. Alternatively, sensing robots CS of different resolution may be arranged in random as shown in FIG. 47.

The method of detecting an object was described using a plurality of sensing robots CSn differing in resolution. Other methods of detection can also be employed. A method of detecting an object using a plurality of sensing robots CSn differing in the sensor function to detect an object will be described hereinafter.

Figure 48:
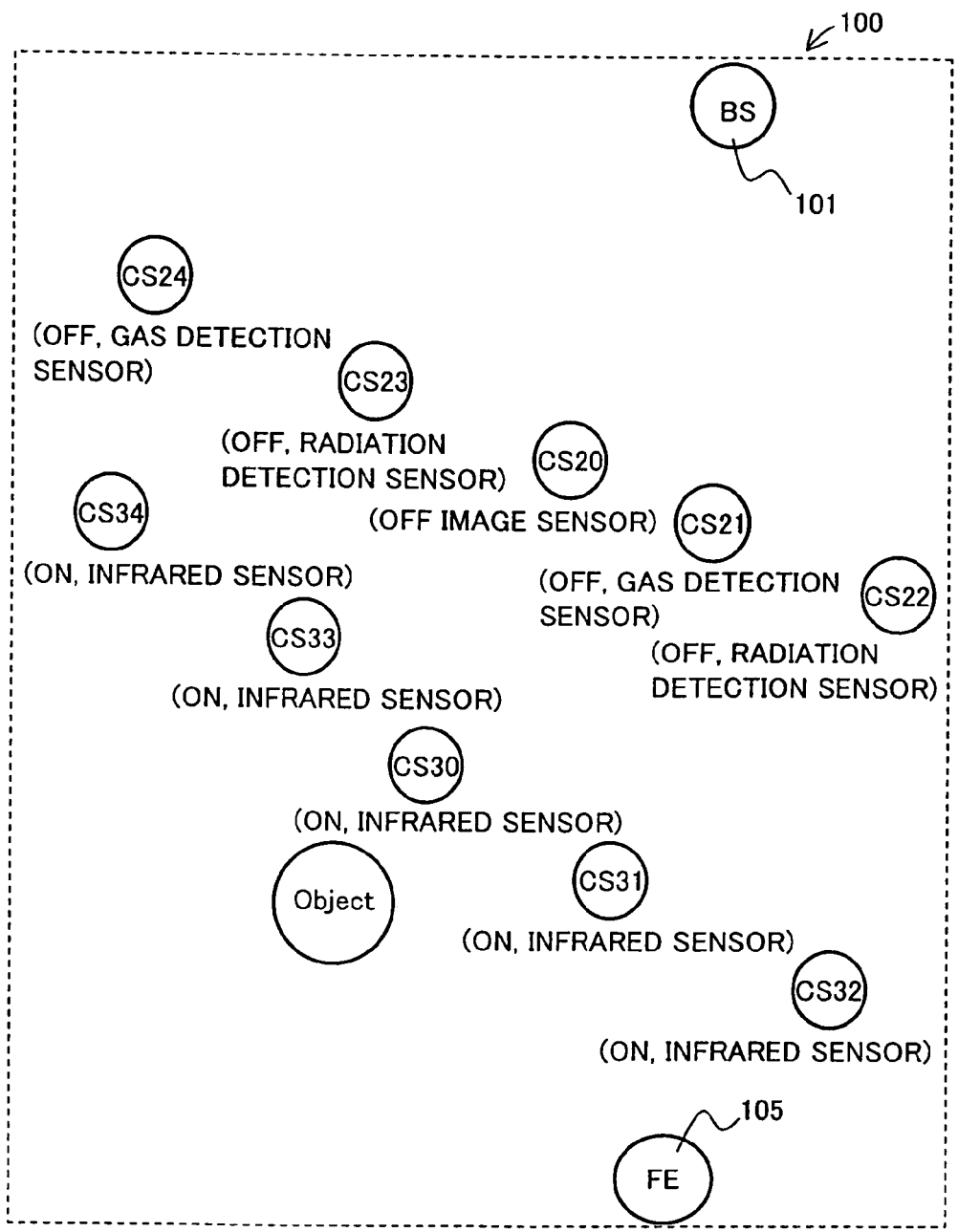

FIG. 48 shows a specific example of the initial state of the arrangement of group robot system 100. The relation between the position of sensing robot CSn and the detection function (sensor type and ON/OFF of sensor function) of each sensing robot CS before an object is detected is schematically shown.

Referring to FIG. 48, sensing robots CS30-CS34 are equipped with infrared sensors. Sensing robot CS20 is equipped with an image sensor. Sensing robot CS21 is equipped with a gas detection sensor. Sensing robots CS22 and CS23 are equipped with a radiation detection sensor. Sensing robot CS24 is equipped with a gas detection sensor. Sensing robots CS30-CS34 located far away from base station BS101 among sensing robots CS30-CS34 and sensing robot CS20-CS24 initially have their sensor functions ON. In the present embodiment, a search for an object is conducted initially by a plurality of sensing robots CS having the same type of sensor function. Specifically, the search for an object is initiated by sensing robots CS30-CS34 with infrared sensors.

In group robot system 100, base station BS101 provides control such that the sensor functions of sensing robots CS30-CS34 arranged at the outer side are turned on. The search for an object is initiated by sensing robots CS30-CS34 located at the outer side. At this stage, sensing robots CS20-CS24 equipped with another type of sensing functions (image sensor, gas detection sensor, radiation sensor) are under control of base station BS101 to have their sensor functions OFF. Thus, sensing robots CS20-CS24 have not conducted a searching operation at this stage.

A specific example of the secondary status of the arrangement of group robot system 100 when sensing robot CS30 finds an object will be described with reference to FIG. 49.

Figure 49:
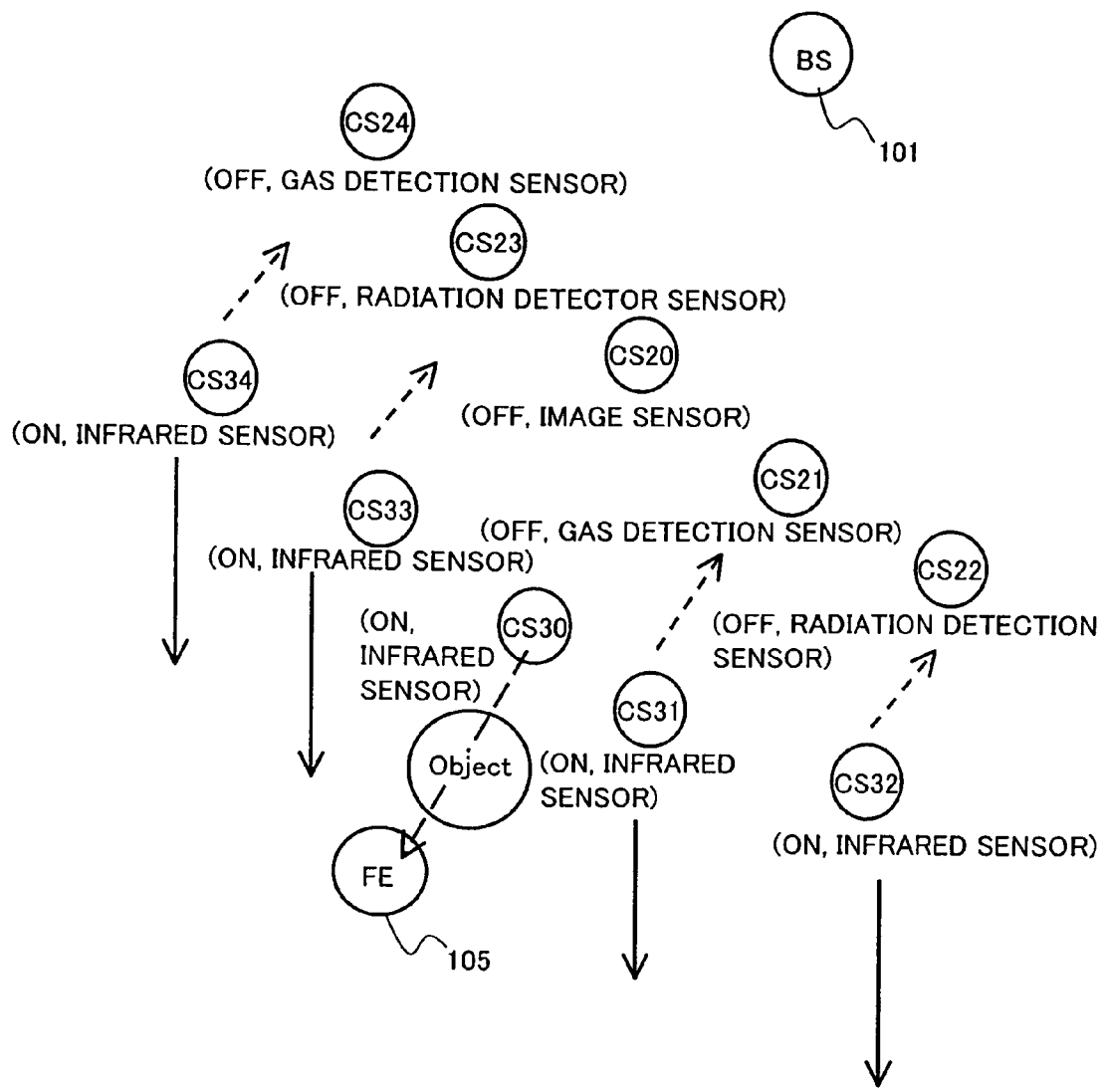
FIGS. 49-51 show specific examples of secondary to quaternary states, respectively, of a structure of group robot system 100 of the present embodiment.

Referring to FIG. 49, when sensing robot CS30 finds an object, information notifying detection of an object is transmitted from sensing robot CS30 to pheromone robot FE105 (indicated by the dotted line in FIG. 49). Pheromone robot FE105 responds to this information from sensing robot CS30 to move close to the object. The travel of pheromone robot FE105 at this stage is similar to the travel of pheromone robot FE105 described above.

At this stage, sensing robots CS31, CS32, CS33 and CS34 not detecting an object even though their sensor functions are ON move from the current area of search, as indicated by the dotted line in FIG. 49. Generally, the sensing robots move to the next area of search to conduct the next survey. In the case where there is only one object of search or when the search of the area has been completed, sensing robots CS31, CS32, CS33 and CS34 not detecting an object move towards the initial position, as indicated by the dotted line in FIG. 49. The travel of sensing robots CS31, CS32, CS33 and CS34 at this stage is similar to the travel of sensing robot CS set forth above.

Figure 50:
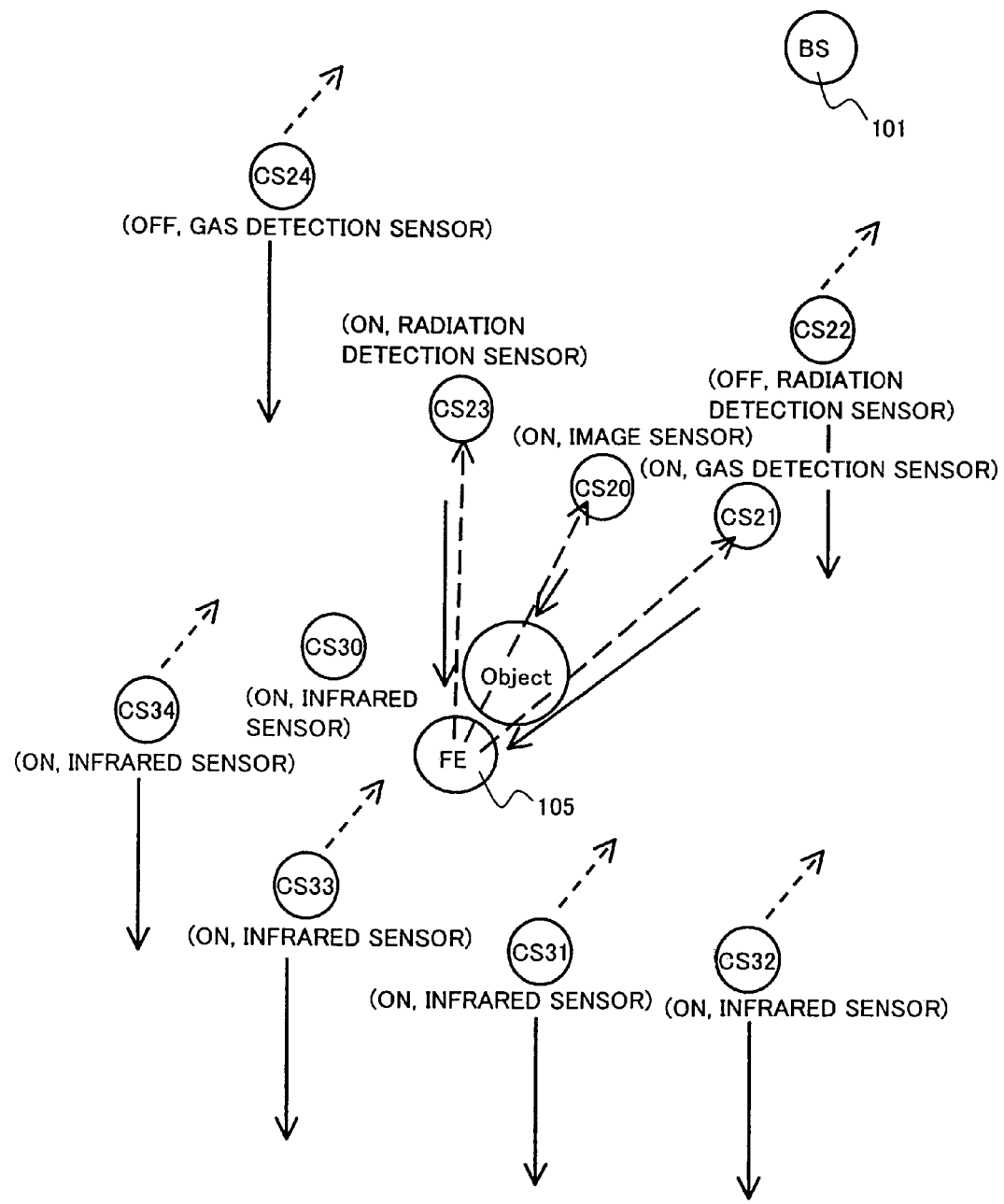

Then, pheromone robot FE105 receiving the information of detection from sensing robot CS30 notifies sensing robots CS20, CS21 and CS23 having a sensing function (sensor) different from that of sensing robot CS30 that has first detected the object about detection of the object, as shown in FIG. 50 (indicated by the long broken line in FIG. 50). Sensing robots CS20, CS21 and CS23 respond to the signal from pheromone robot FE105 to have their sensing functions turned ON and initiate a searching operation (further search). Specifically, pheromone robot FE105 transmits a control signal towards sensing robots CS20, CS21 and CS23 so as to have their sensor function turned ON. Pheromone robot FE105 also provides a control signal to sensing robots CS20, CS21 and CS23 to cause them to move towards pheromone robot FE105.

At this stage, sensing robots CS31, CS32, CS33 and CS34 that have not detected the object despite their ON sensor functions move from the current area for search, as indicated by the solid line in FIG. 50. Also, sensing robots CS22 and CS24 not conducting the further search move from the current area for search, as indicated by the solid line in FIG. 50. In general, sensing robots CS22, CS24, CS31, CS32, CS33 and CS34 move to the next area of search to conduct the next survey. In the case where there is only one object of search or when the search at that area of search has been completed, sensing robots CS31, CS32, CS33 and CS34 that have not detected the object as well as sensing robots CS22 and CS24 that do not conduct further search move towards the initial position, as indicated by the dotted line in FIG. 50. The travel of sensing robots CS22, CS24, CS31, CS32, CS33 and CS34 is similar to the travel of sensing robots CS set forth above.

Figure 51:
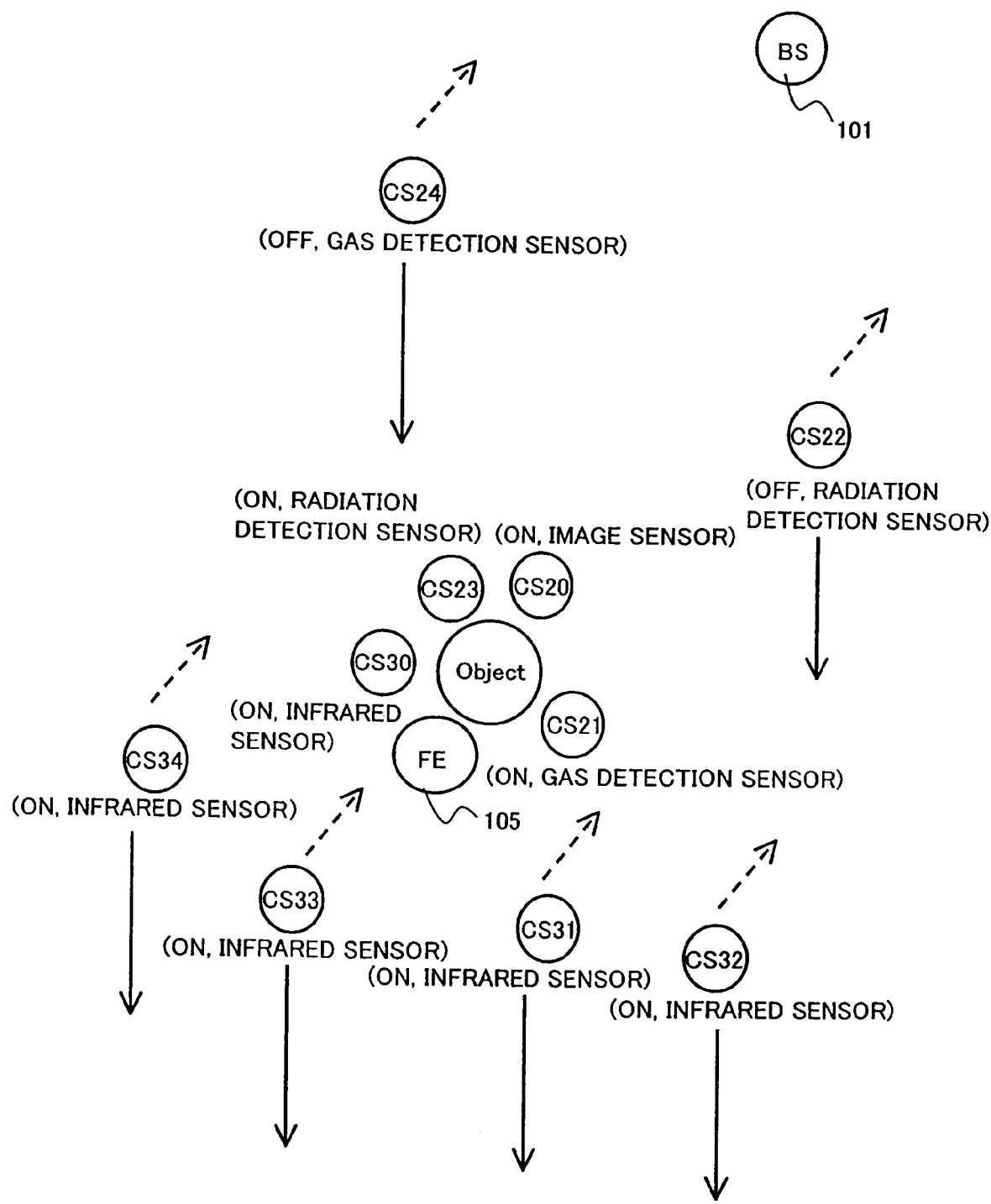

Then, sensing robots CS20, CS21 and CS23 having their sensing functions turned ON and initiating the searching operation (further search) move towards pheromone robot FE105 located closed to the object and transmitting a signal, as shown in FIG. 51. The search is continued at the neighborhood of the object based on a sensing function of the type different from that of sensing robot CS30 that has first detected the object. In the example shown in FIG. 51, the search is continued using an image sensor (CS20), a gas detection sensor (CS21), a variation detection sensor (CS23) and the like.

In the present embodiment, an infrared sensor is employed for sensing robot CS of relative majority, whereas an image sensor, a gas detection sensor, and a radiation detection sensor are employed for secondary sensing robots CS of relatively minority. However, the sensor functions employed therein are not limited to those described above. It is preferable to select and adopt an appropriate sensor suitable to the feature of the object of search. Furthermore, although the present embodiment is described based on sensing robots CS equipped with different types of sensor functions, sensing robots CS equipped with the same sensor function, but with different processing methods for sensor information, can be used.

In such a case, sensing robots CS31, CS32, CS33 and CS34 that have not detected the object despite their ON sensor function move from the current area of search, as indicated by the solid line in FIG. 51. Sensing robots CS22 and CS24 that do not conduct further search also move from the current area of search, as indicated by the solid in FIG. 51. Sensing robots CS22, CS24, CS31, CS32, CS33 and CS34 generally move to the next area of search for the next survey. In the case where there is only one object of search or when the search of the area has been completed, sensing robots CS31, CS32, CS33 and CS34 not having detected the object as well as sensing robots CS22 and CS24 not conducting further search move towards the initial position, as indicated by the dotted line in FIG. 51. The travel of sensing robots CS22, CS24, CS31, CS32, CS33 and CS34 at this stage is similar to the travel of sensing robot CS set forth above.

The present embodiment is based on a group robot system 100 including sensing robots CS having different types of sensor functions, i.e., a sensor of two stages such as an initial detection sensor and a secondary detection sensor. The same applies for sensing robots CS having sensor function types of at least two stages or more.

Figure 52:
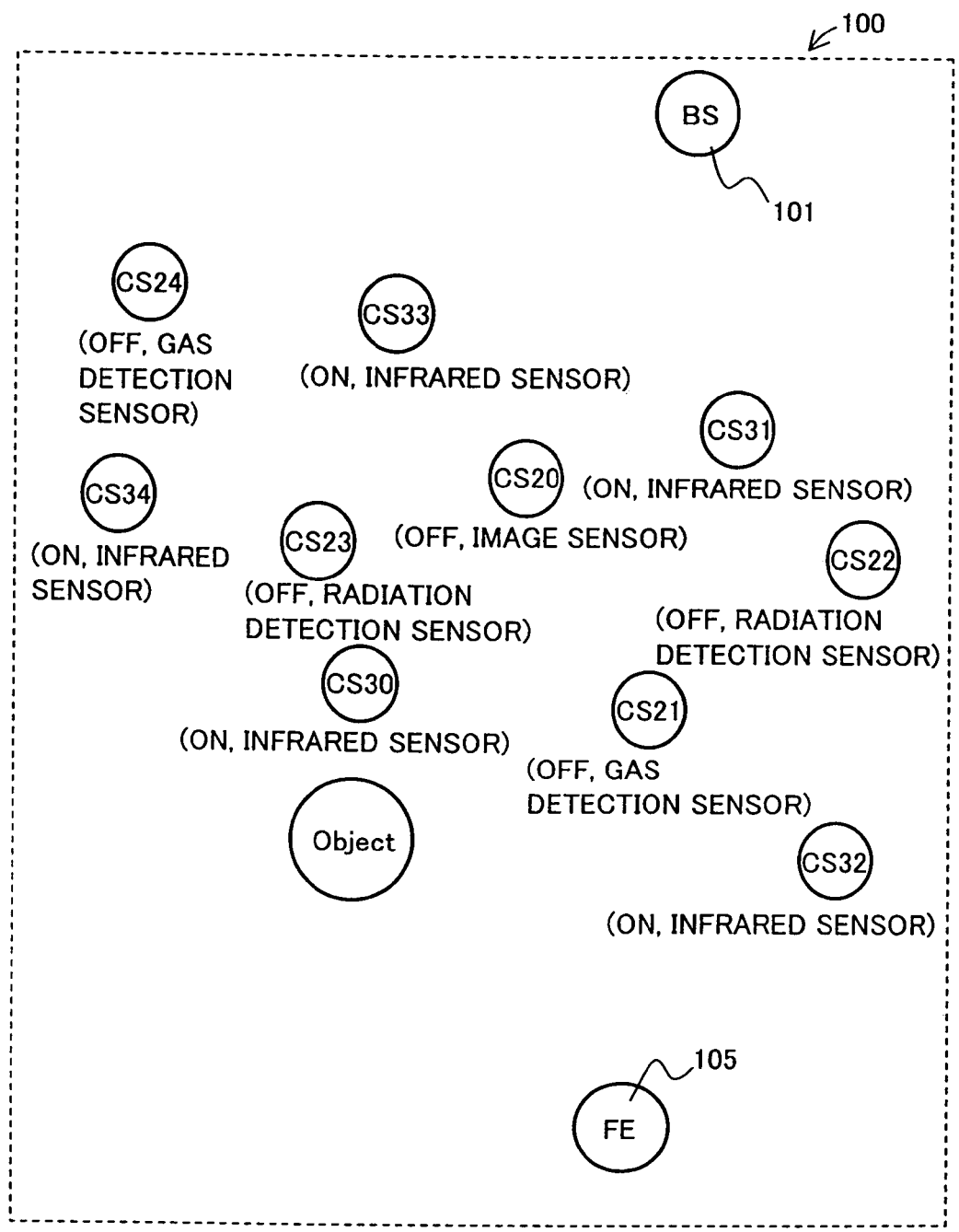
FIG. 52 shows another specific example of the initial state of the structure of group robot system 100 of the present embodiment.

In the initial state of FIG. 48, sensing robots CS30-CS34 (initial detection sensor) and sensing robots CS20-CS24 (secondary detection sensors), differing in the type of the sensor function or the processing method of the sensor information, are arranged substantially concentrically about base station BS101. Alternatively, sensing robots CS differing in the type of sensor function or in the processing method of sensor information may be arranged in random, as shown in FIG. 52.

Figure 53:
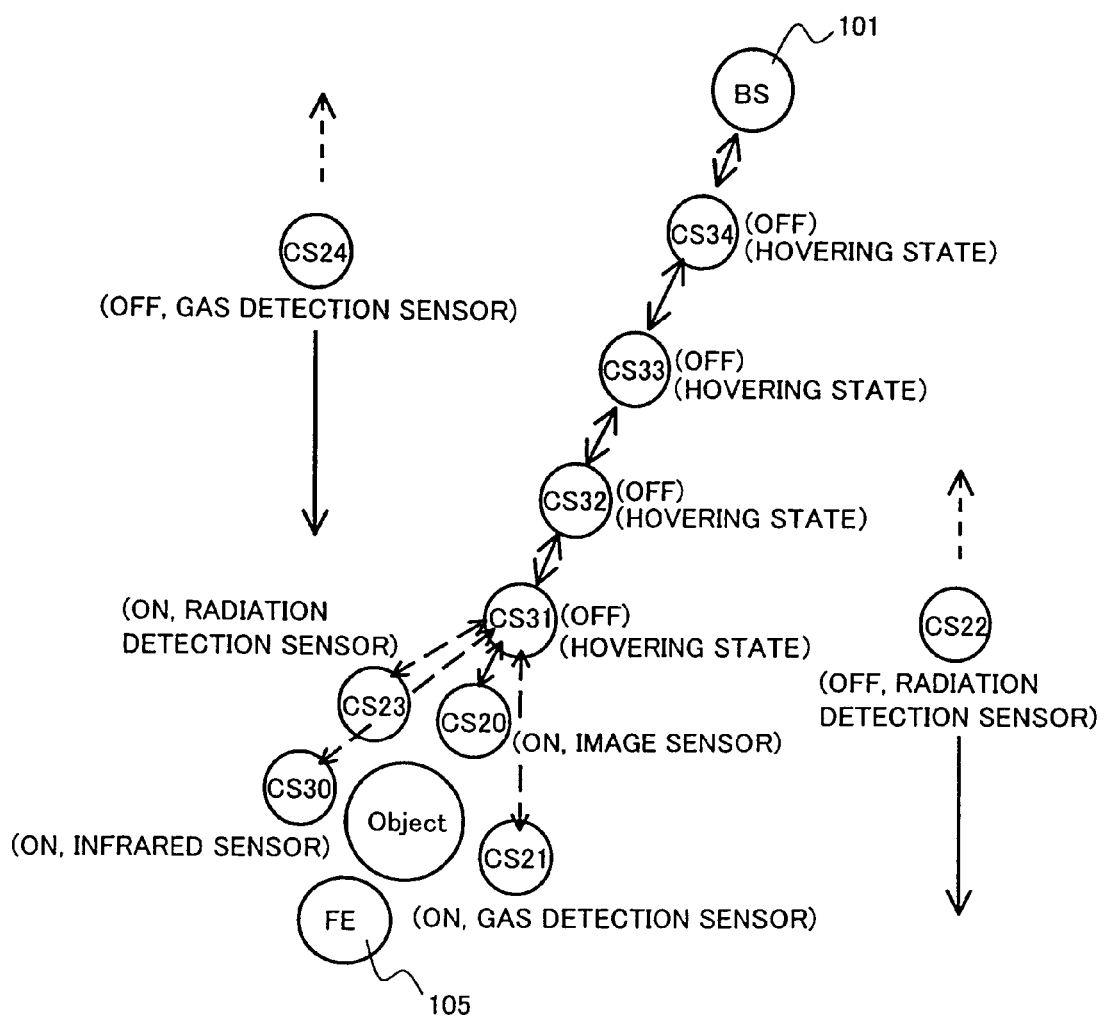
FIGS. 53-56 show specific examples of the arrangement in establishing communication in group robot system 100.

Thus, when sensing robot CS finds an object in the present group robot system 100, information as to the presence of an object is transmitted to pheromone robot FE105. At the same time, sensor information such as position information is transmitted from sensing robot CS to base station BS101. Also, control information as to the sensing capability, sensor change instruction, and the like is transmitted from base station BS101 to sensing robot CS. Communication between sensing robot CS and base station BS101 in group robot system 100 will be described hereinafter. Particularly, communication when the further search shown in FIG. 51 is commenced will be described. FIG. 53 shows a specific example of the arrangement in group robot system 100 for communication.

Referring to FIG. 53, sensing robot CS20 (image sensor), CS21 (gas detection sensor), CS23 (radiation sensor) and CS30 (infrared sensor) conducting the further search shown in FIG. 51 transmits search information towards sensing robot CS31 attaining a state of having the searching operation suppressed (indicated by OFF designation in FIG. 53; implying that sensor is OFF).

Sensing robot CS31 receiving the search information from sensing robots CS20, CS21, CS23 and CS30 transmits the search information towards sensing robot CS32 attaining a state of having the searching operation suppressed. Further, the search information is sequentially transmitted from sensing robot CS32 to sensing robot CS33, from sensing robot CS33 to sensing robot CS34, and then from sensing robot CS34 to base station BS101.

Sensing robots CS31, CS32, CS33 and CS34 are sensing robots other than the sensing robot that has detected an object, and are suppressed of the searching operation after detection of the object. Sensing robot CS31, CS32, CS33 and CS34 are located substantially linear between base station BS101 and pheromone robot FE105 to conduct the communication set forth above. In the case where these sensing robots CS31, CS32, CS33 and CS34 for communication are fluttering robots, they attain an hovering state.

Such arrangement in communication is realized by sensing robot CS30 that has detected the object transmitting search information towards sensing robot CS31 located most closest, whereby sensing robot CS31 moves to a position between base station BS101 and pheromone robot FE105, and sensing robot CS32 located closest to sensing robot CS31 moves to a position between base station BS101 and pheromone robot FE105. Subsequently, sensing robot CS receiving the information of search moves between base station CS101 and pheromone robot FE105 sequentially. Alternatively, pheromone robot FE105 receiving information notifying detection of an object by sensing robot CS30 provides control such that sensing robots CS31, CS32, CS33 and CS34 are located substantially linear between base station BS101 and pheromone robot FE105.

A sensing robot CS not associated with the detection of an object, further search, and communication relay between sensing robot CS and base station BS101 (i.e., sensing robots CS22 and CS24 in FIG. 53) moves from the current area of search, as indicated by the solid line in FIG. 53. Sensing robots CS22 and CS24 not associated with any of the detection of an object, further search, and communication relay between sensing robot CS and base station BS101 generally moves to the next area of search for the next survey. In the case where there is only one object of search or when the search in the area has been completed, sensing robots CS22 and CS24 move towards the initial position, as indicated by the dotted line in FIG. 53. The travel of sensing robots CS22 and CS24 at this stage is similar to the travel of sensing robot CS set forth above.

Since communication is conducted as set forth above in group robot system 100, the intensity of communication between base station BS101 and sensing robot CS does not have to be of a level that covers the entire communication area of group robot system 100. Only communication of a level that can ensure communication with an adjacent sensing robot CS in the communication path is required. Therefore, the communication intensity may be lower as compared to the communication intensity in which the entire communication area of group robot system 100 is to be covered. This means that power consumption for communication can be reduced.

FIG. 53 corresponds to the case where sensing robot CS20 transmits information of search towards sensing robot CS31 (solid line in FIG. 53). In the case where information of search is to be transmitted from a plurality of sensing robots CS to sensing robot CS31 (long broken line in FIG. 53), information of search is transmitted to sensing robot CS31 in a time-divisional manner in the order of sensing robots CS20, CS21, CS23, CS30 and CS20.

Conversely, in the case where information is to be transmitted from base station BS101 to sensing robot CS20 that has detected the object, the flow of the above-described route is set opposite. The signal is transmitted in the order from base station BS101 to sensing robots CS34, CS33, CS32, CS31 and CS20.

Figure 54:
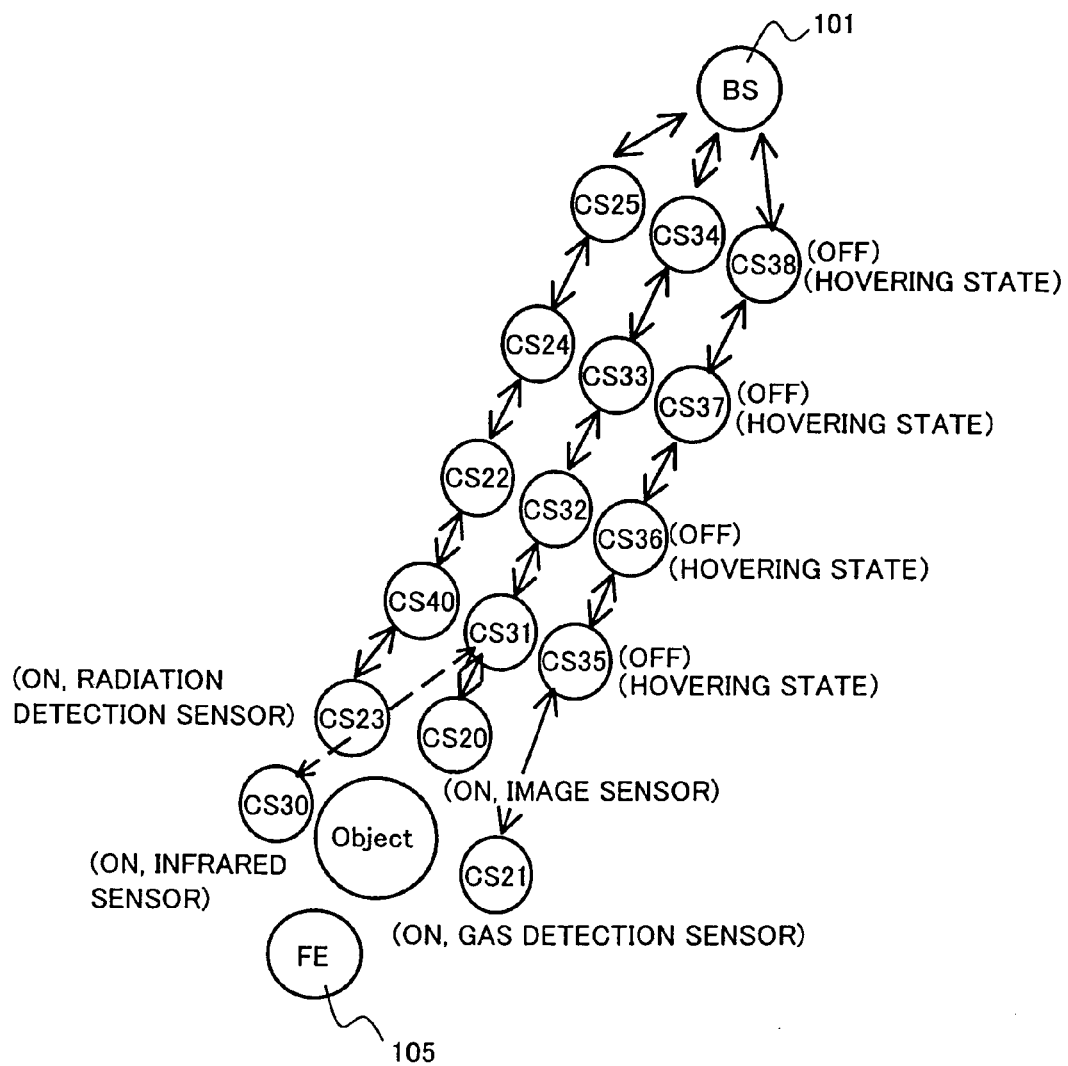

FIG. 53 shows the case where there is one route for the communication path. Alternatively, a plurality of communication paths as shown in FIG. 54 may be provided. FIG. 54 shows three paths, i.e., a first path (sensing robots CS40, CS22, CS24, CS25) a second path (sensing robots CS31, CS32, CS33, CS34), and a third path (sensing robots CS35, CS36, CS37, CS38). The conditions of sensing robots CS located in the communication path are similar to those shown in FIG. 53. Specifically, sensing robots CS located in the communication path all have their search function turned OFF, have bidirectional communication capability, and attain an hovering state in the case where the sensing robot is a fluttering robot.

When there are a plurality of communication paths as shown in FIG. 54, each communication path is identified by the code of spectrum communication, as will be described afterwards. Identification of the code of the spectrum communication by each sensing robot CS allows the sensor information from a sensing robot CS equipped with a different type of sensor function to be transmitted to respective sensing robots CS of the three communication paths. Specifically, sensing robot CS located at the first path transmits the sensed information from the radiation detection sensor of sensing robot CS23. Sensing robot CS located at the second path transmits the sensed information from the image sensor of sensing robot CS20. Sensing robot CS located at the third path transmits the sensed information from the gas detection sensor of sensing robot CS21. Base station BS101 processes the sensor information received from the three routes by time-division. Thus, the processing for search can be conducted at high speed in group robot system 100 by transmitting the sensor information of a sensing robot CS having a different sensor function to a sensing robot CS located at a different communication path.

In the case where there are three communication paths as shown in FIG. 54, sensing robots CS in each communication path are located substantially linear between base station BS101 and pheromone robot FE105, likewise the case of one route shown in FIG. 53. In the case where this sensing robot CS for communication is a fluttering robot, sensing robot CS for communication located at the first to third paths attain a hovering state.

Figure 55:
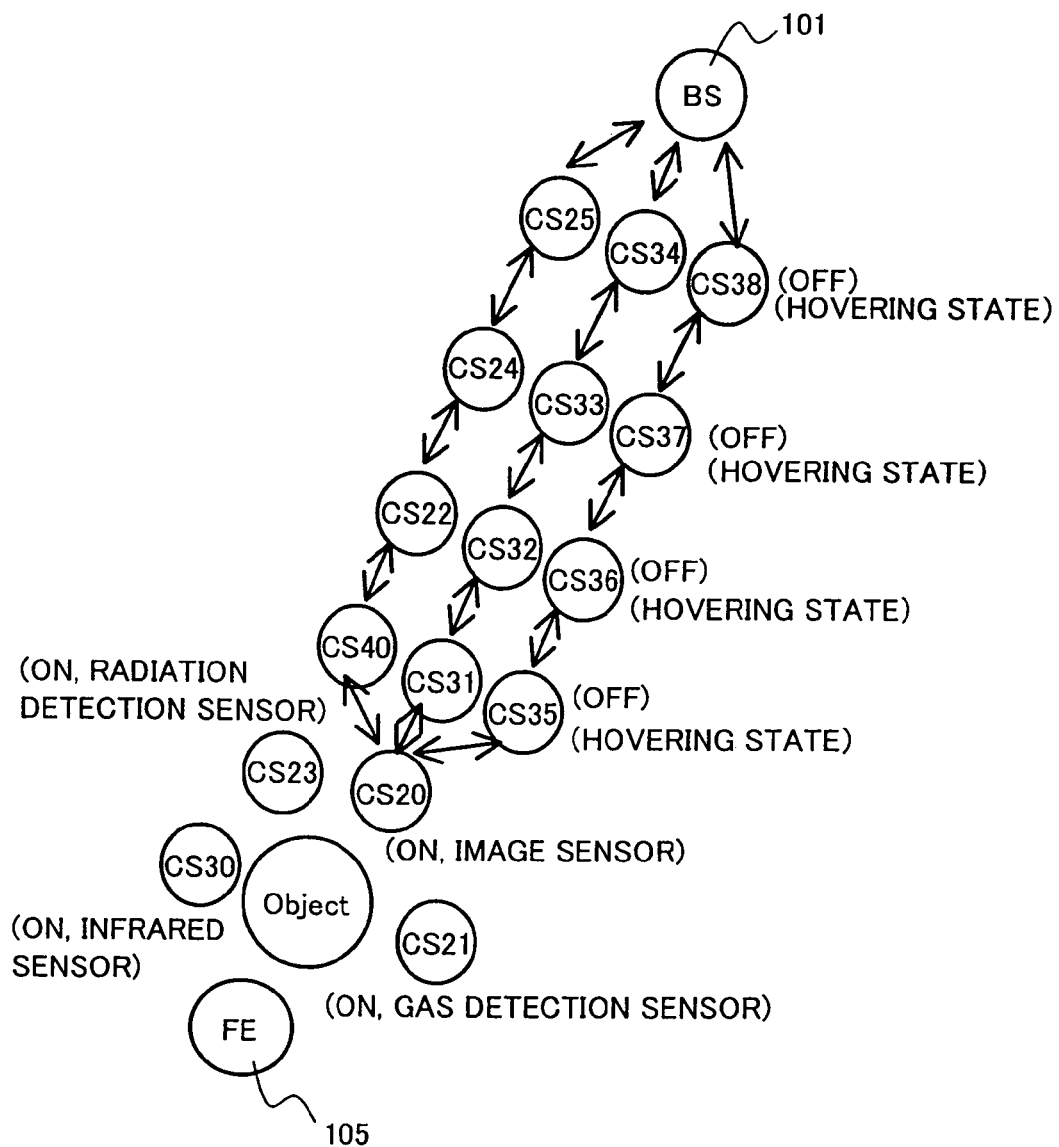

In contrast to the case of FIG. 54 where sensor information of different sensor functions are transmitted through a plurality of paths, the sensor information of the same sensor function can be transmitted through a plurality of communication paths, as shown in FIG. 55. likewise the example of FIG. 54, FIG. 55 shows three paths, i.e. a first path (sensing robots CS40, CS22, CS24, CS25), a second path (sensing robots CS31, CS32, CS33, CS34) and a third path (sensing robots CS35, CS36, CS37, CS38). As to the three communication paths in the example shown in FIG. 55, the conditions of sensing robots CS located at the communication path are similar to those shown in FIGS. 53 and 54. Specifically, sensing robots CS located at the communication path all have their search function turned OFF, have a bidirectional communication function, and attain a hovering state in the case where sensing robot CS is a fluttering robot.

Difference between respective communication paths is identified by the code of spectrum communication that will be described afterwards. In the example of FIG. 55, a signal from the same sensing robot CS is transmitted to sensing robots CS located at three respective communication paths. Specifically, sensing robots CS in FIG. 55 located at the first to third paths transmit the sensor information of the image sensor of sensing robot CS20. Base station BS101 processes the sensor information received from the three routes in time-division. The reliability of the sensor information in group robot system 100 can be improved by transmitting the sensor information of the same sensor function to base station BS101 through a plurality of sensing robots CS located at different communication paths.

In the case where the communication path includes three routes as shown in FIG. 55, sensing robots BS in each communication path are located substantially linear between base station BS101 and pheromone robot FE105,likewise the examples shown in FIGS. 53 and 54. In the case where sensing robot CS for communication is a fluttering robot, sensing robot CS for communication located at the first to third paths attain a hovering state.

Figure 56:
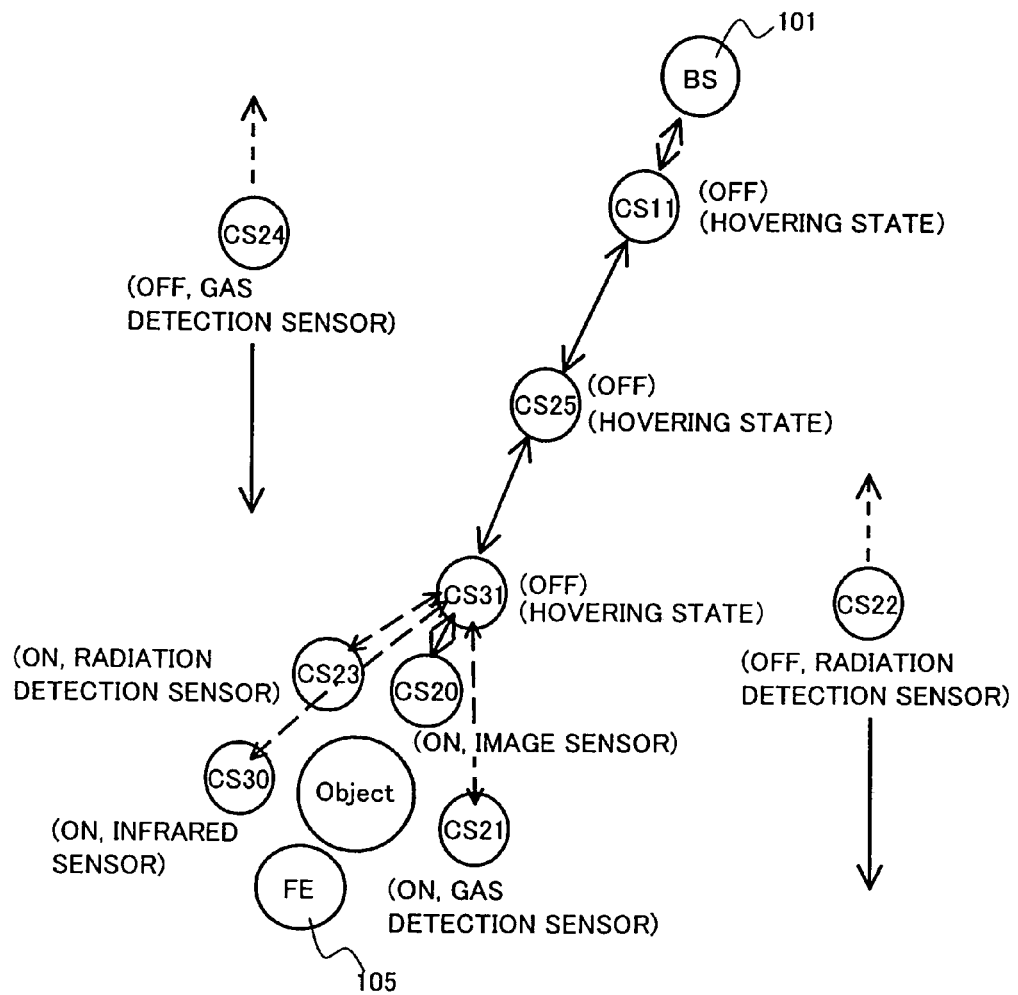

FIG. 56 shows a communication system of group robot system 100 having a hierarchical structure with base station BS101 as the highest hierarchy, and a plurality of sensing robots CS for communication forming a plurality of hierarchies with each other. Referring to FIG. 56, sensing robot CS20 (image sensor), CS21 (gas detection sensor), CS23 (radiation sensor) and CS30 (infrared sensor) conducting the further search shown in FIG. 51 transmit information of search to sensing robot CS31 attaining a state of having the searching operation suppressed (indicated by the designation of OFF in FIG. 56).

Sensing robot CS31 receiving information of search from sensing robots CS20, CS21, CS23 and CS30 transmits the information of search to sensing robot CS25 of a higher hierarchical level attaining a state of having the searching operation suppressed. Sensing robot CS25 then transmits the information of search to sensing robot CS11 of a higher hierarchical level. Then, sensing robot CS11 transmits the information of search to base station BS101 of a higher hierarchical level.

It is to be noted that sensing robots CS31, CS25 and CS11 are sensing robots that have not detected the object, or a sensing robot that does not conduct the search. These sensing robots have the search operation ceased after sensing robot CS30 has detected an object. Sensing robots CS31, CS25 and CS11 are located substantially linear between base station BS101 and pheromone robot FE105. In the case where sensing robots CS31, CS25 and CS21 for communication are fluttering robots, they attain a hovering state.

By assigning a hierarchy in advance to each sensing robot CS in a hierarchical structure of such a communication system, each sensing robot CS is located in a range that allows communication with an adjacent sensing robot CS of an adjacent hierarchical level. In response to sensing robot CS30 that has detected the object transmitting the information of search to sensing robot CS31 of a higher level, sensing robot CS31 moves to a position between base station BS101 and pheromone robot FE105. Subsequently, sensing robot CS of a lower hierarchical level receiving the information of search from a sensing robot CS sequentially moves to a position between base station BS101 and pheromone robot FE105.

FIG. 56 corresponds to the case where sensing robot CS20 transmits the information of search towards sensing robot CS31 (indicated by the solid line in FIG. 56). In the case where a plurality of sensing robots CS transmit the information of search towards sensing robot CS31 (long broken line in FIG. 56), each information of search is sequentially transmitted to sensing robot CS31 in the order of sensing robots CS20, CS21, CS23, CS30 and CS20.

The group robot system is arranged as shown in FIG. 56 when the communication system has a hierarchical structure with the base station as the highest hierarchy and a plurality of robots for communication form a plurality of hierarchies with each other. Information of search is transmitted from sensing robot CS20 (image sensor), CS21 (gas detection sensor), CS23 (radiation sensor) and CS30 (infrared sensor) to sensing robot CS31 attaining a state of having the searching operation suppressed (OFF designation in FIG. 56). Communication is conducted from sensing robot CS31 to higher-level sensing robot CS25 having the search operation suppressed, from sensing robot CS25 to sensing robot CS11 of a higher level, and from sensing robot CS11 to base station BS101. Sensing robots CS31, CS25 and CS11 are robots other than the robot that has detected the object, or a robot that does not conduct a search, and has the search operation suppressed after detection of the object by sensing robot CS30. Sensing robots CS31, CS25 and CS11 conducting communication are located substantially linear between base station BS101 and pheromone robot FE105. In the case where sensing robot for communication is a fluttering robot, sensing robots CS31, CS25 and CS11 attain a hovering state. In the example of FIG. 56, information is transmitted from sensing robot CS20 to sensing robot CS31 for communication. In the case where information is transmitted from a plurality of sensing robots to sensing robot CS31, information is transmitted to sensing robot CS31 in a time-divisional manner in the order of sensing robots CS20, CS21, CS23, CS30 and CS20.

Conversely, in the case where information is to be transmitted from base station BS101 to sensing robot CS20 that has detected the object, the above-described flow route is set opposite. The signal flows in the order of base station BS101, sensing robots CS11, CS25, CS31 and CS20.

The sensing robot not associated with the detection of an object, further search, and communication relay between sensing robot CS and base station BS101 (i.e., sensing robots CS22 and CS24 in FIG. 56) move from the current area of search as indicated by the solid line in FIG. 56. Sensing robots CS22 and CS24 not associated with the detection of an object, further search, and communication relay between sensing robot CS and base station BS101 generally move to the next area of search for the next survey. In the case where there is only one object of search or when the search of a certain area has been completed, the sensing robots move towards the initial position, as indicated by the dotted line in FIG. 56. The travel of sensing robots CS22 and CS24 are similar to the travel of sensing robot CS set forth before.

The communication system of group robot system 100 having a hierarchical structure with base station BS101 as the highest level and a plurality of sensing robots CS for communication forming a plurality of hierarchies with each other will be described hereinafter. For the sake of simplification, it is assumed that a plurality of fluttering sensing robots CS includes three groups, i.e., a group of sensing robots 102 (sensing robots CS11-CS1$i$) located closest to base station BS, the next closest group of sensing robots 103 (sensing robots CS21-CS2$j$), and the farthest group of sensing robot 104 (sensing robots CS31-CS3$k$). Although the sensing robots are divided into three groups in the present example, the number of groups is not limited thereto. The present invention is applicable as long as there are two or more groups, as in the present embodiment.

Base station BS101 communicates with sensing robot 102 of the group located closest to base station BS (sensing robots CS11-CSS1$i$). The modified points in fluttering such as the fluttering frequency and direction are transmitted from base station BS located upstream towards fluttering sensing robot 102 (CS11-CS1$i$). Presence of an object, position information and the like are transmitted from fluttering sensing robot 102 (CS11-CS1$i$) located downstream to base station BS.

Then, sensing robot 102 (CS11-CS1$i$) communicates with sensing robot 103 (CS21-CS2$j$) of the adjacent group. From sensing robot 102 (CS11-CS1$i$) located upstream to fluttering sensing robot 103 (CS21-CS2$j$) are transmitted modified points of fluttering such as the fluttering frequency and direction for sensing robot 103 (CS21-CS2$j$) transmitted from base station BS101 to sensing robot 102 (CS34). Conversely, from sensing robot103 (CS21-CS2$j$) located downstream to sensing robot 102 (CS11-CS1$i$) are transmitted information such as the presence of an object and position.

Then, sensing robot 103 (CS21-CS2$j$) communicates with sensing robot 104 (CS31-CS3$k$) of an adjacent group. From upstream sensing robot 103 (CS21-CS2$j$) to fluttering sensing robot 103 (CS31-CS3$k$) are transmitted the modified points of fluttering such as fluttering frequency and direction for sensing robot 104 (CS31-CS3$k$) transmitted to sensing robot 103 (CS21-CS2$j$) from base station BS101 via sensing robot 102 (CS11-CS1$i$). Conversely, from downstream fluttering sensing robot 104 (CS31-CS3$k$) to upstream sensing robot 103 (CS21-CS2$j$) are transmitted information such as the presence of an object and position. Namely, when the object of search is detected in the area of search of fluttering sensing robot CS30, a detection signal is transmitted via sensing robot CS31 to sensing robot CS25 of the upper level, and then transmitted from sensing robot CS25 to sensing robot CS11 of the upper level. Then, detection of the object is eventually transmitted from sensing robot CS11 to base station BS.

The communication intensity of base station BS does not have to be of a level of that covers all the communication areas of the fluttering robots. Communication intensity of a level that can ensure communication with the closest group on the concentric circle about the base station is required. Therefore, a weaker communication intensity as compared to that for ensuring communication with all sensing robots is required, and hence power consumption for communication can be reduced.

In the case where the communication intensity between fluttering sensing robot sensing robot CS11 and base station BS101 becomes weaker than a predetermined level, the fluttering sensing robot moves towards base station BS101 until the communication intensity exceeds the predetermined level. The same applies for sensing robot CS11 of the upper level with respect to a downstream fluttering sensing robot 103 (CS25).

The above example corresponds to the case where the downstream sensing robot moves until the required communication intensity is achieved. The communication intensity between a sensing robot under control of an upper sensing robot and the upper sensing robot can be ensured by raising the communication power at both the sensing robot side and the upper sensing robot side when the communication intensity becomes lower than the predetermined level.

Figure 57:
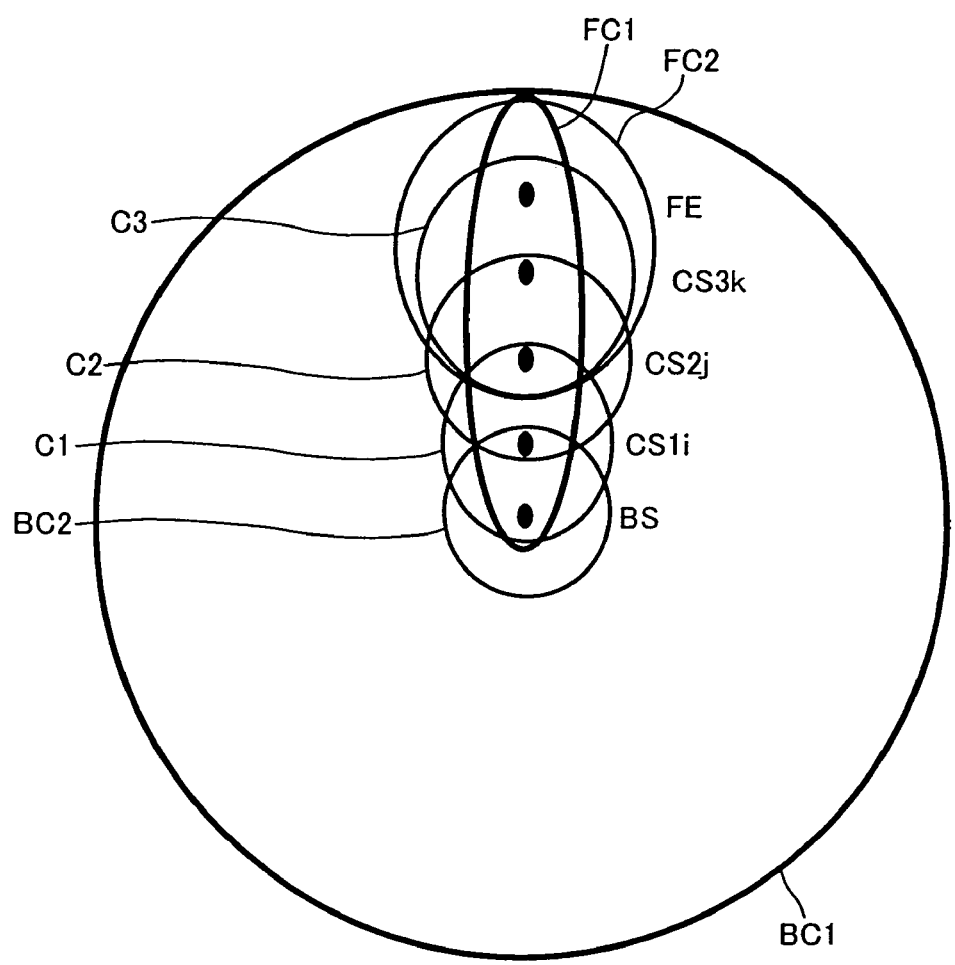
FIG. 57 shows the relationship between a hierarchical level and position when the communication system of the group robot system of the present embodiment has a hierarchical structure.

FIG. 57 represents the relation between a hierarchical structure and positioning in communication between respective sensing robots CS, and between sensing robot CS and base station BS in the group robot system.

Sensing robot CS1$i$ governed by base station BS is located in a circle (BC2), centered about base station BS, representing the communication range of base station BS. Sensing robot CS2$j$ governed by sensing robot CS1$i$ is located in a circle (C1), centered about sensing robot CS1$i$, representing the range of communication of sensing robot CS1$i$.

Similarly, sensing robot CS3$k$ governed by sensing robot CS2$j$ is located in a circle (C2), centered about sensing robot CS2$j$, representing the range of communication of sensing robot CS2$j$. A plurality of sensing robots CS3$k$ governed by sensing robot CS2$j$ are located in the communication circle governed by sensing robot CS2$j$.

In the case where sensing robot C3$k$ corresponds to sensing robot CS located at the outermost side, sensing robot CS3$k$ is also governed by pheromone robot FE. In other words, sensing robot CS3$k$ is located in a circle (FC2), centered about pheromone robot FE, representing the range of communication of pheromone robot FE.

The communication intensity between pheromone robot FE and base station BS is higher than that of other communications. Pheromone robot FE is basically located at the outermost side of the divided area of search when base station BS is located at the center. Pheromone robot FE is located in a circle (BC1) representing the range of strong communication for base station BS and pheromone robot FE, centered about base station BS. The range of communication from pheromone robot FE to base station BS corresponds to an elliptical shape with high directivity. This is because it is not necessary to cover all the directions (FC1).

Description of pheromone robot FE105 will be provided hereinafter. Pheromone robot FE105 is located outer than sensing robot group 100, when centered about base station BS101. Pheromone robot FE105 controls the travel of sensing robot CS, and also determines the range of search. Specifically, sensing robot CS is located between base station BS101 and pheromone robot FE105. A robot of a level higher than pheromone robot FE105 is base station BS101, whereas a robot of a lower level is sensing robot 104 (CS31-CS3$k$) located at the outermost side of the concentric circle about base station BS101.

The communication intensity between pheromone robot FE105 and downstream sensing robot 104 (CS31-CS3$k$) is identical to the communication intensity between base station BS and sensing robot CS, or between respective sensing robots CS. However, the communication intensity between pheromone robot FE105 and base station BS101 is greater as compared to that of other communication intensities.

In the group robot system of the present embodiment, the maximum distance of communication between pheromone robot FE and base station BS is preferably set to be larger than the sum of the maximum distance of communication between base station BS and the sensing robot (CS11-CS1$i$) located at the uppermost hierarchical level of the hierarchical structure, the maximum distance of communication between pheromone robot FE and the sensing robot (CS31-CS3$k$) located at the lowermost level of the hierarchical structure, and the maximum distance of communication between each of the plurality of sensing robots CS. Based on the linear distance of communication allowed from base station BS up to the sensing robot (CS31-CS3$k$) of the lowermost level in the hierarchical structure, each sensing robot CS can be used efficiently, making the best of each distance of communication.

Base station BS101 has pheromone robot FE105 arranged at the outer diameter region of the area of search that is substantially concentric with base station BS101 as the center, and determines the region of search. Then, the range of the concentric hierarchical levels is determined in accordance with the number of hierarchies in the hierarchical structure. Then, the range of a cell corresponding to the number of fluttering sensing robots in the hierarchical level (the range of search of each sensing robot in the same level of the hierarchical structure) is determined. Also, the spatial resolution of search of the sensing robot is determined. Finally, the communication intensity between base station BS and each of sensing robots, and the communication intensity between respective sensing robots CS are determined in accordance with the difference in radius of concentric circles, and the cell area of the cell defining the area of search by each of the sensing robot represented by the concentric circles.

When the area of search of sensing robot CS is to be altered, base station BS101 transmits the distance and direction of travel of sensing robot CS to sensing robot 102 (CS11-CS1$i$). Specifically, sensing robot 102 that has received a signal from base station BS indicating travel of sensing robot CS moves itself after transmitting the information of the distance and direction of travel to sensing robot 103 (CS21-CS2$j$) of the lower level, when sensing robot 102 itself corresponds to the current sensing robot CS.

Thus, information related to travel is sequentially transmitted in the direction from upstream to downstream, i.e., from base station BS to sensing robot CS, and from sensing robot CS of the higher level to a sensing robot CS of a lower level, when the region of search is to be altered.

The same applies to the case where the entire region of search of group robot system 100 is to be altered. Information of travel is transmitted from upstream to downstream, i.e. from base station BS to sensing robot CS, and from sensing robot CS of a higher level to sensing robot CS of a lower level. Specifically, in the case where the entire region of search is to be altered for group robot system 100, base station BS101 initially transmits the information of distance and direction of travel for base station BS101 to pheromone robot FE105. Then, base station BS101 transmits the information of the distance and direction of travel to sensing robot 102 (CS11-CS1$i$). Thus, the entire group robot system will move in accordance with the travel of base station BS101.

More specifically, sensing robot 102 (CS11-CS1$i$) receiving the signal indicating the travel of the entire group robot system from base station BS moves itself after transmitting the information of the distance and direction of travel to sensing robot 103 (CS21-CS2$j$) of the lower level. Pheromone robot FE105 moves in accordance with base station BS after transmitting the information of the distance and direction of travel to sensing robot 104 (CS31-CS3$k$) of the lowest level.

Thus, transmission of the information of travel in the downstream direction, i.e., from base station BS to sensing robot CS, and from sensing robot CS of a higher level to sensing robot CS of a lower level, is carried out substantially at the same time of the transmission of the information of travel from pheromone robot FE to sensing robot CS in the case where the entire region of search of group robot system 100 is to be altered.

Pheromone robot FE105 located at the outermost side of the area of search directly governs sensing robot 104 (CS31-CS3$k$) identified as the outermost group of sensing robots (sensing robots at the lowest level of the hierarchical structure). Pheromone robot FE105 always places sensing robot CS identified by a PN code within the communication range.

For example, when the communication intensity between governed fluttering sensing robot CS3$k$ and pheromone robot FE105 becomes weaker than a predetermined level, that fluttering sensing robot CS3$k$ moves towards pheromone robot FE105 until the communication intensity exceeds the predetermined level. Since pheromone robot FE105 is under control of base station BS101, the distance from base station BS101 can be monitored through synchronous delay of communication. Pheromone robot FE105 can constantly maintain a predetermined distance from base station BS101. Thus, the entire area of search of the group can be always determined substantially similarly.

Figure 58:
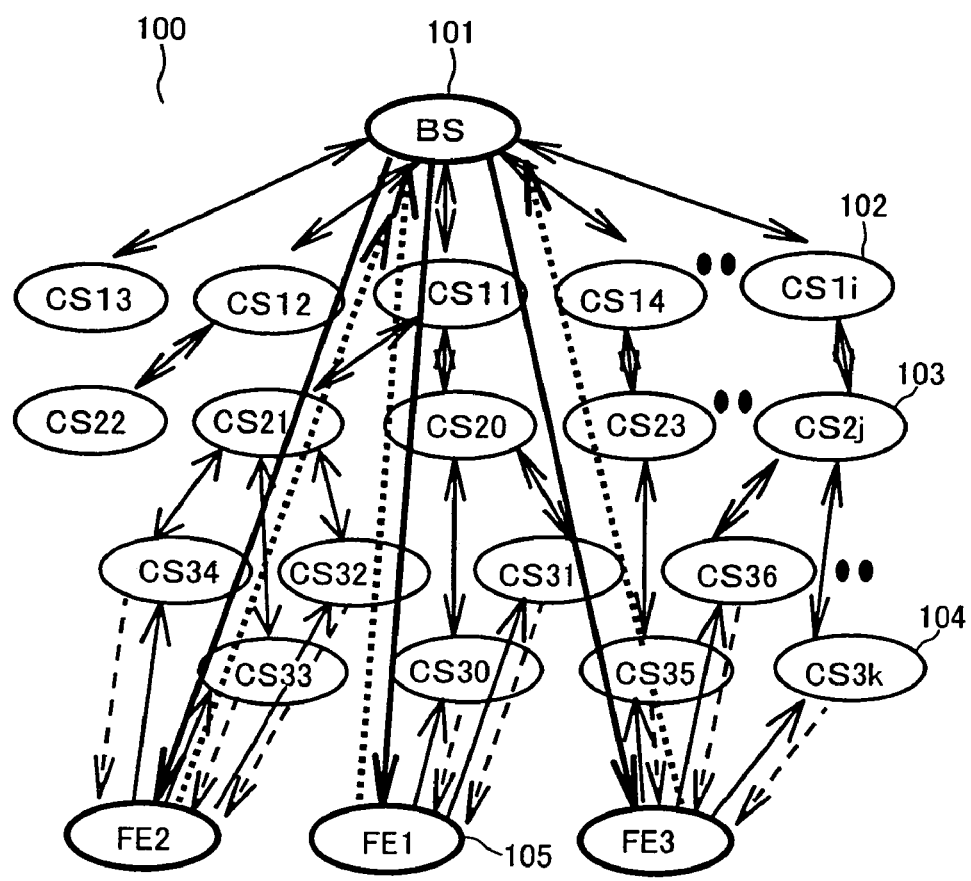
FIG. 58 is a diagram to describe signal flow in a communication system of a hierarchical structure when the communication system of the group robot system of the present embodiment has a hierarchical structure.

FIG. 58 shows signal flows in the communication system of the hierarchical structure.

In the figure, solid lines represent motion control signals (downstream) and detection signals (upstream), while dotted lines represent power signals.

Communication between a fluttering sensing robot and the base station, and communication between each of the fluttering sensing robots is bidirectional. A signal from upstream to downstream is a motion control signal of the sensing robot such as fluttering frequency or direction of the robot, or a control signal for sensor control. A signal from downstream to upstream is a detection signal of presence/absence of the object, position information or the like. The chain relation in communication between an upstream robot that provides controls and a downstream robot that is under control is one to multiple or one to one, and as a whole, the relation establishes a communication route of a tree structure. Consequently, there is always one communication route from the base station to each sensing robot CS, and therefore, confusion in the communication system is avoided.

Communication between base station BS and pheromone robot FE is also bidirectional. The signal from base station BS to pheromone robot FE is a signal representing speed or direction of movement of base station BS. Based on this signal, pheromone robot FE determines the speed and direction of its own movement, and transmits a control signal of fluttering frequency, direction or the like to sensing robot CS. The signal from pheromone robot FE to base station BS is for measuring reception power.

Base station BS receives the transmission signal from pheromone robot FE, and measures the power thereof, so as to indirectly estimate the distance between base station BS and pheromone robot FE, and in accordance with the magnitude of power, causes pheromone robot FE to move closer, or intensifies transmission signal from base station BS to pheromone robot FE. The relation of numbers between base station BS and pheromone robot FE may be one to multiple or one to one.

Communication between pheromone robot FE and fluttering sensing robot CS is also bidirectional. The signal from pheromone robot FE to sensing robot CS is a motion control signal for a sensing robot CS such as fluttering frequency or direction of the robot, or a control signal for sensor control. The signal from fluttering sensing robot CS to pheromone robot FE is a signal for measuring reception power.

Pheromone robot FE receives the transmission signal from sensing robot CS and measures the power thereof, so as to indirectly estimate the distance between pheromone robot FE and sensing robot CS, and in accordance with the magnitude of the power, it causes sensing robot CS to come closer to pheromone robot FE. The relation of numbers between pheromone robot FE and sensing robot CS may be one to multiple or one to one.

Figure 59A:
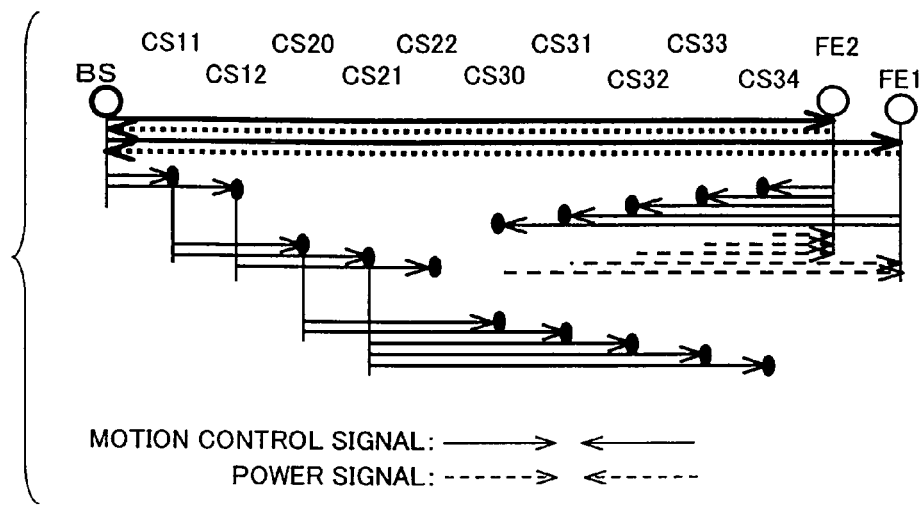
FIGS. 59A and 59B represent the flow of a control signal of a fluttering sensing robot of the group robot system of the present embodiment.
Figure 59B:
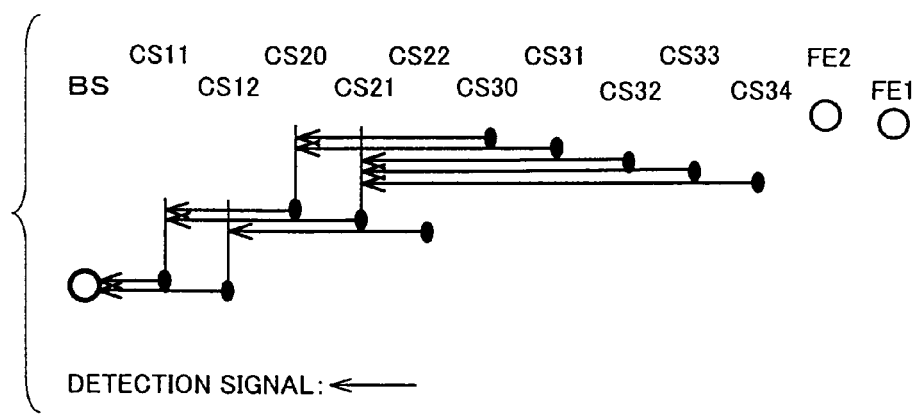

FIGS. 59A and 59B represent, as a flow, examples of the travel procedure of the group of robots in the group robot system of a hierarchical structure divided into three groups of a plurality of fluttering sensing robots CS, i.e. sensing robot 102 (CS11-CS1$i$) of the group located closest to base station BS, sensing robot 103 (CS21-CS2$j$) of the next closest group, and sensing robot 104 (CS31-CS3$k$) of the farthest group.

First, the flow of motion control signal will be described with reference to FIG. 59A. The horizontal solid lines represent the flow of motion control signals. The dotted lines represent the flow of power signals. The vertical solid lines represent time delay.

A motion control signal of sensing robot CS including the fluttering frequency, direction and the like for a fluttering sensing robot, or a control signal for sensor control is transmitted from base station BS to sensing robots CS11 and CS12. In the case where the entire region of search of group robot system 100 is to be altered, information of the speed and direction of travel of base station BS is transmitted from base station BS to pheromone robot FE at the same time. From pheromone robot FE to base station BS is transmitted a signal for power measurement directed to estimating the distance between base station BS and pheromone robot FE.

Then, sensing robot CS11 transmits a motion control signal for a sensing robot including the fluttering frequency, direction, and the like of fluttering sensing robot, or a control signal for sensor control to sensing robots CS20 and CS21. Sensing robot CS12 transmits to sensing robot CS22 a motion control signal for a sensing robot CS including the fluttering frequency, direction, and the like, or a control signal for sensor control.

In the case where the entire region of search by group robot system 100 is to be altered, pheromone robot FE1 transmits a motion control signal for a sensing robot CS including the fluttering frequency, direction, and the like, or a control signal for sensor control to sensing robots CS30 and CS31.

Pheromone robot FE2 transmits to sensing robots CS32, CS33 and CS34 a motion control signal for sensing robot CS including fluttering frequency or direction of the fluttering robot, or a control signal for sensor control. From sensing robots CS30 and CS31 to pheromone robot FE1 is transmitted a signal for measuring power to estimate the distance between sensing robot CS30 or CS31 and pheromone robot FE1.

From sensing robots CS32, CS33 and CS34 to pheromone robot FE2 is transmitted a signal for measuring power to estimate the distance between sensing robots CS32, CS33 or CS34 and pheromone robot FE2.

Finally, sensing robot CS20 transmits to sensing robots CS30 and CS31 a motion control signal for a sensing robot including fluttering frequency or direction of the robot, or a control signal for sensor control. Sensing robot CS21 transmits to sensing robots CS32, CS33 and CS34 a motion control signal for a sensing robot CS including fluttering frequency or direction of the robot, or a control signal for sensor control.

Referring to FIG. 59B, the flow of detection signals will be described. In this figure, solid lines in the lateral direction represent the flow of detection signals, and vertical solid lines represent time delay.

First, from sensing robots CS30 and CS31 to sensing robot CS20 is transmitted a detection signal representing presence/absence of an object or position information. From sensing robots CS32, CS33 and CS34 to sensing robot CS21 is transmitted a detection signal representing presence/absence of an object, position information or the like.

Then, from sensing robots CS20 and CS21 to sensing robot CS11, a detection signal representing presence/absence of an object, position information or the like is transmitted. From sensing robots CS22 to sensing robot CS12, a detection signal representing presence/absence of an object, position information and the like is transmitted.

Finally, from sensing robots CS11 and CS12 to base station BS, a detection signal representing presence/absence of an object, position information or the like is transmitted.

In this example, information is provided upward from the level of sensing robot CS3$k$. When an object is detected at the level of sensing robot CS2j or CS1i, information will be initiated from that level, and transmitted upward to base station BS.

The specific example shown in FIG. 56 realizes a hierarchical structure employing a communication system set forth above.

Communication between fluttering sensing robot CS and base station BS, between each of fluttering sensing robots CS and between base station BS and pheromone robot FE is performed in accordance with spread spectrum communication, which is a method of synchronous communication. The spread spectrum communication system will be described hereinafter with reference to FIG. 60 and FIG. 61.

The group of robots of the group robot system in accordance with the present embodiment basically has three communication layers, including layer A for establishing synchronization, layer B for communication with upstream robots, and layer C for communication with downstream robots. In layer A, base station 101, sensing robot CS groups 102, 103, 104 and pheromone robot FE105 all have the same PN code of 0. Here, code 0 is one of PN (Pseudorandom Noise) codes of 256 taps.

First, communication between base station BS101 and a sensing robot group 102 (CS11-CS1i) located downstream will be described. As the communication of layer A, base station BS101 communicates PN code 0 to sensing robot group 102 (CS11-CS1i) by spread spectrum. Sensing robot 102 (CS11-CS1i) despreads, by multiplying the same PN code of 0, by the received wave. When the PN code is despread for one period using a matched filter or the like, a point of synchronization where PN codes match can be found without fail.

Figure 60:
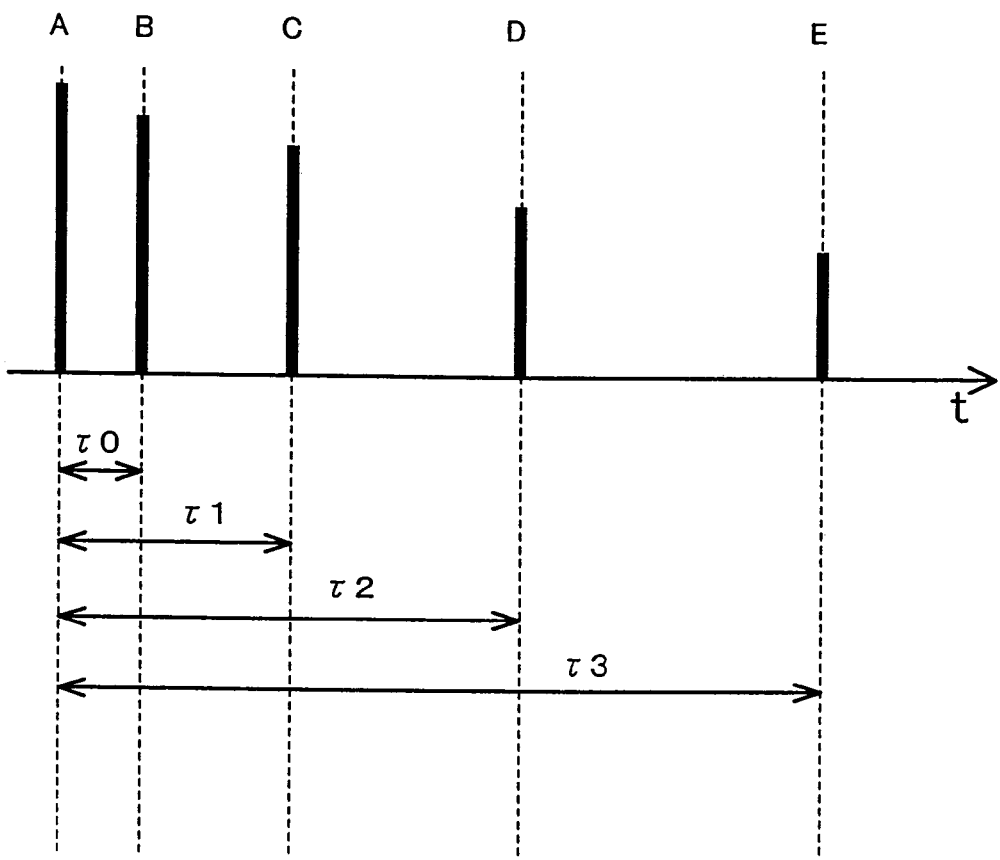
FIG. 60 represents a delay profile of the control signal in a spread spectrum communication of the group robot system of the present embodiment.

Assume that the time point A of FIG. 60 is a reference point of synchronization with base station BS101. The time of synchronization with sensing robot group 102 (CS11-CS1i) is at the time point B. Namely, a peak of the matched filter appears at a time point delayed by the distance between base station BS101 and sensing robot group 102 (CS11-CS1i), where synchronization is established.

Similarly, sensing robot group 102 (CS11-CS1i) transmits, as communication of layer A, the PN code 0 to sensing robot group 103 (CS21-CS2j), by spread spectrum communication. The distance between base station BS101 and sensing robot group 103 (CS21-CS2j) is the distance between base station BS101 and sensing robot BS102 (CS11-CS1i) plus the distance between sensing robot 102 (CS11-CS1i) and sensing robot 103 (CS21-CS2j). Therefore, the point of synchronization of sensing robot 103 (CS21-CS2j) with the base station appears is at time point C of FIG. 60, further delayed from sensing robot 102 (CS11-CS1i).

Similarly, sensing robot group 103 (CS21-CS2j) transmits as the communication of layer A, the PN code 0 to sensing robot group 104 (CS31-CS3k) by spread spectrum communication. The distance between base station BS101 and sensing robot group 104 (CS31-CS3k) is the distance between base station BS101 and sensing robot 103 (CS21-CS2j) plus the distance between sensing robot 103 (CS21-CS2j) and sensing robot 104 (CS31-CS3k). Therefore, the point of synchronization of sensing robot group 104 (CS31-CS3k) with the base station appears at time point D of FIG. 60, further delayed from sensing robot 103 (CS21-CS2j).

The distance between base station BS101 and pheromone robot FE105 for controlling movement, which will be described later, is larger than the distance between base station BS101 and sensing robot group CS104 (CS31-CS3k). Therefore, the point of synchronization of pheromone robot 105 appears at time point E of FIG. 60, further delayed from sensing robot group CS104 (CS31-CS3k).

The point of synchronization of each robot described above is repeatedly established intermittently, and the point of synchronization is constantly updated. The point of synchronization of sensing robot 102 (CS11-CS1i) is represented by the time point B of FIG. 60.

For establishing communication with base station BS101 located upstream, sensing robot 102 (CS11-CS1i) performs despreading and demodulation, using PN code 10 of layer B. The point of synchronization of the PN code of layer B is the time point B of FIG. 60 that is established by the code 0 of layer A. Further, PN code 10 of layer B of sensing robot 102 (CS11-CS1i) is the same as the PN code 10 of layer C for establishing communication with the sensing robot downstream of base station BS101. Specifically, only the sensing robot group 102 (CS11-CS1i) that uses in layer B the same PN code 10 of the layer C of base station BS101 can communicate with base station BS.

Figure 61:
FIG. 61 shows the spread codes in a spread spectrum communication of the group robot system of the present embodiment.
Figure 62:
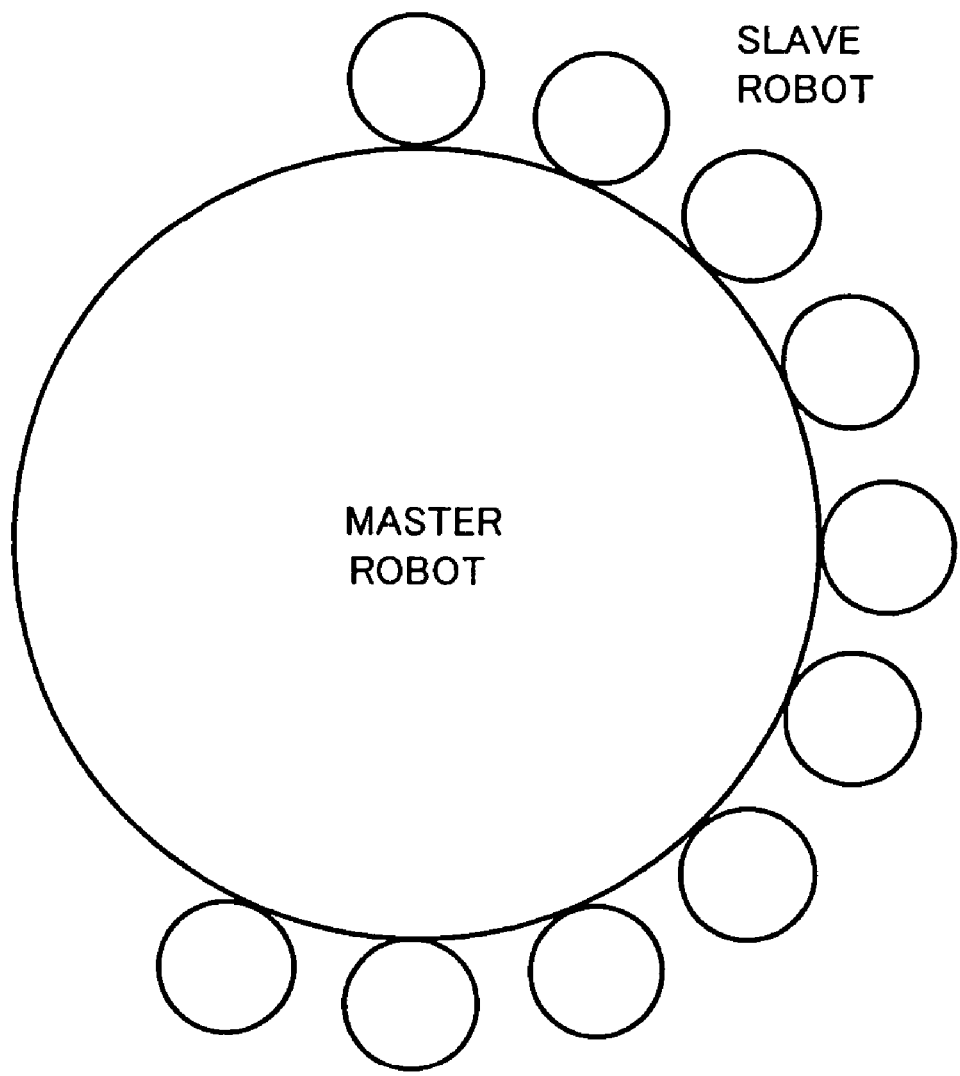
FIG. 62 shows a specific example of a conventional group robot system.
Figure 63:
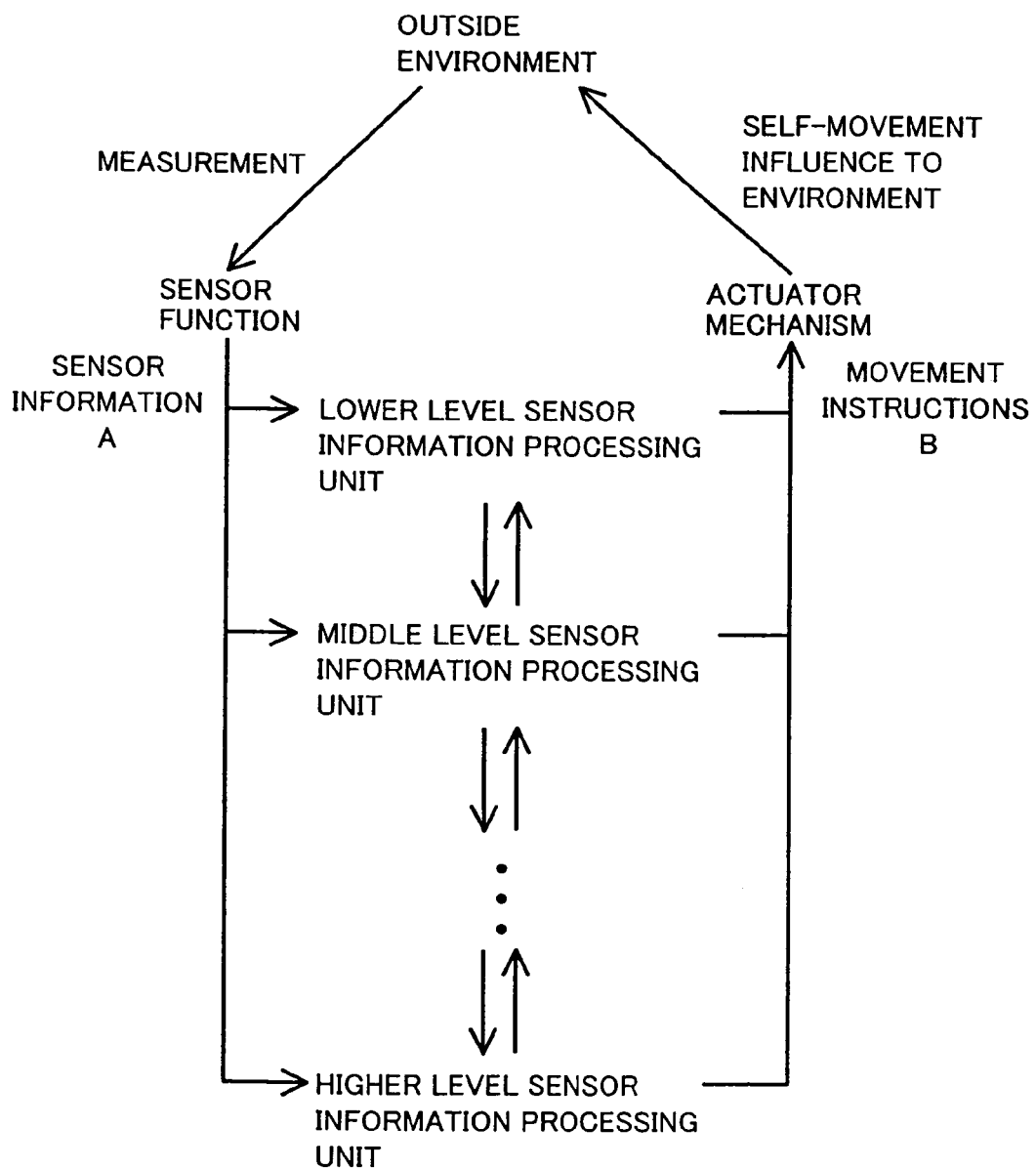
FIG. 63 shows a specific example of a conventional environment recognition system.

In the example shown in FIG. 61, layer B of sensing robots CS1 (i-2), CS1 (i-1) and CS1i have the code 10, and therefore, these can communicate with base station BS. However, sensing robot CS of which PN code of layer B is not the code 10 cannot communicate with base station BS, as the correlation peak with code 10 cannot be detected.

To establish communication with sensing robot 103 (CS21-CS2j) located downstream, sensing robot 102 (CS11-CS1i) performs despreading and demodulation using PN codes 20, 21 and 22 of layer C. Point of synchronization of the PN code of layer C is the time point B of FIG. 60 established by code 0 of layer A. The PN codes 20, 21 and 22 layer C of sensing robot 102 (CS11-CS1i) are the same as PN codes 20, 21 and 22 of layer B for establishing communication with a sensing robot upstream of sensing robot 103 (CS21-CS2j).

Specifically, only that sensing robot 102 (CS11-CS1i) that uses in layer C, the same PN code as layer B of sensing robot 103 (CS21-CS2j) can communicate with downstream sensing robot 103 (CS21-CS2j). For example, CS1 (i-2) can communicate with CS2 (j-3) and CS2 (j-2), CS1 (i-1) can communicate with CS2 (j-1), and CS1i can communicate with CS2j.

The point of synchronization of sensing robot 103 (CS21-CS2j) is the time point C of FIG. 60. To establish communication with sensing robot 102 (CS11-CS1i) located upstream, sensing robot 103 (CS21-CS2j) performs despreading and demodulation using PN codes 20, 21 and 22 of layer B. The point of synchronization of the PN code of layer B is the time point C of FIG. 60, established by the code 0 of layer A. As the communication between sensing robot 103 (CS21-CS2j) and sensing robot 102 (CS11-CS1i) has been already described above.

To establish communication with downstream sensing robot 104 (CS31-CS3k), sensing robot 103 (CS21-CS2j) performs despreading and demodulation using PN codes 30, 31, 32 and 33 of layer C. The point of synchronization of the PN code of layer C is the time point C of FIG. 60 established by code 0 of layer A. The PN codes 30, 31, 32 and 33 of layer C of sensing robot 103 (CS21-CS2j) are the same as PN codes 30 and 31 of layer B for establishing communication of sensing robot CS located upstream of sensing robot 104 (CS31-CS3k).

Specifically, only that sensing robot 103 (CS21-CS2j) which uses in layer C, the same PN code as the layer B of sensing robot 104 (CS31-CS3k) can communicate with sensing robot 104 (CS31-CS3k) located downstream. For example, sensing robot CS2 (j-3) can communicate with CS3 (k-3), CS3 (k-2) and CS3 (k-1), and CS2 (j-2) can communicate with CS3k.

The point of synchronization of sensing robot 104 (CS31 to CS3k) is the point D of FIG. 60. To establish communication with upstream sensing robot 103 (CS21-CS2j), sensing robot 104 (CS31-CS3k) performs despreading and demodulation using PN codes 30 and 31 of layer B. The point of synchronization of the PN code of layer B is the time point D of FIG. 60 established by code 0 of layer A. As the communication between sensing robot 104 (CS31-CSk) and sensing robot 103 (CS21-CS2j) has already been described above.

To establish communication with base station BS101 located upstream, pheromone robot FE105 performs despreading and demodulation using PN code 10 of the layer B. The point of synchronization of the PN code of layer B is the time point E of FIG. 60 established by code 0 of layer A. The PN code for synchronization of layer A is the same code 0 as other sensing robots CS. The PN code 10 of layer B is the same as PN code 10 of layer C for establishing communication of base station BS with sensing robot CS located downstream. When the PN code of layer B is not code 10, pheromone robot FE cannot communicate with base state BS, as the correlation peak with code 10 of base station BS cannot be detected.

To establish communication with downstream sensing robot 104 (CS31-CSk), pheromone robot FEn performs despreading and demodulation, using PN code 40 of layer C. The point of synchronization of the PN code of layer C is the time point E of FIG. 60 established by code 0 of layer A. The PN code 40 of layer C of pheromone robot FEn is the same as PN code 40 of layer C of sensing robot 104 (CS31-CS3k) at the outermost position, for establishing communication with pheromone robot FE.

Specifically, only that pheromone robot FEn that uses in layer C, the same PN code as the C layer of sensing robot 104 (CS31-CS3k) can communicate with downstream sensing robot 104 (CS31-CS3k). In the example shown in FIG. 61, pheromone robot FEn can communicate with sensing robots CS3 (k-3), CS3 (k-2) and CS3 (k-1) while it cannot communicate with sensing robot CS3k, as the spread code is different.

As to the details of spread spectrum communication, see Yukiji Yamauchi, Spread Spectrum Communication, published by Tokyo Denki Daigaku Shuppan Kyoku. In the spread spectrum communication of the present embodiment, by way of example, a spread spectrum communication apparatus described in Japanese Patent Laying-Open No. 11-168407 is applied, which is proposed by the inventors of the present invention.

By conducting a search of an object through group robot system 100, detailed entire information of an object can be obtained efficiently in a short period of time.

Group robot system 100 can reduce the load on the processing and communication of sensor information when many sensing robots CS conduct a search of an object while moving. Since the sensor information is processed in a multi-task manner at base station BS101, group robot system 100 can proceed to detect the next object, when one object has been detected, to expedite the search.

The above description is based on an embodiment in which sensing robot CS equipped with a sensor function or communication function, and pheromone robot FE105 which is a relay providing direct control of travel are fluttering robots. The present invention is not limited thereto. Sensing robot CS may be a mobile unit equipped with a sensor function and communication function, and pheromone robot FE105 may be a relay from base station BS101 providing motion control.

The method of control of group robot system 100 can be provided as a program. Such a program can be stored in a computer-readable recording medium such as a flexible disc, CD-ROM (Compact Disc-Read Only Memory), ROM (Read Only Memory), RAM (Random Access Memory), memory card, and the like in conjunction with a computer to be provided as a program product. Alternatively, the program can be provided in the form of being stored in a recording medium such as a hard disk or the like incorporated in computer. The program can also be provided by downloading through a network.

The provided program product is installed in a program storage unit such as a hard disk to be executed. The program product includes the program per se as well as a recording medium in which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A group robot system comprising a plurality of sensing robots, and a control apparatus controlling (i) an operation of each of said plurality of sensing robots, and (ii) a definition of areas in which of each of said plurality of sensing robots are respectively located relative to said control apparatus,
wherein each of said plurality of sensing robots is equipped with the same sensor function and a predetermined sensor function level relative to the others of said plurality of sensing robots, and,
wherein said control apparatus responds to a detection of an object by one of said plurality of sensing robots (a) by providing a control such that another of said plurality of sensing robots that is equipped with a function level differing from the function level of said one of said plurality of sensing robots that detected said object conducts a further search for said object, and (b) by providing a control such that at least one of said plurality of sensing robots other than said one of said plurality of sensing robots that detected the object and said sensing robot conducting said further search moves outside of a respective area relative to said control apparatus in which it was located prior to the detection of the object.

2. The group robot system according to claim 1, wherein said control apparatus enables the predetermined sensor function level of a selected one of the plurality of sensing robots, and,
wherein, when said selected one of said plurality of sensing robots having the enabled function level detects an object, said control apparatus enables the predetermined function level of another of said plurality of sensing robots that differs from the function level of said one of said plurality of sensing robots that detected the object so as to provide a control such that said another of said plurality of sensing robots conducts a further search for said object.

3. The group robot system according to claim 1, wherein said relative sensor function levels of said plurality of sensing robots is determined by any of a sensing resolution, a sensor type, and a processing method of sensor information.

4. The group robot system according to claim 1, wherein said plurality of sensing robots and said control apparatus conduct communication in a hierarchical manner wherein said control apparatus has the highest level of hierarchy, and said control apparatus responds to a detection of an object by one of said plurality of sensing robots by providing control such that said one of said plurality of sensing robots that has detected the object and a another of said plurality of sensing robots located at a hierarchical communication position between said one of said plurality of sensing robots and said control apparatus that relays communication when hierarchical communication is conducted from said one of said plurality of sensing robots to said control apparatus moves outside a respective area relative to said control apparatus in which it was located prior to the detection of the object.

5. The group robot system according to claim 1, wherein said control apparatus includes a pheromone robot controlling travel of at least one of said sensing robots,
and wherein said pheromone robot moves, when one of said plurality of sensing rebel robots detects an object, to a neighborhood of said object.

6. The group robot system according to claim 1, wherein said control apparatus includes a pheromone robot controlling travel of at least one of said plurality of sensing robots,
said pheromone robot being responsive to a detection of an object by one of said plurality of sensing robots so as to provide a control such that another of said plurality of sensing robots different from the one of said plurality of sensing robots that has detected said object moves to a neighborhood of said pheromone robot.

7. The group robot system according to claim 1, wherein at least one of said sensing robots is capable of fluttering flight by fluttering motion.

8. A sensing robot capable of fluttering flight included in a group robot system comprising a plurality of sensing robots and a control apparatus controlling (i) an operation of each of said plurality of sensing robots, and (ii) a definition of areas in which of each of said plurality of sensing robots are respectively located relative to said control apparatus,
wherein each of said plurality of sensing robots is equipped with the same sensor function and a predetermined sensor function level relative to the others of said plurality of sensing robots, and,
wherein said control apparatus responds to a detection of an object by one of said plurality of sensing robots (a) by providing a control such that another of said plurality of sensing robots that is equipped with a function level differing from the function level of said one of said plurality of sensing robots that detected said object conducts a further search for said object, and (b) by providing a control such that at least one of said plurality of sensing robots other than said one of said plurality of sensing robots that detected the object and said sensing robot conducting said further search moves outside of a respective area relative to said control apparatus in which it was located prior to the detection of the object.

9. A base station included in a group robot system comprising a plurality of sensing robots including at least one sensing robot capable of fluttering flight through a fluttering motion and a control apparatus controlling (i) an operation of each of said plurality of sensing robots, and (ii) a definition of areas in which of each of said plurality of sensing robots are respectively located relative to said control apparatus,
wherein said base station corresponds to said control apparatus,
wherein each of said plurality of sensing robots is equipped with the same sensor function and a predetermined sensor function level relative to the others of said plurality of sensing robots, and,
wherein said control apparatus responds to a detection of an object by one of said plurality of sensing robots (a) by providing a control such that another of said plurality of sensing robots that is equipped with a function level differing from the function level of said one of said plurality of sensing robots that detected said object conducts a further search for said object, and (b) by providing a control such that at least one of said plurality of sensing robots other than said one of said plurality of sensing robots that detected the object and said sensing robot conducting said further search moves outside of a respective area relative to said control apparatus in which it was located prior to the detection of the object.

10. A pheromone robot included in a group robot system comprising a plurality of sensing robots including at least one sensing robot capable of fluttering flight through a fluttering motion and a control apparatus controlling (i) an operation of each of said plurality of sensing robots, and (ii) a definition of areas in which of each of said plurality of sensing robots are respectively located relative to said control apparatus,
wherein said pheromone robot controls travel of at least one of said plurality of sensing robots capable of fluttering flight through a fluttering motion,
wherein each of said plurality of sensing robots is equipped with the same sensor function and a predetermined sensor function level relative to the others of said plurality of sensing robots, and,
wherein said control apparatus responds to a detection of an object by one of said plurality of sensing robots (a) by providing a control such that another of said plurality of sensing robots that is equipped with a function level differing from the function level of said one of said plurality of sensing robots that detected said object conducts a further search for said object, and (b) by providing a control such that at least one of said plurality of sensing robots other than said one of said plurality of sensing robots that detected the object and said sensing robot conducting said further search moves outside of a respective area relative to said control apparatus in which it was located prior to the detection of the object.

* * * * *

UNITED STATES PATENT AND TRADEMARK OFFICE
CERTIFICATE OF CORRECTION

| | |
|---|---|
| PATENT NO. | : 7,409,266 B2 |
| APPLICATION NO. | : 10/739453 |
| DATED | : August 5, 2008 |
| INVENTOR(S) | : Keita Hara et al. |

It is certified that error appears in the above-identified patent and that said Letters Patent is hereby corrected as shown below:

Col. 44 line 25 thru col. 46 line 53
Delete Claims 1-10 as printed in the above-identified patent document and substitute the following Claims 1-10 therefor:

1. A group robot system comprising a plurality of sensing robots,
 and a control apparatus controlling (i) an operation of each of said plurality of sensing robots, and (ii) a definition of areas in which each of said plurality of sensing robots are respectively located relative to said control apparatus,
 wherein said control apparatus responds to a detection of
 an object by one of said plurality of sensing robots by providing a control such that each of said plurality of sensing robots, other than said sensing robot that has detected said object, moves outside of the respective area relative to said control apparatus in which it was located prior to the detection of the object, wherein each of said plurality of sensing robots is equipped with the same sensor function and a predetermined sensor function level relative to the others of said plurality of sensing robots, said control apparatus responds to a detection of an object by one of said plurality of sensing robots (a) by providing a control such that another of said plurality of sensing robots that is equipped with a function level differing from the function level of said one of said sensing robots that detected said object conducts a further search for said object, and (b) by providing a control such that a sensing robot a sensing robot other than said one of said sensing robots that detected the object and said sensing robot conducting said further search moves outside of a respective area relative to said control apparatus in which it was located prior to the detection of the object.

UNITED STATES PATENT AND TRADEMARK OFFICE
CERTIFICATE OF CORRECTION

PATENT NO. : 7,409,266 B2
APPLICATION NO. : 10/739453
DATED : August 5, 2008
INVENTOR(S) : Keita Hara et al.

It is certified that error appears in the above-identified patent and that said Letters Patent is hereby corrected as shown below:

2. The group robot system according to claim 1, wherein
said control apparatus enables the predetermined sensor function level of a selected one of the plurality of sensing robots, and when said said selected one of said plurality of sensing robots having the enabled function level detects an object, said control apparatus enables the predetermined function level of another of said plurality of sensing robots that differs from the function level of said one of said plurality of sensing robots that detected the object so as to provide a control such that said another of said plurality of sensing robots conducts a further search for said object.

3. The group robot system according to claim 1, wherein
said relative sensor function levels of said plurality of sensing robots is determined by any of a sensing resolution, a sensor type, and a processing method of sensor information.

4. The group robot system according to claim 1, wherein
said plurality of sensing robots and said control apparatus conduct communication in a hierarchical manner wherein said control apparatus has the highest level of hierarchy, and
said control apparatus responds to a detection of an object by
one of said plurality of sensing robots providing control such that said one of said plurality of sensing robots that has detected the object and a another of said plurality of sensing robots located at a hierarchical communication position between said
one of said plurality of sensing robots and said control apparatus that relays communication when hierarchical communication is conducted from said one of said plurality of sensing robots to said control apparatus moves outside a respective area relative to said control apparatus in which it was located prior to the detection of the object.

UNITED STATES PATENT AND TRADEMARK OFFICE
CERTIFICATE OF CORRECTION

PATENT NO. : 7,409,266 B2
APPLICATION NO. : 10/739453
DATED : August 5, 2008
INVENTOR(S) : Keita Hara et al.

It is certified that error appears in the above-identified patent and that said Letters Patent is hereby corrected as shown below:

5. The group robot system according to claim 1, wherein
said control apparatus includes a pheromone robot controlling travel of at least one of said sensing robots,
and wherein said pheromone robot moves, when one of said plurality of sensing robots detects an object, to a neighborhood of said object.

6. The group robot system according to claim 1, wherein
said control apparatus includes a pheromone robot controlling travel of at least one of said plurality of sensing robots,
said pheromone robot being responsive to a detection of an object by one of said plurality of sensing robots so as to provide a control such that another of said plurality of sensing robots different from the one of said plurality of sensing robots that has detected said object moves to a neighborhood of said pheromone robot.

7. The group robot system according to claim 1, wherein at least one of said sensing robots is capable of fluttering flight by fluttering motion.

8. A sensing robot capable of fluttering flight included
in a group robot system comprising a plurality of sensing robots and a control apparatus controlling (i) an operation of each of said plurality of sensing robots, and (ii) a definition of areas in which of each of said plurality of snesing robots are respectively located relative to said control apparatus, wherein said control apparatus responds to detection of an object by one of said plurality of sensing robots so as to provide a control such that another of said plurality of sensing robots moves outside the area relative to said control apparatus in which it was located prior to the detection of the object,

UNITED STATES PATENT AND TRADEMARK OFFICE
CERTIFICATE OF CORRECTION

| | | |
|---|---|---|
| PATENT NO. | : 7,409,266 B2 | |
| APPLICATION NO. | : 10/739453 | |
| DATED | : August 5, 2008 | |
| INVENTOR(S) | : Keita Hara et al. | |

It is certified that error appears in the above-identified patent and that said Letters Patent is hereby corrected as shown below:

wherein each of said plurality of sensing robots is equipped with the same sensor function and a predetermined sensor function level relative to the others of said plurality of sensing robots, said control apparatus responds to a detection of an object by one of said plurality of sensing robots (a) by providing a control such that another of said plurality of sensing robots that is equipped with a function level differing from the function level of said one of said sensing robots that detected said object conducts a further search for said object, and (b) by providing a control such that a sensing robot a sensing robot other than said one of said sensing robots that detected the object and said sensing robot conducting said further search moves outside of a respective area relative to said control apparatus in which it was located prior to the detection of the object.

9. A base station included in a group robot system
    comprising a plurality of sensing robots including at least one sensing robot capable of fluttering flight through a fluttering motion and a control apparatus controlling (i) an operation of each of said plurality of sensing robots, and (ii) a definition of areas in which each of said plurality of sensing robots are respectively located relative to said control apparatus,
       wherein said control apparatus responds to a detection of
an object by one of said plurality of sensing robots by providing a control such that each of said plurality of sensing robots, other than said sensing robot that has detected said object, moves outside of the respective area relative to said control apparatus in which it was located prior to the detection of the object, and
       wherein said base station corresponds to said control apparatus,

UNITED STATES PATENT AND TRADEMARK OFFICE
CERTIFICATE OF CORRECTION

| | |
|---|---|
| PATENT NO. | : 7,409,266 B2 |
| APPLICATION NO. | : 10/739453 |
| DATED | : August 5, 2008 |
| INVENTOR(S) | : Keita Hara et al. |

It is certified that error appears in the above-identified patent and that said Letters Patent is hereby corrected as shown below:

wherein each of said plurality of sensing robots is equipped with the same sensor function and a predetermined sensor function level relative to the others of said plurality of sensing robots, said control apparatus responds to a detection of an object by one of said plurality of sensing robots (a) by providing a control such that another of said plurality of sensing robots that is equipped with a function level differing from the function level of said one of said sensing robots that detected said object conducts a further search for said object, and (b) by providing a control such that a sensing robot a sensing robot other than said one of said sensing robots that detected the object and said sensing robot conducting said further search moves outside of a respective area relative to said control apparatus in which it was located prior to the detection of the object.

10. A pheromone robot included in a group robot system comprising a plurality of sensing robots including at least one sensing robot capable of fluttering flight through a fluttering motion and a control apparatus controlling (i) an operation of each of said plurality of sensing robots, and (ii) a definition of areas in which of each of said plurality of sensing robots are respectively located relative to said control apparatus,
        wherein said control apparatus responds to a detection of an object by one of said plurality of sensing robots by providing a control such that each of said plurality of sensing robots, other than said sensing robot that has detected said object, moves outside of the respective area relative to said control apparatus in which it was located prior to the detection of the object, and,
        wherein said pheromone robot controls travel of at least one of said plurality of sensing robots capable of fluttering flight through a fluttering motion.

UNITED STATES PATENT AND TRADEMARK OFFICE
CERTIFICATE OF CORRECTION

PATENT NO.       : 7,409,266 B2
APPLICATION NO.  : 10/739453
DATED            : August 5, 2008
INVENTOR(S)      : Keita Hara et al.

It is certified that error appears in the above-identified patent and that said Letters Patent is hereby corrected as shown below:

> wherein each of said plurality of sensing robots is equipped with the same sensor function and a predetermined sensor function level relative to the others of said plurality of sensing robots, said control apparatus responds to a detection of an object by one of said plurality of sensing robots (a) by providing a control such that another of said plurality of sensing robots that is equipped with a function level differing from the function level of said one of said sensing robots that detected said object conducts a further search for said object, and (b) by providing a control such that a sensing robot a sensing robot other than said one of said sensing robots that detected the object and said sensing robot conducting said further search moves outside of a respective area relative to said control apparatus in which it was located prior to the detection of the object.

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

PATENT NO. : 7,409,266 B2
APPLICATION NO. : 10/739453
DATED : August 5, 2008
INVENTOR(S) : Keita Hara et al.

It is certified that error appears in the above-identified patent and that said Letters Patent is hereby corrected as shown below:

Col. 44 line 25 thru col. 46 line 53
Delete Claims 1-10 as printed in the above-identified patent document and substitute the following Claims 1-10 therefor:

1. A group robot system comprising a plurality of sensing robots,
and a control apparatus controlling (i) an operation of each of said plurality of sensing robots, and (ii) a definition of areas in which of each of said plurality of sensing robots are respectively located relative to said control apparatus,
wherein said control apparatus responds to a detection of an object by one of said plurality of sensing robots by providing a control such that each of said plurality of sensing robots, other than said sensing robot that has detected said object, moves outside of the respective area relative to said control apparatus in which it was located prior to the detection of the object, wherein each of said plurality of sensing robots is equipped with the same sensor function and a predetermined sensor function level relative to the others of said plurality of sensing robots, said control apparatus responds to a detection of an object by one of said plurality of sensing robots (a) by providing a control such that another of said plurality of sensing robots that is equipped with a function level differing from the function level of said one of said plurality of sensing robots that detected said object conducts a further search for said object, and (b) by providing a control such that a sensing robot other than said one of said plurality of sensing robots that detected the object and said sensing robot conducting said further search moves outside of a respective area relative to said control apparatus in which it was located prior to the detection of the object.

UNITED STATES PATENT AND TRADEMARK OFFICE
CERTIFICATE OF CORRECTION

PATENT NO. : 7,409,266 B2
APPLICATION NO. : 10/739453
DATED : August 5, 2008
INVENTOR(S) : Keita Hara et al.

It is certified that error appears in the above-identified patent and that said Letters Patent is hereby corrected as shown below:

2. The group robot system according to claim 1, wherein
said control apparatus enables the predetermined sensor function level of a selected one of the plurality of sensing robots, and when said selected one of said plurality of sensing robots having the enabled function level detects an object, said control apparatus enables the predetermined function level of another of said plurality of sensing robots that differs from the function level of said one of said plurality of sensing robots that detected the object so as to provide a control such that said another of said plurality of sensing robots conducts a further search for said object.

3. The group robot system according to claim 1, wherein
said relative sensor function levels of said plurality of sensing robots is determined by any of a sensing resolution, a sensor type, and a processing method of sensor information.

4. The group robot system according to claim 1, wherein
said plurality of sensing robots and said control apparatus conduct communication in a hierarchical manner wherein said control apparatus has the highest level of hierarchy, and
said control apparatus responds to a detection of an object by
one of said plurality of sensing robots by providing control such that said one of said plurality of sensing robots that has detected the object and a another of said plurality of sensing robots located at a hierarchical communication position between said
one of said plurality of sensing robots and said control apparatus that relays communication when hierarchical communication is conducted from said one of said plurality of sensing robots to said control apparatus moves outside a respective area relative to said control apparatus in which it was located prior to the detection of the object.

UNITED STATES PATENT AND TRADEMARK OFFICE
CERTIFICATE OF CORRECTION

PATENT NO. : 7,409,266 B2
APPLICATION NO. : 10/739453
DATED : August 5, 2008
INVENTOR(S) : Keita Hara et al.

It is certified that error appears in the above-identified patent and that said Letters Patent is hereby corrected as shown below:

5. The group robot system according to claim 1, wherein
said control apparatus includes a pheromone robot controlling travel of at least one of said sensing robots,
and wherein said pheromone robot moves, when one of said plurality of sensing robots detects an object, to a neighborhood of said object.

6. The group robot system according to claim 1, wherein
said control apparatus includes a pheromone robot controlling travel of at least one of said plurality of sensing robots,
said pheromone robot being responsive to a detection of an object by one of said plurality of sensing robots so as to provide a control such that another of said plurality of sensing robots different from the one of said plurality of sensing robots that has detected said object moves to a neighborhood of said pheromone robot.

7. The group robot system according to claim 1, wherein at least one of said sensing robots is capable of fluttering flight by fluttering motion.

8. A sensing robot capable of fluttering flight included
in a group robot system comprising a plurality of sensing robots and a control apparatus controlling (i) an operation of each of said plurality of sensing robots, and (ii) a definition of areas in which of each of said plurality of sensing robots are respectively located relative to said control apparatus, wherein said control apparatus responds to detection of an object by one of said plurality of sensing robots so as to provide a control such that another of said plurality of sensing robots moves outside the area relative to said control apparatus in which it was located prior to the detection of the object,

UNITED STATES PATENT AND TRADEMARK OFFICE
CERTIFICATE OF CORRECTION

| | |
|---|---|
| PATENT NO. | : 7,409,266 B2 |
| APPLICATION NO. | : 10/739453 |
| DATED | : August 5, 2008 |
| INVENTOR(S) | : Keita Hara et al. |

It is certified that error appears in the above-identified patent and that said Letters Patent is hereby corrected as shown below:

>> wherein each of said plurality of sensing robots is equipped with the same sensor function and a predetermined sensor function level relative to the others of said plurality of sensing robots, said control apparatus responds to a detection of an object by one of said plurality of sensing robots (a) by providing a control such that another of said plurality of sensing robots that is equipped with a function level differing from the function level of said one of said plurality of sensing robots that detected said object conducts a further search for said object, and (b) by providing a control such that a sensing robot other than said one of said plurality of sensing robots that detected the object and said sensing robot conducting said further search moves outside of a respective area relative to said control apparatus in which it was located prior to the detection of the object.

> 9. A base station included in a group robot system
>> comprising a plurality of sensing robots including at least one sensing robot capable of fluttering flight through a fluttering motion and a control apparatus controlling (i) an operation of each of said plurality of sensing robots, and (ii) a definition of areas in which of each of said plurality of sensing robots are respectively located relative to said control apparatus,
>>> wherein said control apparatus responds to a detection of
>> an object by one of said plurality of sensing robots by providing a control such that each of said plurality of sensing robots, other than said sensing robot that has detected said object, moves outside of the respective area relative to said control apparatus in which it was located prior to the detection of the object, and
>>> wherein said base station corresponds to said control apparatus,

UNITED STATES PATENT AND TRADEMARK OFFICE
CERTIFICATE OF CORRECTION

PATENT NO. : 7,409,266 B2
APPLICATION NO. : 10/739453
DATED : August 5, 2008
INVENTOR(S) : Keita Hara et al.

It is certified that error appears in the above-identified patent and that said Letters Patent is hereby corrected as shown below:

> wherein each of said plurality of sensing robots is equipped with the same sensor function and a predetermined sensor function level relative to the others of said plurality of sensing robots, said control apparatus responds to a detection of an object by one of said plurality of sensing robots (a) by providing a control such that another of said plurality of sensing robots that is equipped with a function level differing from the function level of said one of said plurality of sensing robots that detected said object conducts a further search for said object, and (b) by providing a control such that a sensing robot other than said one of said plurality of sensing robots that detected the object and said sensing robot conducting said further search moves outside of a respective area relative to said control apparatus in which it was located prior to the detection of the object.

10. A pheromone robot included in a group robot system
comprising a plurality of sensing robots including at least one sensing robot capable of fluttering flight through a fluttering motion and a control apparatus controlling (i) an operation of each of said plurality of sensing robots, and (ii) a definition of areas in which of each of said plurality of sensing robots are respectively located relative to said control apparatus,
> wherein said control apparatus responds to a detection of
an object by one of said plurality of sensing robots by providing a control such that each of said plurality of sensing robots, other than said sensing robot that has detected said object, moves outside of the respective area relative to said control apparatus in which it was located prior to the detection of the object, and,
> wherein said pheromone robot controls travel of at least one of said
plurality of sensing robots capable of fluttering flight through a fluttering motion,

UNITED STATES PATENT AND TRADEMARK OFFICE
CERTIFICATE OF CORRECTION

PATENT NO. : 7,409,266 B2
APPLICATION NO. : 10/739453
DATED : August 5, 2008
INVENTOR(S) : Keita Hara et al.

It is certified that error appears in the above-identified patent and that said Letters Patent is hereby corrected as shown below:

wherein each of said plurality of sensing robots is equipped with the same sensor function and a predetermined sensor function level relative to the others of said plurality of sensing robots, said control apparatus responds to a detection of an object by one of said plurality of sensing robots (a) by providing a control such that another of said plurality of sensing robots that is equipped with a function level differing from the function level of said one of said plurality of sensing robots that detected said object conducts a further search for said object, and (b) by providing a control such that a sensing robot other than said one of said plurality of sensing robots that detected the object and said sensing robot conducting said further search moves outside of a respective area relative to said control apparatus in which it was located prior to the detection of the object.

This certificate supersedes the Certificate of Correction issued January 6, 2009.

Signed and Sealed this

Twenty-sixth Day of May, 2009

JOHN DOLL
*Acting Director of the United States Patent and Trademark Office*